(12) United States Patent
Hutchinson et al.

(10) Patent No.: US 12,179,644 B2
(45) Date of Patent: Dec. 31, 2024

(54) CHILD RESTRAINT WITH ROTATING SEAT

(71) Applicant: WONDERLAND SWITZERLAND AG, Steinhausen (CH)

(72) Inventors: James M F Hutchinson, Mohnton, PA (US); Robert S. Anderson, Narvon, PA (US); David A. Lehman, Lancaster, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 159 days.

(21) Appl. No.: 17/642,575

(22) PCT Filed: Sep. 14, 2020

(86) PCT No.: PCT/US2020/050672
§ 371 (c)(1),
(2) Date: Mar. 11, 2022

(87) PCT Pub. No.: WO2021/051057
PCT Pub. Date: Mar. 18, 2021

(65) Prior Publication Data
US 2022/0332225 A1    Oct. 20, 2022

Related U.S. Application Data

(60) Provisional application No. 63/064,837, filed on Aug. 12, 2020, provisional application No. 62/959,428, (Continued)

(51) Int. Cl.
*B60N 2/26* (2006.01)
*B60N 2/28* (2006.01)

(52) U.S. Cl.
CPC .......... *B60N 2/2806* (2013.01); *B60N 2/2851* (2013.01); *B60N 2/2863* (2013.01); *B60N 2/2869* (2013.01)

(58) Field of Classification Search
CPC .................... B60N 2/2863; B60N 2/2869
(Continued)

(56) References Cited

U.S. PATENT DOCUMENTS 4,613,188 A * 9/1986 Tsuge ............... B60N 2/286
297/256.14 X
4,688,850 A * 8/1987 Brownlie ............ B60N 2/2875
297/256.13
(Continued)

FOREIGN PATENT DOCUMENTS

AU    2010100631 A4    7/2010
EP    2308715 A1    4/2011
(Continued)

OTHER PUBLICATIONS

How to Install Graco (R) Nautilus (TM) with Safety Surround Car Seat (gracobaby)[online](retrieved from the internet on Oct. 31, 2020),URL https:/ww.youtube.com/watch?v=dQcCNZKulMw>, Oct. 13, 2013, entire demonstration, especially 6:05-6:22.
(Continued)

*Primary Examiner* — Rodney B White
(74) *Attorney, Agent, or Firm* — Volpe Koenig

(57) ABSTRACT

A convertible child restraint includes a lower base to contact a vehicle seat, a seat shell to support a child, and a mid base between the lower base and the seat shell to facilitate recline and rotational adjustment of the seat shell relative to the lower base. The child restraint may be used as a rear-facing car seat, a forward-facing car seat, and a belt positioning booster seat. For the rear-facing car seat configuration, a belt is installed along a rear-facing belt path that passes through the child restraint. The portion of the belt in the child restraint is accessed via a belt access panel when the seat shell is at a rear-facing position. Additionally, the child restraint includes a rotation lockout that allows the seat shell to be rotated from a rear-facing position to a side-facing
(Continued)

position, but not a forward-facing position when using the rear-facing configuration.

59 Claims, 54 Drawing Sheets

Related U.S. Application Data filed on Jan. 10, 2020, provisional application No. 62/899,410, filed on Sep. 12, 2019.

(58) Field of Classification Search
USPC .......................................... 297/250.1–256.16
See application file for complete search history.

(56) References Cited

U.S. PATENT DOCUMENTS

| | | | | |
|---|---|---|---|---|
| 4,743,064 A * | 5/1988 | Takizawa | B60N 2/2821 | 297/256.14 |
| 5,106,154 A * | 4/1992 | Kain | B60N 2/2839 | 297/256.14 X |
| 5,458,398 A * | 10/1995 | Meeker | B60N 2/286 | 297/256.14 X |
| 5,678,887 A * | 10/1997 | Sher | B60N 2/286 | 297/250.1 X |
| 5,722,720 A * | 3/1998 | Lumley | B60N 2/286 | 297/256.14 |
| 5,829,834 A * | 11/1998 | Silverman | B60N 2/2803 | 297/250.1 X |
| 6,336,682 B1 * | 1/2002 | Rosko | B60N 2/2803 | 297/250.1 X |
| 6,428,099 B1 * | 8/2002 | Kain | B60N 2/2839 | 297/256.16 |
| 6,592,183 B2 * | 7/2003 | Kain | B60N 2/289 | 297/256.16 |
| 6,682,143 B2 * | 1/2004 | Amirault | B60N 2/2851 | 297/250.1 X |
| 6,705,676 B1 * | 3/2004 | Berringer | B60N 2/2875 | 297/256.16 |
| 6,773,065 B1 * | 8/2004 | Stamper | B60N 2/2881 | 297/256.13 |
| 6,908,151 B2 * | 6/2005 | Meeker | B60N 3/102 | 297/250.1 |
| 7,032,969 B1 * | 4/2006 | Campbell | B60N 2/2851 | 297/256.1 X |
| 7,055,903 B2 * | 6/2006 | Balensiefer | B60N 2/2821 | 297/250.1 X |
| 7,059,677 B2 * | 6/2006 | Balensiefer | B60N 2/2875 | 297/256.16 |
| 7,090,294 B2 * | 8/2006 | Balensiefer | B60N 2/2806 | 297/256.14 X |
| 7,232,185 B2 * | 6/2007 | Hartenstine | B60N 2/2851 | 297/250.1 X |
| 7,300,113 B2 * | 11/2007 | Baloga | B60N 2/2851 | 297/256.16 |
| 7,338,122 B2 * | 3/2008 | Hei | B60N 2/2848 | 297/256.12 |
| 7,360,830 B2 * | 4/2008 | Balensiefer | B60N 3/101 | 297/188.08 |
| 7,533,935 B2 * | 5/2009 | Mostert | B60N 2/2809 | 297/254 |
| 7,770,970 B2 * | 8/2010 | Hei | B60N 2/2845 | 297/256.16 |
| 8,313,142 B2 * | 11/2012 | Xiao | B60N 2/286 | 297/256.14 X |
| 8,317,265 B2 | 11/2012 | Hutchinson | | |
| 8,348,337 B2 * | 1/2013 | Franck | B60N 2/2809 | 297/256.14 X |
| 8,439,439 B2 * | 5/2013 | Meeker | B60N 2/2806 | 297/250.1 |
| 8,534,757 B2 * | 9/2013 | Xiao | B60N 2/2806 | 297/256.14 X |
| 8,905,478 B2 * | 12/2014 | Strong | B60N 2/2821 | 297/256.14 X |
| 8,973,992 B2 * | 3/2015 | Guo | B60N 2/2866 | 297/256.1 X |
| 9,126,509 B2 * | 9/2015 | Biaud | B60N 2/2851 | |
| 9,150,126 B1 | 10/2015 | Kitchens et al. | | |
| 9,174,554 B2 * | 11/2015 | Maciejczyk | B60N 2/265 | |
| 9,937,823 B2 * | 4/2018 | Williams | B60N 2/2806 | |
| 10,023,079 B2 * | 7/2018 | Zhao | B60N 2/2851 | |
| 10,081,273 B2 * | 9/2018 | Johnson | B60N 2/2881 | |
| 10,266,077 B2 * | 4/2019 | Mason | B60N 2/28 | |
| 10,829,012 B1 * | 11/2020 | Brunick | B60N 2/2875 | |
| 10,843,597 B2 * | 11/2020 | Lehman | B60N 2/2851 | |
| 11,124,099 B2 * | 9/2021 | Mo | B60N 2/2851 | |
| 11,745,628 B2 * | 9/2023 | Lehman | B60N 2/2806 | 297/250.1 |
| 2003/0151282 A1 * | 8/2003 | Williams | B60N 2/2866 | 297/250.1 X |
| 2003/0151286 A1 * | 8/2003 | Kain | B60N 2/2806 | 297/256.16 |
| 2004/0070246 A1 | 4/2004 | Adachi | | |
| 2005/0110318 A1 * | 5/2005 | Meeker | B60N 2/2812 | 297/256.16 X |
| 2005/0264062 A1 * | 12/2005 | Longenecker | B60N 2/2845 | 297/250.1 |
| 2006/0091709 A1 * | 5/2006 | Emmert | B60N 2/2806 | 297/256.16 |
| 2007/0120403 A1 * | 5/2007 | Drexler | B60N 2/2851 | 297/250.1 X |
| 2007/0236061 A1 * | 10/2007 | Meeker | B60N 2/2866 | 297/250.1 |
| 2007/0241596 A1 * | 10/2007 | Merrill | B60N 2/2806 | 297/250.1 |
| 2007/0246982 A1 * | 10/2007 | Nett | B60N 2/809 | 297/250.1 |
| 2009/0066130 A1 | 3/2009 | Shafer | | |
| 2009/0066131 A1 * | 3/2009 | Hendry | B60N 2/2845 | 297/256.16 |
| 2009/0309405 A1 | 12/2009 | Maciejczyk | | |
| 2011/0109138 A1 | 5/2011 | Inoue et al. | | |
| 2012/0292963 A1 * | 11/2012 | Sedlack | B60N 2/286 | 297/256.1 |
| 2013/0161986 A1 * | 6/2013 | Kopp | B60N 2/2851 | 297/250.1 |
| 2013/0175835 A1 * | 7/2013 | Fujita | B60N 2/2812 | 297/219.12 |
| 2014/0084650 A1 | 3/2014 | Rabeony | | |
| 2015/0336481 A1 * | 11/2015 | Horsfall | B60N 2/2863 | 297/256.16 |
| 2016/0114706 A1 * | 4/2016 | Hutchinson | B60N 2/2863 | 297/256.13 |
| 2017/0217339 A1 | 8/2017 | Strong | | |
| 2017/0355287 A1 * | 12/2017 | Anderson | B60N 2/2812 | |
| 2018/0029507 A1 * | 2/2018 | Jane Santamaria | B60N 2/2872 | |
| 2018/0236904 A1 * | 8/2018 | Lehman | B60N 2/286 | |
| 2018/0264977 A1 | 9/2018 | Anderson | | |
| 2018/0370392 A1 * | 12/2018 | Harmes, V | B60N 2/2851 | |
| 2019/0077282 A1 | 3/2019 | Reaves | | |
| 2022/0219581 A1 * | 7/2022 | Brunick | B60N 2/2821 | |

FOREIGN PATENT DOCUMENTS

| | | |
|---|---|---|
| JP | 2015189295 A | 2/2015 |
| WO | 2015025434 A1 | 2/2015 |
| WO | 2019046990 A1 | 3/2019 |

OTHER PUBLICATIONS

International Search Report issued in corresponding International Patent Application No. PCT/US2020/050672 on Dec. 7, 2020, consisting of 3 pp.

Written Opinion issued in corresponding International Patent Application No. PCT/US2020/050672 on Dec. 7, 2020, consisting of 19 pp.

"Keep Child Passengers Safe" published by the U.S. Centers for Disease Control (CDC) and Prevention and the National Center for

(56) References Cited

OTHER PUBLICATIONS

Injury Prevention and Control (www.cdc.gov/injury/features/child-passenger-safety/index.html) (Undated).
United Nations European Regional standard ECE R44/04, "Uniform provisions concerning the approval of restraining devices for child occupants of power-driven vehicles," (Dec. 16, 2005).
Search Report and Written Opinion for Singapore Application No. 11202202373R dated Oct. 30, 2023.
Notice of Reasons for Rejection issued in corresponding Japanese Application No. 2022-516134 dated Sep. 9, 2024.

* cited by examiner

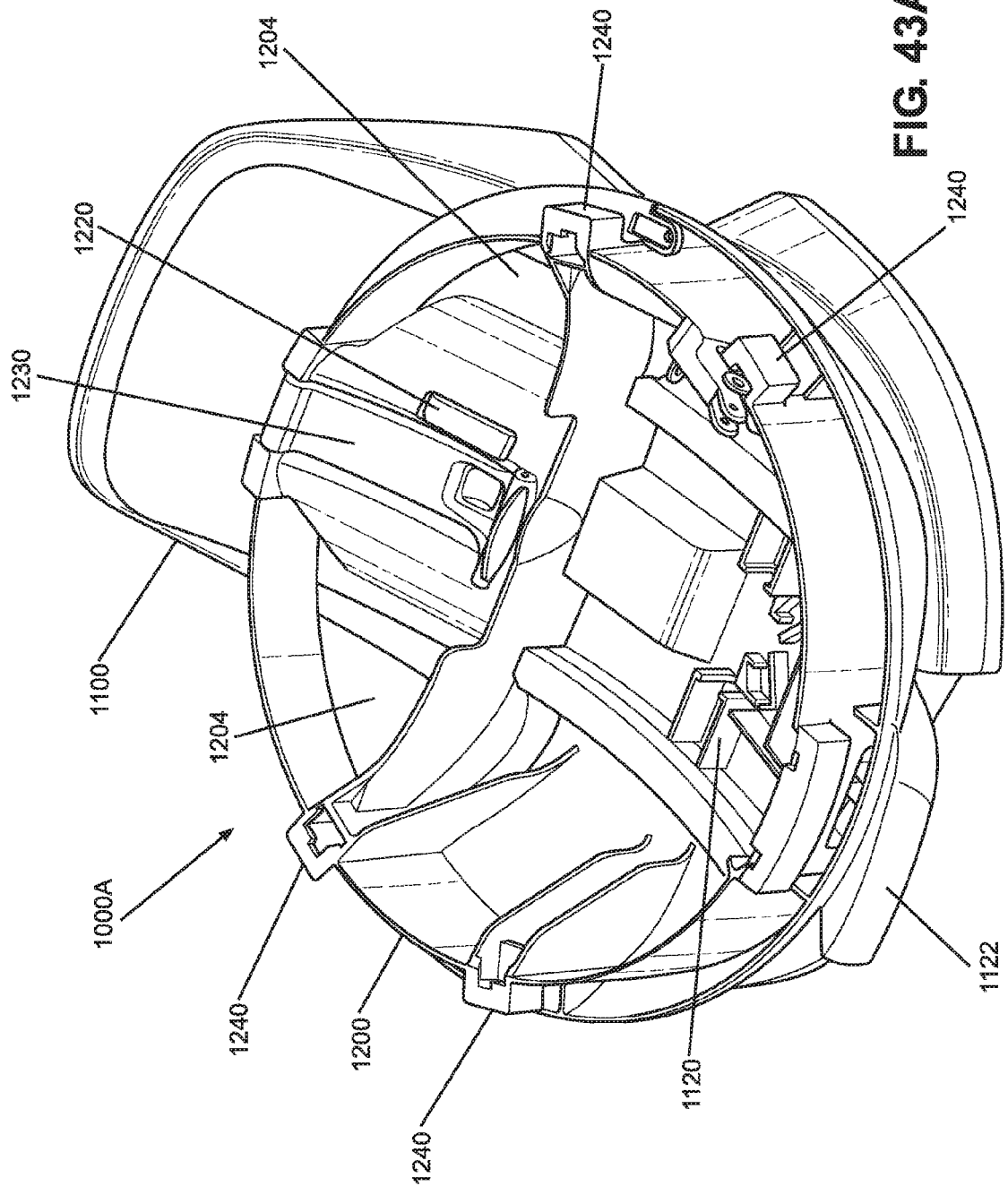

CHILD RESTRAINT WITH ROTATING SEAT

CROSS-REFERENCE TO RELATED APPLICATION

This application claims priority to U.S. Provisional Application No. 63/064,837, filed on Aug. 13, 2020, entitled, "Child Restraint with Rotating Seat," U.S. Provisional Application No. 62/959,428, filed on Jan. 10, 2020, entitled, "Child Restraint with Rotating Seat," and U.S. Provisional Application No. 62/899,410, filed on Sep. 12, 2019, entitled, "Child Restraint with Rotating Seat." Each of the aforementioned applications is incorporated by reference herein in its entirety.

BACKGROUND

An automobile is a common form of transportation for many parents and caregivers of children worldwide. From time to time, parents and caregivers also may rely on other sources of transportation, such as busses, airplanes and trains—collectively, these various modes of transportation are referred to herein generally as "vehicles." Many conventional vehicles, and particularly automobiles, often include restraints (e.g., seat belts) that are designed to protect adults and/or children of a certain age (e.g., over 9 years old) and/or size (e.g., over 57 inches in height). For relatively younger and/or smaller children, however, the restraints in various vehicles do not generally provide adequate protection; in some instances, restraints in vehicles may actually increase the risk of injury in the event of a collision. In view of the foregoing, to provide adequate protection for children during travel, parents and caregivers often utilize a child safety seat (also referred to herein as a "child restraint") when transporting a child in a vehicle.

Since a child typically experiences substantial physical development during their first years of life, different types of child safety seats are used to ensure that the child remains sufficiently restrained and protected during transport in a vehicle as the child grows. More specifically, a given child safety seat generally is selected, and installed in the vehicle in a certain manner, based on the size, weight, and/or age of the child.

Various government and regulatory bodies around the world recommend, specify, regulate and/or require different types of child safety seats based on these factors. One example of government guidance regarding child safety seats includes the document "Child Passenger Safety" published by the U.S. Centers for Disease Control (CDC) and Prevention and the National Center for Injury Prevention and Control, which publication is hereby incorporated by reference herein (see www.cdc.gov/injury/features/child-passenger-safety/index.html). Another relevant example of government oversight regarding child safety seats is given by the United Nations European Regional standard ECE R44/04, "Uniform provisions concerning the approval of restraining devices for child occupants of power-driven vehicles," which standard is hereby incorporated herein by reference. ECE R44/04 categorizes child safety seats into four groups (e.g., Group 0, Group 1, Group 2, and Group 3) based in part on various characteristics of the respect seats.

For instance, a "convertible" car seat (i.e., a "Group 0+" seat according to the United Nations European Regional standard ECE R44/04) is a type of child restraint that typically supports both an infant (i.e., a child who not learned to walk) and a toddler (i.e., a child who has learned how to walk). The convertible car seat generally supports both rear-facing and forward-facing configurations to accommodate the physical development of the child, which distinguishes the convertible car seat from other types of child safety seats that have dedicated rear-facing (e.g., an infant carrier) or forward-facing configurations (e.g., a belt positioning booster seat). Additionally, the convertible car seat is not portable, but is rather a stationary device that remains within the vehicle, i.e., the child is placed into and/or taken out of the convertible car seat at the beginning and end of a vehicle journey.

When installing a conventional convertible car seat into a vehicle, the car seat is typically configured by the parent and/or the caregiver only for the rear-facing configuration or the forward-facing configuration. For example, the car seat may include a base that is adjusted (e.g., via an adjustable foot) to accommodate the recline angle of a vehicle seat pan depending on the orientation of the base with respect to the vehicle seat in the rear-facing or forward-facing configurations. If a parent and/or a caregiver wishes to change the configuration (e.g., from a rear-facing configuration to a forward-facing configuration), the conventional convertible car seat should be uninstalled from the vehicle seat (i.e., the child restraint is physically removed from the vehicle seat), reconfigured based on the desired configuration, and subsequently reinstalled into the vehicle.

Conventional convertible car seats are typically limited to children weighing less than 65 lbs. Once the child outgrows the convertible car seat, the convertible car seat should then be replaced by an even larger seat (e.g., a Group 1 or Group 2 child safety seat, which is a permanent fixture in the vehicle and uses an adult seat belt to hold it in place), or ultimately a booster seat (i.e., a Group 3 seat, which also utilizes the vehicle's seat belts to restrain the child). The child may continue to use the booster seat until they are able to safely use the vehicle's seats and restraints without the aid of the booster seat.

SUMMARY

The Inventors have recognized and appreciated a convertible car seat provides parents and/or caregivers the convenience of a single child safety seat that is able to accommodate children for a longer period of time as they age and mature compared to other types of child safety seats. However, the Inventors have also recognized it is often difficult to properly and tightly install a conventional convertible car seat to a vehicle seat particularly when the child safety seat supports different types of installations to accommodate both rear-facing and forward-facing configurations.

First, the installation of a conventional convertible car seat often involves routing one or more vehicle belts or Lower Anchors and Tethers for CHildren (LATCH) belts through various openings in the car seat for securement to the vehicle seat. These openings may be configured only for a rear-facing or forward-facing configuration, but are often shaped and positioned to allow a vehicle or LATCH belt to pass through regardless of the orientation of the child restraint. As a result, conventional convertible car seats are often prone to being installed incorrectly, which, in some instances, may compromise the safety of the child. Second, conventional convertible car seats are also typically quite heavy due, in part, to the inclusion of a L-tube or a bulky plastic structure to structurally reinforce the seat shell, which may further exacerbate the difficulty of positioning the car seat onto the vehicle seat during installation and/or inserting or removing the car seat from the vehicle.

The Inventors have further recognized conventional convertible car seats are also typically cumbersome to use especially when putting a child into the convertible car seat and/or taking the child out of the convertible car seat. For example, when a convertible car seat is installed in a vehicle with a rear-facing configuration, the constraints and limited space between the car seat and the vehicle interior may make it difficult for a parent and/or a caregiver to lift a child over the side of the child restraint in order to place the child into the seat and/or to remove the child from the seat. The presence of the vehicle door jamb and roof may further increase the difficulty of maneuvering and positioning the child into or out of the car seat particularly as the child's weight and height increase as they grow older. These difficulties may ultimately encourage parents and/or caregivers to change the convertible car seat to a forward-facing configuration prematurely or, in some instances, remove the child restraint entirely, thus endangering the child.

Although a convertible car seat alleviates parents and/or caregivers from having to purchase different car seats during the first several years of their child's life, a conventional convertible car seat is typically only able to support a child weighing up to 65 lbs. Once a child exceeds 65 lbs, the parent and/or caregiver is typically required to replace the convertible car seat with a larger seat, such as a booster seat. Thus, a parent and/or a caregiver would still need to purchase and use multiple different child safety seats until the child is sufficiently large and/or heavy to sit on the vehicle seat without the aid of a child safety seat, resulting in greater costs and inconvenience for the parent and/or the caregiver.

The Inventors further recognize all-in-one child safety seats that have been previously demonstrated may also pose challenges for the parent and/or the caregiver when putting a child into or taking a child out of the car seat particularly when the safety seat is in a rear-facing configuration.

In view of the foregoing, the present disclosure is thus directed to various inventive implementations of a convertible child restraint (also referred to herein as a "convertible car seat") configured to support infants, toddlers, and young children requiring a belt positioning booster seat (e.g., children weighing less than or equal to about 100 pounds) with a rotatable seat for greater ease of access when placing the child into or out of the child restraint as well as several features to improve the ease of installation. The convertible child restraint may generally include a lower base to mount the child restraint to a vehicle seat, a mid base that provides recline adjustment with respect to the lower base via a recline mechanism, and a seat shell that is rotatable up to 360 degrees with respect to the mid base between a rear-facing and a forward-facing position via a rotation mechanism. In this manner, the convertible child restraint provides multiple degrees of freedom to adjust the orientation (rear-facing or forward-facing) and recline angle of the child without having to reposition and/or remove the base of the convertible child restraint from the vehicle. The convertible child restraint may utilize either a vehicle seat belt or a LATCH belt to securely couple the child restraint to a vehicle seat. The convertible child restraint may also include an integrated harness with an aloc strap to secure a child to the child restraint.

In one aspect, the convertible child restraint may incorporate several features to reduce or, in some instances, prevent improper installation of the child restraint in the rear-facing and/or forward-facing configurations. For example, the convertible child restraint may support dedicated rear-facing and/or forward-facing belt paths for each configuration (e.g., a rear-facing car seat, a forward-facing seat, a belt positioning booster seat), which, in some instances, may only be accessible and/or used when the seat shell is oriented in a rear-facing or forward-facing position, respectively.

For instance, the lower base and the mid base may define a rear-facing belt path (i.e., a path along which a belt may be place and/or routed when using the child restraint in a rear-facing configuration), which is preferably used when the child restraint is installed in a rear-facing configuration (e.g., the child restraint is supporting an infant or a toddler). To discourage a parent and/or a caregiver from using the rear-facing belt path when the child restraint is installed in a forward-facing configuration, the rear-facing belt path may pass through an interior portion of the mid base where at least a portion of the rear-facing belt path is rendered inaccessible by the seat shell when the seat shell is at a forward-facing position (i.e., the seat shell may make it more difficult to access to the interior portion of the mid base).

In order to access the portion of the rear-facing belt path within the mid base, the seat shell may include a belt access panel disposed on a seat pan of the seat shell towards the front end of the seat shell. When the seat shell is rotated to a rear-facing position, the belt access panel may be aligned with the portion of the rear-facing belt path within the mid base. Thus, when the belt access panel is opened, a belt access opening may be uncovered allowing a parent and/or a caregiver access to the portion of the rear-facing belt path disposed within the mid base. In this manner, the convertible child restraint may encourage the parent and/or the caregiver to use the rear-facing belt path only when the child restraint is installed in a rear-facing configuration.

The mid base may additionally include one or more openings disposed along the side and/or bottom portions of the mid base for the belt to pass into or out of the mid base when installing the child restraint using the rear-facing belt path. The opening(s) may be shaped, dimensioned, and/or positioned with respect to other features of the mid base (e.g., a belt locking arm, a rotation lockout) to further discourage a parent and/or a caregiver from routing a belt through the mid base along the rear-facing belt path by pushing or pulling the belt through the opening(s) when the belt access panel is closed and/or the seat shell is at a forward-facing position. For example, the openings may be positioned relative to the belt locking arm such that the belt would be forced to go around the belt locking arm when pushing the belt through the opening(s) of the mid base (i.e., the belt locking arm acts as an obstruction), thus making it more difficult for a parent and/or a caregiver to route a belt through the mid base along the rear-facing belt path when the belt access opening is not used (i e the child restraint is in a forward-facing configuration).

In some implementations, the mid base may further include a belt-tightening mechanism to secure the belt along the rear-facing belt path that is only accessible when the seat shell is at a rear-facing position. For example, the mid base may include a rear-facing belt locking arm (also referred to herein as a "lockoff arm" or a "rear-facing lockoff arm") to tighten and/or clamp the vehicle seat belt and/or LATCH belt to the mid base. The rear-facing belt locking arm may operate as a lever that displaces a portion of the belt to tighten the belt such that the belt is under tension when secured to the child restraint. For instance, when the rear-facing belt locking arm is in an open position, the belt may be laid across a portion of the mid base spanning a recess or a channel. Upon closing the rear-facing belt locking arm, the belt locking arm may press and/or or corrugate a portion of the belt into the recess or channel, thus tightening the belt against the child restraint. In some implementations, the rear-facing belt locking arm may only be opened when the seat shell is at a rear-facing position (i.e., the belt locking arm may interfere with the seat shell when the seat shell is at a forward-facing position).

In some implementations, the belt access opening may be dimensioned to be sufficiently large (e.g., at least 4.5 inches wide) to provide sufficient access for a parent and/or a caregiver to route a belt through the mid base and sufficient leverage to secure and tighten the belt to the mid base. The mid base and/or the seat shell may also be shaped and/or dimensioned to provide sufficient clearance for different parts of a belt to pass through the mid base and/or to reduce, or, in some instances, prevent interference with various features that couple the belt to the child restraint, such as a belt locking arm. For example, a vehicle seat belt may include a belt buckle, a belt tongue, multiple overlapping straps, and/or a convenience button (also referred to as a vehicle belt button), which provides a mechanical stop to limit the extent the belt is retracted into the vehicle when the belt is not in use. The clearance provided by the mid base and/or the seat shell when the seat shell is at a rear-facing position may allow these various features to pass through and/or be disposed within the mid base without affecting the operation of the child restraint (e.g., recline or rotational adjustment, tightening the belt to the child restraint).

In some implementations, the rear-facing belt path may be symmetric about a plane bisecting the child restraint where the plane intersects the front and rear portions of the child restraint. In some implementations, the rear-facing belt path may be preferably positioned near the rear and bottom portions of the lower base to accommodate a variety of vehicle stalk lengths and/or to reduce the displacement of the child restraint between the child restraint and the vehicle seat in the event of a crash. In some implementations, the rear-facing belt path may be preferably positioned near a center of gravity of the child restraint and the child to reduce the displacement of the child restraint and/or the child in the event of a crash. In some implementations, the rear-facing belt path may be positioned above a recline mechanism in the child restraint, which may enable reductions to the size and/or weight of the recline mechanism and/or lower the center of gravity of the child restraint.

The seat shell may also define a forward-facing belt path (i.e., a path along which a belt may be place and/or routed when using the child restraint in a forward-facing configuration) where the belt only couples the child restraint to a vehicle seat, which is preferably used when the child restraint is installed in a forward-facing configuration and a separate harness is used to restrain the child (e.g., the child restraint is supporting a toddler). The seat shell may include one or more openings disposed along opposing sides of the seat shell near a seatback section and, in particular, a seatback insert, supporting a back of the child. When the child restraint is installed onto the vehicle seat, the belt may pass through the opening(s) and placed against the seatback insert. After the child restraint is installed, the belt may restrict rotational adjustment of the seat shell. The seat shell may further include a forward-facing belt locking arm (also referred to herein as a "lockoff arm" or a "forward-facing lockoff arm") disposed on the seatback insert to clamp and tighten the belt against the seatback insert of the seat shell. Similar to the rear-facing belt locking arm, the forward-facing belt locking arm may be a lever that presses and/or corrugates a portion of the belt into a recess or a channel in the seatback insert to tighten the belt against the child restraint.

The seat shell may further define a forward-facing belt path where the belt couples the child restraint to a vehicle seat and restrains the child, which is preferably used when the child restraint is installed in a forward-facing configuration (e.g., the child restraint is used as a belt positioning booster to support a child larger and/or heavier than a toddler). The forward-facing belt path for the belt positioning booster configuration may be substantially different from the forward-facing belt path for the toddler configuration. The seat shell may include one or more notches disposed along opposing sides of the seat shell near a seat pan of the seat shell where the child's thighs would be located when the child is placed into the child restraint. The notches may define a portion of the forward-facing belt path where a lap strap of a vehicle seat belt is routed. The seat shell may further include a headrest with one or more openings defining another portion of the forward-facing belt path along which a shoulder strap of the vehicle seat belt is routed. In some implementations, the headrest may provide multiple openings to accommodate shoulder straps located on the right or left sides of the vehicle seat. After the child restraint is installed, the belt may restrict rotational adjustment of the seat shell.

In some implementations, the different installation configurations may be chosen based, in part, on the child's size and/or weight. For example, the convertible child restraint installed in the rear-facing configuration may support a child weighing less than or equal to about 40 lbs. The convertible child restraint installed in a forward-facing configuration where a separate harness is used to restrain the child may support a child weighing between about 22 lbs and about 65 lbs. The convertible child restraint installed in a forward-facing configuration where a vehicle seat belt is used to couple the child restraint to the vehicle and restrain the child may support a child weighing between about 40 lbs and about 100 lbs. It should be further appreciated that the child restraint may generally include one, two, or three belt paths selected from the rear-facing belt path for the rear-facing car seat configuration and the two forward-facing belt paths for the forward-facing car seat and belt positioning booster seat configurations.

In another example, the convertible child restraint may include a rotation lockout mechanism that limits the range of rotation of the seat shell when the child restraint is installed in the rear-facing configuration. When actuated, the rotation lockout may prevent the seat shell from being rotated from a rear-facing position to a forward-facing position so that the rear-facing belt path may not be used to support a forward-facing configuration. In some implementations, the rotation lockout may not lock the rotational position of the seat shell, but instead may still allow the seat shell to be rotated to a side-facing position to provide greater ease of access when putting a child into or taking a child out of the child restraint. For instance, the rotation lockout mechanism may allow the seat shell to be rotated from 0 degrees corresponding to a rear-facing position to +/−120 degrees to accommodate installations on the left or right sides of the vehicle.

In some implementations, the rotation lockout may be a spring-biased mechanism configured to engage one or more rotation stops when the child restraint is installed in a rear-facing configuration. In some implementations, the rotation lockout may be actuated by the belt being pressed against one end of the rotation lockout (e.g., a plunger end) when the belt is tightened to the child restraint via the rear-facing belt locking arm. When the belt is removed from the child restraint, the spring(s) may disengage the rotation lockout from the rotation stop(s), thus allowing the seat shell to rotate freely 360 degrees (e.g., from the rear-facing position to the forward-facing position or vice-versa).

In yet another example, the convertible child restraint may include a lock pin mechanism disposed within the seat shell to lock the rotational position of the seat shell with respect to the mid base. The lock pin mechanism may include one or more lock pins that are each configured for insertion into respective openings disposed along a top side of the mid base. In some implementations, the openings in the mid base may be arranged to receive a lock pin only when the seat shell is at either a rear-facing or forward-facing position. The lock pin may be coupled to a spring that retains the lock pin in one of the openings of the mid base. The lock pin may be further coupled to one or more actuation handles. When the parent and/or caregiver wants to rotate the seat shell, they may actuate one of the actuation handle(s), which releases the lock pin from the opening in the mid base, thus allowing the seat shell to be rotated accordingly. In some implementations, the actuation handle may also include a secondary lock to make it more difficult for the child and/or a non-occupant (e.g., a passenger of the vehicle) within the vehicle to actuate the actuation handle especially while the vehicle is being operated.

In yet another example, different portions of the convertible child restraint may be color-coded and/or labeled to provide visual indications and/or instructions to the parent and/or caregiver as to the proper installation of the child restraint for the particular configuration of interest (e.g., rear-facing car seat, forward-facing car seat, belt positioning booster seat configurations). For instance, a rear portion of the lower base (e.g., a hinged door or back panel) may be labeled to indicate the rear portion should be placed against a vehicle seatback. The different rear-facing and forward-facing belt paths may also be color coded to better distinguish which belts paths should be used based on the desired configuration of the child restraint.

In another aspect, the rotation mechanism may include a turn ring mounted to the seat shell and one or more brackets mounted to the mid base. The turn ring may be rotatably coupled to the bracket(s) to facilitate rotational displacement of the seat shell with respect to the mid base. In some implementations, the bracket(s) may constrain the turn ring to only rotate about a single rotation axis corresponding to the rotational degree of freedom of the seat shell. In this manner, the turn ring may resist and/or efficiently transfer the forces applied to the child restraint during a crash event regardless of the rotational position of the turn ring and, by extension, the seat shell. In some implementations, the rear-facing belt path may be disposed between the recline mechanism in the lower base/mid base and the turn ring. At least one bracket in the mid base may be further disposed directly below the rear-facing belt path. In this manner, forces applied to the seat shell and/or the child may be more readily transferred from the seat shell to the vehicle seat belt and/or LATCH belt via the turn ring and the bracket(s).

The turn ring may also define a sufficiently large opening such that a portion of the seat shell (e.g., the seat pan) may pass through the opening, thus allowing the seat shell to be disposed closer to the lower base thereby lowering the center of gravity and/or reducing the overall envelope or size of the child restraint.

In another aspect, the recline mechanism may provide recline adjustment of the seat shell with respect to the lower base. In some implementations, the recline mechanism may obviate the need for secondary recline features, such as an adjustable foot. In some implementations, a recline angle defined between a representative plane of the seatback section of the seat shell and a horizontal reference plane may range between about 40 degrees and about 70 degrees for both rear-facing and forward-facing configurations. In some implementations, the lower base and/or the mid base may be shaped to provide an offset angle of about 13 degrees (i.e., the rotation plane of the child restraint may be tilted by the offset angle). As a result, the recline angle of the seat shell may be different for a given recline position depending on whether the seat shell is at a rear-facing or forward-facing position. For example, the seat shell may position a child at a recline angle of about 45 degrees for a rear-facing configuration and about 65 degrees for a forward-facing configuration at a given recline position when installed in a vehicle. The recline angle may be adjusted with a range of about 15 degrees. For example, the child restraint may provide a recline angle ranging between about 34 degrees and about 49 degrees for a rear-facing configuration and between about 59 degrees and about 74 degrees for a forward-facing configuration.

In some implementations, the recline mechanism may be mechanically decoupled from the rotation mechanism such that the recline position of the seat shell may be adjusted independently from the rotational position of the seat shell. Additionally, the rear-facing belt path may be accessible via the belt access panel on the seat shell when the seat shell is at a rear-facing position regardless of the recline angle of the seat shell. The recline mechanism may be generally disposed below the rotation mechanism and/or the rear-facing belt path. In some implementations, the recline mechanism may define two or more indexed recline positions (preferably at least four indexed recline positions) to support the seat shell. In other words, the recline mechanism may not support a continuous range of recline positions, but instead the parent and/or caregiver should select a recline position from a limited number of recline positions.

In some implementations, the recline mechanism may include an actuated mechanism configured to occupy less space compared to conventional recline mechanisms, and, hence, providing more clearance for other features in the child restraint (e.g., the rotation mechanism) without increasing the overall size and/or envelope of the child restraint. The actuated mechanism may include a pair of rails disposed on the lower base having one or more openings and/or slots corresponding to the indexed recline positions. A pair of lock pins disposed within the mid base may each be inserted into respective openings of each rail to secure the seat shell at a particular recline position and/or removed from the openings of each rail to change the recline position of the seat shell. Each lock pin may be coupled to an actuation handle via a flexible member (e.g., a band, a strap, a cable). When the actuation handle is actuated (e.g., translated), the flexible member may move along a guide path causing the lock pin to be removed from the opening in the rail, which in turn allows the recline position of the seat shell to be changed. The guide path for each flexible member may be preferably curved to reduce the frictional resistance between the flexible member and the various features of the mid base defining the guide path. To reduce the space the flexible members occupy within the mid base, the guide path of one flexible member may overlap the guide path of another flexible member (e.g., the guide paths are curved along opposing directions). This allows the distance between the pair of rails to be less than or equal to about 5.5 inches.

In some implementations, the seatback insert of the seatback section may form a triangular structure with a seatback or rear portion of the seat shell and the turn ring of the rotation mechanism. In this manner, the seatback insert part may structurally reinforce the seat shell. In some implementations, the inclusion of the seatback insert may allow the child restraint to exclude other structural features, such as tubing (e.g., metal tubing, L tubing, a bulky plastic box structure), thus reducing the overall weight of the child restraint and/or allowing the child to be placed lower towards the vehicle seat pan, which, in turn, lowers the center of gravity. In some implementations, the seatback insert part may also provide a track to adjust the headrest. In some implementations, the distance between the seat pan of the seat shell and a bottom portion of the headrest may be adjustable between about 8.8 inches and about 18.7 inches.

In another aspect, the child restraint may include the LATCH belt, which may be attached to the lower base via a tether strap to prevent the removal and/or loss of the LATCH belt as well as to adhere to various regulatory requirements. When a vehicle seat belt is used to couple the child restraint to a vehicle seat, the LATCH belt may be stored within a storage compartment disposed in the lower base. The storage compartment may be accessible via a hinged door located on a back cover of the lower base.

In another aspect, the child restraint may include an integrated harness to restrain the child when the child restraint is used to support an infant or a toddler. The integrated harness may include an aloc strap that is routed underneath the seat pan of the seat shell and behind the seatback insert to secure the harness to the seat shell. To reduce the likelihood that the harness and, in particular, the aloc strap catches on various interior structural features of the mid base as the seat shell is rotated, the mid base may include one or more shields covering at least a portion of the mid base interior to provide a surface for the aloc strap to slide along. In some implementations, the seat shell may further include one or more belt routing features that retain the aloc strap tight against the seat shell (i.e., the aloc strap is less likely to sag) to reduce or, in some instances, prevent the aloc strap from catching on the various features of the mid base.

The convertible child restraint may be generally shaped and/or dimensioned to occupy a volume of about 7 cubic feet with an envelope that is compatible with various types of vehicle seats and/or vehicles. In some implementations, the convertible child restraint may weigh less than about 28 lbs.

In some implementations, the convertible child restraint may further include a level indicator to guide the adjustment of the recline angle of the seat shell for both rear-facing and forward-facing configurations. The level indicator may be mounted to the seat shell to provide the parent and/or the caregiver the recline angle of the seat shell, particularly after the child restraint is placed onto a vehicle seat, which may be reclined at various angles as well. The level indicator may be a bubble level indicator or a ball indicator.

In one exemplary implementation, a child restraint for a vehicle includes a base having a rear portion configured to abut a portion of a vehicle seatback of a vehicle seat in the vehicle when the child restraint is installed into the vehicle and a seat shell, rotatably coupled to the base such that the base remains stationary while the seat shell rotates with respect to the base, to support a child. The seat shell includes a front side and a rear side and being rotatable relative to the base between (1) a rear-facing position where the front side of the seat shell is closer to the rear portion of the base than the rear side of the seat shell and (2) a forward-facing position where the rear side of the seat shell is closer to the rear portion of the base than the front side of the seat shell. The seat shell includes one or more first forward belt path features that define, in part, a first forward-facing belt path where the one or more first forward belt path features is configured to receive a belt to couple the child restraint to the vehicle seat and restrain the child in the seat shell when the child restraint is installed into the vehicle, the seat shell is at the forward-facing position, and the belt is a vehicle seat belt.

In another exemplary implementation, a child restraint for a vehicle includes a base having a rear portion configured to abut a portion of a vehicle seatback of a vehicle seat in the vehicle when the child restraint is installed into the vehicle and a seat shell, rotatably coupled to the base such that the base remains stationary while the seat shell rotates with respect to the base, to support a child. The seat shell has a front side and a rear side and is rotatable relative to the base between (1) a rear-facing position where the front side of the seat shell is closer to the rear portion of the base than the rear side of the seat shell and (2) a forward-facing position where the rear side of the seat shell is closer to the rear portion of the base than the front side of the seat shell. The base further includes one or more rear belt path features that define, in part, a rear-facing belt path where the rear belt path features is configured to receive a belt to couple the child restraint to the vehicle seat when the child restraint is installed into the vehicle and the seat shell is at the rear-facing position. Furthermore, at least one of the one or more rear belt path features is accessible only when the seat shell is at the rear-facing position.

In another exemplary implementation, a child restraint includes a lower base having a rear portion configured to abut a portion of a vehicle seatback of a vehicle seat in the vehicle when the child restraint is installed into the vehicle, a seat shell to support a child, and a mid base disposed between the lower base and the seat shell, coupled to the lower base via a recline mechanism that adjusts a recline position of the mid base with respect to the lower base, and coupled to the mid base via a rotation mechanism to adjust a rotational position of the seat shell with respect to the lower base such that the lower base remains stationary while the seat shell rotates with respect to the lower base. The seat shell has a front side and a rear side and is rotatable relative to the lower base between (1) a rear-facing position where the front side of the seat shell is closer to the rear portion of the lower base than the rear side of the seat shell and (2) a forward-facing position where the rear side of the seat shell is closer to the rear portion of the lower base than the front side of the seat shell. In this implementation, the seat shell is not removable from the mid base and the rotation mechanism and the recline mechanism are decoupled such that the rotational position of the seat shell is adjustable independent of the recline position of the mid base. The rotation mechanism comprises at least one rotation stop and the mid base comprises a rotation lockout that engages the at least one rotation stop only when the child restraint is installed into the vehicle and the seat shell is in the rear-facing position so as to limit a range of rotation of the seat shell where the seat shell is not rotatable from the rear-facing position to the forward-facing position.

In another exemplary implementation, a child restraint for a vehicle includes a base having a rear portion configured to abut a portion of a vehicle seatback of a vehicle seat in the vehicle when the child restraint is installed into the vehicle and a seat shell, rotatably coupled to the base such that the base remains stationary while the seat shell rotates, to support a child. The base has one or more rear belt path features defining a rear-facing belt path where the one or more rear belt path features is configured to receive a belt to couple the child restraint to the vehicle seat when the child restraint is installed into the vehicle. The seat shell has a front side and a rear side and is rotatable relative to the base between (1) a rear-facing position where the front side of the seat shell is closer to the rear portion of the base than the rear side of the seat shell and (2) a forward-facing position where the rear side of the seat shell is closer to the rear portion of the base than the front side of the seat shell. The seat shell further includes a seat pan and a belt access panel, disposed on a front portion of the seat pan, to provide access to a portion of the rear-facing belt path disposed within the base only when the seat shell is at the rear-facing position.

In another exemplary implementation, a child restraint for a vehicle includes a base having a rear portion configured to abut a portion of a vehicle seatback of a vehicle seat in the vehicle when the child restraint is installed into the vehicle, a seat shell, rotatably coupled to the base such that the base remains stationary while the seat shell rotates, to support a child, and a locking mechanism, coupled to the seat shell, to lock the seat shell to the base. The seat shell has a front side and a rear side and is rotatable relative to the base between (1) a rear-facing position where the front side of the seat shell is closer to the rear portion of the base than the rear side of the seat shell and (2) a forward-facing position where the rear side of the seat shell is closer to the rear portion of the base than the front side of the seat shell. The locking mechanism includes a first actuation handle and a secondary lock coupled to the first actuation handle such that the seat shell is rotatably adjustable with respect to the base only when the first actuation handle and the secondary lock are actuated at the same time.

In another exemplary implementation, a child restraint for a vehicle includes a lower base configured to abut a portion of a vehicle seat in the vehicle when the child restraint is installed into the vehicle, a seat shell to support a child, and a mid base disposed between the lower base and the seat shell and coupled to the lower base via a recline mechanism. The recline mechanism includes a pair of rails disposed on the lower base, a pair of lock pins, disposed within the mid base, where each lock pin engages one of the pair of rails, a first flexible member coupled to one of the pair of lock pins and disposed within the mid base along a first path, a second flexible member coupled to a remaining one of the pair of lock pins and disposed within the mid base along a second path where the second path overlapping the first path, and an actuation handle, coupled to the first flexible member and second flexible member, to disengage the pair of lock pins from the pair of rails when the actuation handle is actuated.

In another exemplary implementation, a child restraint for a vehicle includes a lower base having a rear portion configured to abut a portion of a vehicle seatback of a vehicle seat in the vehicle when the child restraint is installed into the vehicle where the lower base has a storage compartment disposed on the rear portion. The child restraint further includes a Lower Anchors and Tethers for CHildren (LATCH) belt, coupled to the lower base, to secure the child restraint to the vehicle seat where the LATCH belt being stored in the storage compartment when the LATCH belt is not in use. The child restraint further includes a mid base coupled to the lower base via a recline mechanism that adjusts a recline position of the mid base with respect to the lower base where the recline mechanism defines at least four indexed recline positions where the recline position of the mid base corresponds to one of the at least four indexed recline positions. The mid base and the lower base includes one or more rear belt path features that define, in part, a rear-facing belt path where the one or more rear belt path features is configured to receive one of a vehicle seat belt or the LATCH belt to couple the child restraint to the vehicle seat when the child restraint is installed into the vehicle in a rear-facing configuration. The mid base further includes a first belt locking arm to securely couple one of the vehicle seat belt or the LATCH belt to the mid base when the rear-facing belt path is used to install the child restraint into the vehicle and a rotation lockout, coupled to the first belt locking arm, that is actuated by the first belt locking arm pressing one of the vehicle seat belt or the LATCH belt against the rotation lockout only when the rear-facing belt path is used to install the child restraint into the vehicle. The child restraint further includes a seat shell, rotatably coupled to the mid base via a rotation mechanism such that the lower base remains stationary while the seat shell rotates, to support a child. The seat shell has a front side and a rear side and is rotatable relative to the lower base between (1) a rear-facing position where the front side of the seat shell is closer to the rear portion of the lower base than the rear side of the seat shell and (2) a forward-facing position where the rear side of the seat shell is closer to the rear portion of the lower base than the front side of the seat shell. The seat shell further includes a seat pan to support thighs of the child, a seatback section, coupled to the seat pan, to support a back of the child, a first side coupled to the seat pan and the seatback section, an adjustable headrest, disposed on a seatback section, to support a head of the child, at least one first opening, disposed on the first side, defining, in part, a first forward-facing belt path different from the rear-facing belt path, the at least one first opening configured to receive one of the vehicle seat belt or the LATCH belt to couple the child restraint to the vehicle seat when the child restraint is installed into the vehicle and the seat shell is in the forward-facing configuration, at least one notch disposed on the first side of the seat shell, at least one second opening disposed on the adjustable headrest where the at least one second opening and the at least one notch defining, in part, a second forward-facing belt path different from the first forward-facing belt path and the rear-facing belt path where the at least one second opening and the at least one notch is configured to receive the vehicle seat belt to couple the child restraint to the vehicle seat and restrain the child in the seat shell when the child restraint is installed into the vehicle and the seat shell is in the forward-facing configuration, a belt access panel, disposed on a front portion of the seat pan, to provide access to the first belt locking arm only when the seat shell is at the rear-facing position, and a second belt locking arm, disposed on the seatback section, to securely couple one of the vehicle seat belt or the LATCH belt to the seat shell when the first forward-facing belt path is used to install the child restraint into the vehicle. The rotation mechanism further includes at least one rotation stop and the rotation lockout engages the at least one rotation stop only when the child restraint is installed into the vehicle and the seat shell is at the rear-facing position so as to limit a range of rotation of the seat shell where the seat shell is not rotatable from the rear-facing position to the forward-facing position.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 43A shows a top perspective view of the lower base and the mid base of the convertible child restraint of FIG. 1. The seat shell is not shown for clarity.

DETAILED DESCRIPTION

Following below are more detailed descriptions of various concepts related to, and implementations of, a convertible child restraint that supports multiple installation configurations (e.g., rear-facing car seat, forward-facing car seat, belt positioning booster seat) to accommodate children of varying size and weight, different belt paths to facilitate proper installation of the child restraint, and a seat shell that is rotatable between rear-facing, side-facing, and forward-facing positions for ease of use. It should be appreciated that various concepts introduced above and discussed in greater detail below may be implemented in multiple ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of inventive convertible child restraints are provided, wherein a given example or set of examples showcases one or more particular features of a lower base, a mid base, a seat shell, a recline mechanism, a rotation mechanism, a lockout mechanism, a turn ring, a seatback insert, a belt locking arm, and a lock pin mechanism. It should be appreciated that one or more features discussed in connection with a given example of a convertible child restraint may be employed in other examples of convertible child restraints according to the present disclosure, such that the various features disclosed herein may be readily combined in a given convertible child restraint according to the present disclosure (provided that respective features are not mutually inconsistent).

First Examples of a Convertible Child Restraint with a Rotatable Seat

Figure 1:
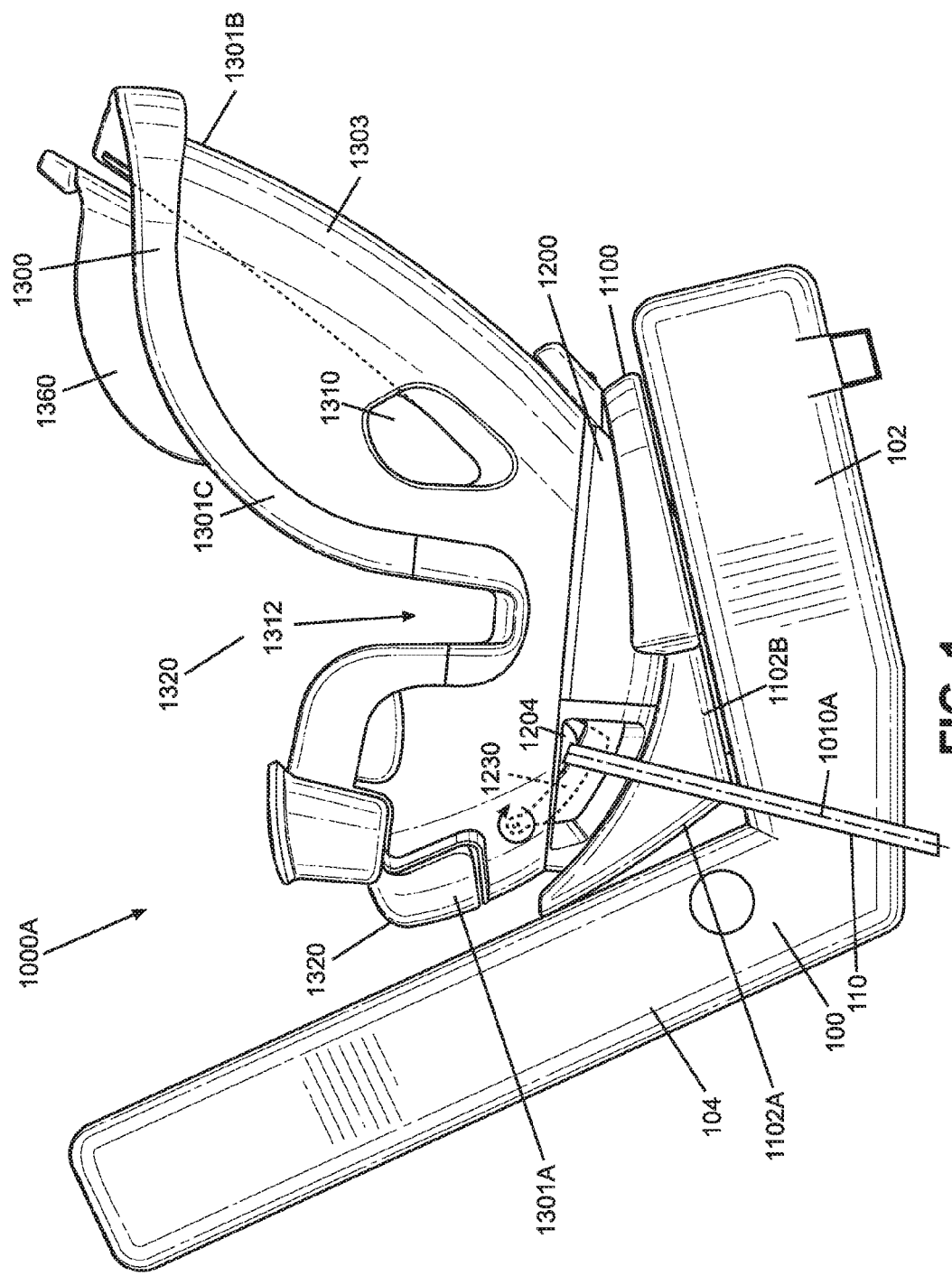
FIG. 1 shows a side view of an exemplary convertible child restraint installed onto a vehicle seat in a rear-facing configuration.

FIG. 1 shows an exemplary convertible child restraint (CR) 1000a mounted to a vehicle seat 100 in a rear-facing configuration to preferably support an infant or a toddler with a harness (not shown). As shown, the child restraint 1000a may include a lower base 1100 that abuts a vehicle seat pan 102 and a vehicle seatback 104, a mid base 1200 coupled to the lower base 1100 via a recline mechanism 1120, and a seat shell 1300 coupled to the mid base 1200 via a rotation mechanism 1332 to support a child. FIG. 1 further shows the child restraint 1000a may be secured to the vehicle seat 100 using a belt 110. The belt 110 may generally be a vehicle seat belt or a LATCH belt depending on the desired installation configuration. In some implementations, the child restraint 1000a may occupy a volume less than or equal to approximately 7 cubic feet. The child restraint 1000a may also weigh less than approximately 28 pounds.

In the rear-facing configuration, a front side 1301a of the seat shell 1300 is positioned near a rear portion 1102a of the lower base 1100 while a rear side 1301b of the seat shell 1300 is positioned further away from the rear portion 1102a. In other words, the seat shell 1300 is oriented such that the child is facing the vehicle seatback 104 of the vehicle seat 100. The belt 110 may thus be routed along a rear-facing belt path 1010a, which is defined by the mid base 1200 and the lower base 1100, for securement to the vehicle seat 100. For example, FIG. 1 shows the mid base 1200 may include openings 1204 that allow the belt 110 to be routed through an interior portion of the mid base 1200 when the seat shell 1300 is at the rear-facing position.

Figure 2:
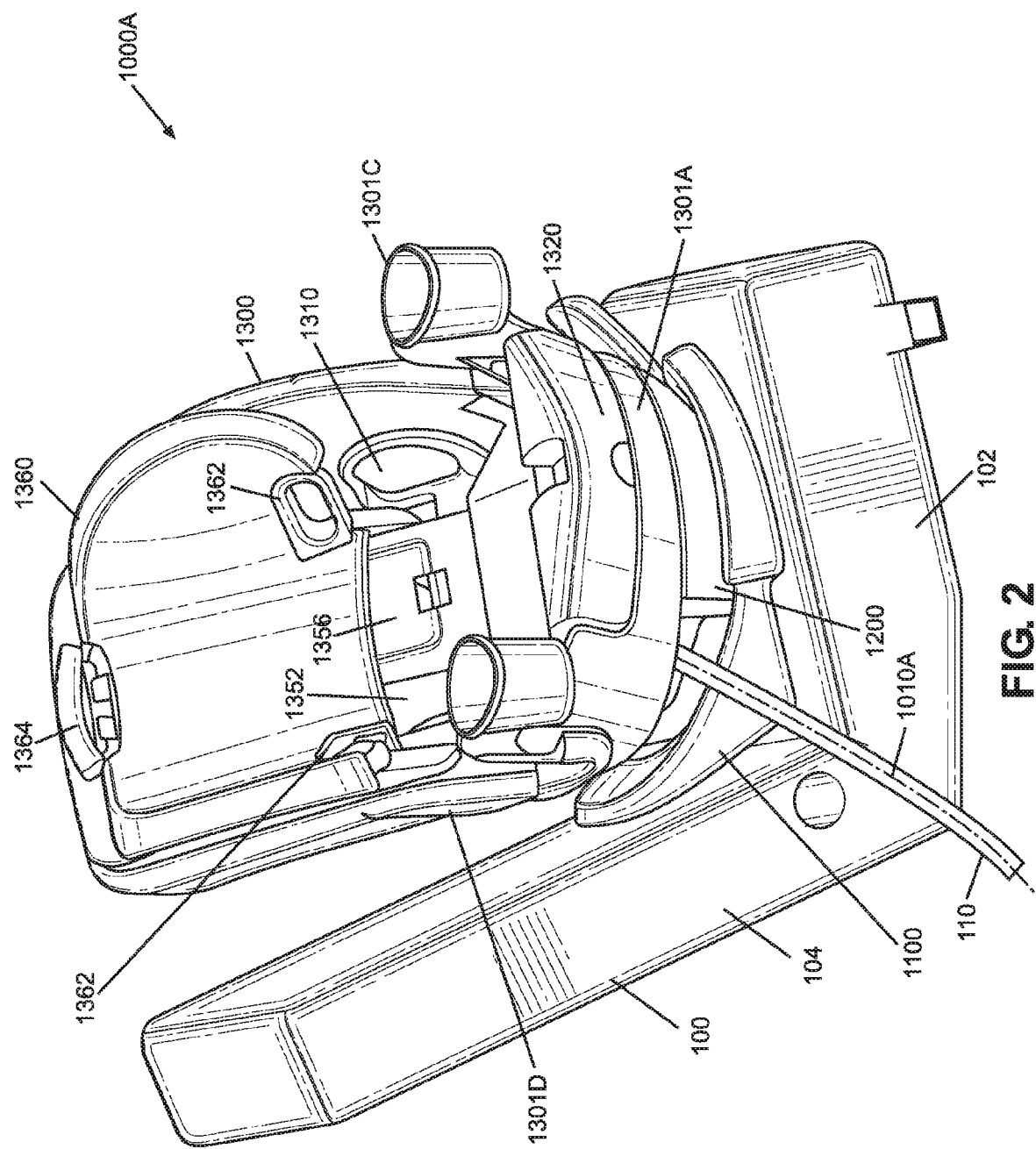
FIG. 2 shows a side view of the convertible child restraint of FIG. 1 rotated to a side-facing position.

In some implementations, the rear-facing belt path 1010a may be positioned such that the belt 110 only constrains the mid base 1200 and/or the lower base 1100 when the child restraint 1000a is installed in the rear-facing configuration. This allows the seat shell 1300 to remain rotatable via the rotation mechanism 1332 even after the child restraint 1000a is installed onto the vehicle seat 100 in the rear-facing configuration. For example, the seat shell 1300 may be rotated from the rear-facing position to a side-facing position so that a parent and/or a caregiver may more easily place a child into the child restraint 1000a or take a child out of the child restraint 1000a without having to reposition and/or remove the child restraint 1000a from the vehicle seat 100. FIG. 2 shows the child restraint 1000a of FIG. 1 where the seat shell 1300 is rotated to a right-side facing position. It should be appreciated the seat shell 1300 may also be rotated to a left-side facing position as well to accommodate installations onto different rear seats of a vehicle. As shown, the seat shell 1300 may be rotated while the lower base 1100 and the mid base 1200 remain stationary.

In some implementations, the mid base 1200 may further include a rotation lockout 1220, which will be described in more detail below, to limit the range of rotation of the seat shell 1300 when the child restraint 1000a is installed in the rear-facing configuration. For example, the rotation lockout 1220 may prevent rotation of the seat shell 1300 from the rear-facing position to a forward-facing position when engaged. In this manner, a parent and/or a caregiver may be discouraged or, in some instances, prevented from using the rear-facing belt path 1010a to support a forward-facing configuration. When the child restraint 1000a is uninstalled from the rear-facing configuration, the rotation lockout 1220 may be disengaged such that the seat shell 1300 is freely rotatable with respect to the mid base 1200 (e.g., the seat shell 1300 may rotate 360 degrees).

The mid base 1200 may further include various features (e.g., a belt locking arm 1230, a rotation lockout 1220) defining a portion of the rear-facing belt path 1010a, which are only accessible when the seat shell 1300 is at the rear-facing position, thus further discouraging improper use of the rear-facing belt path 1010a to support a forward-facing configuration. These features will be described in more detail below.

In some implementations, the lower base 1100 and the mid base 1200 may position the rear-facing belt path 1010a so that the belt 110 is placed towards the rear portion 1102a and a bottom portion 1102b of the lower base 1100. In this manner, the child restraint 1000a may accommodate a variety of vehicle stalk lengths. Additionally, the distance between the anchor point on the child restraint 1000a (e.g., the point or area where the belt 110 contacts the child restraint 1000a) and the vehicle anchor point (e.g., the point or area where the belt 110 is rigidly coupled to the vehicle seat 100) of the vehicle seat 100 may be reduced, which may reduce the displacement of the child restraint 1000a relative to the vehicle seat 100 in the event of a crash. In some implementations, the rear-facing belt path 1010a may be positioned near the center of gravity of the child restraint 1000a and the child in order to reduce the displacement of the child and/or the child restraint 1000a relative to the anchor point on the child restraint 1000a. In some implementations, the rear-facing belt path 1010a may also be symmetric about a plane bisecting the child restraint 1000a and intersecting the front side 1301a and rear side 1301b (see, for example, FIGS. 43A and 43C).

Figure 3A:
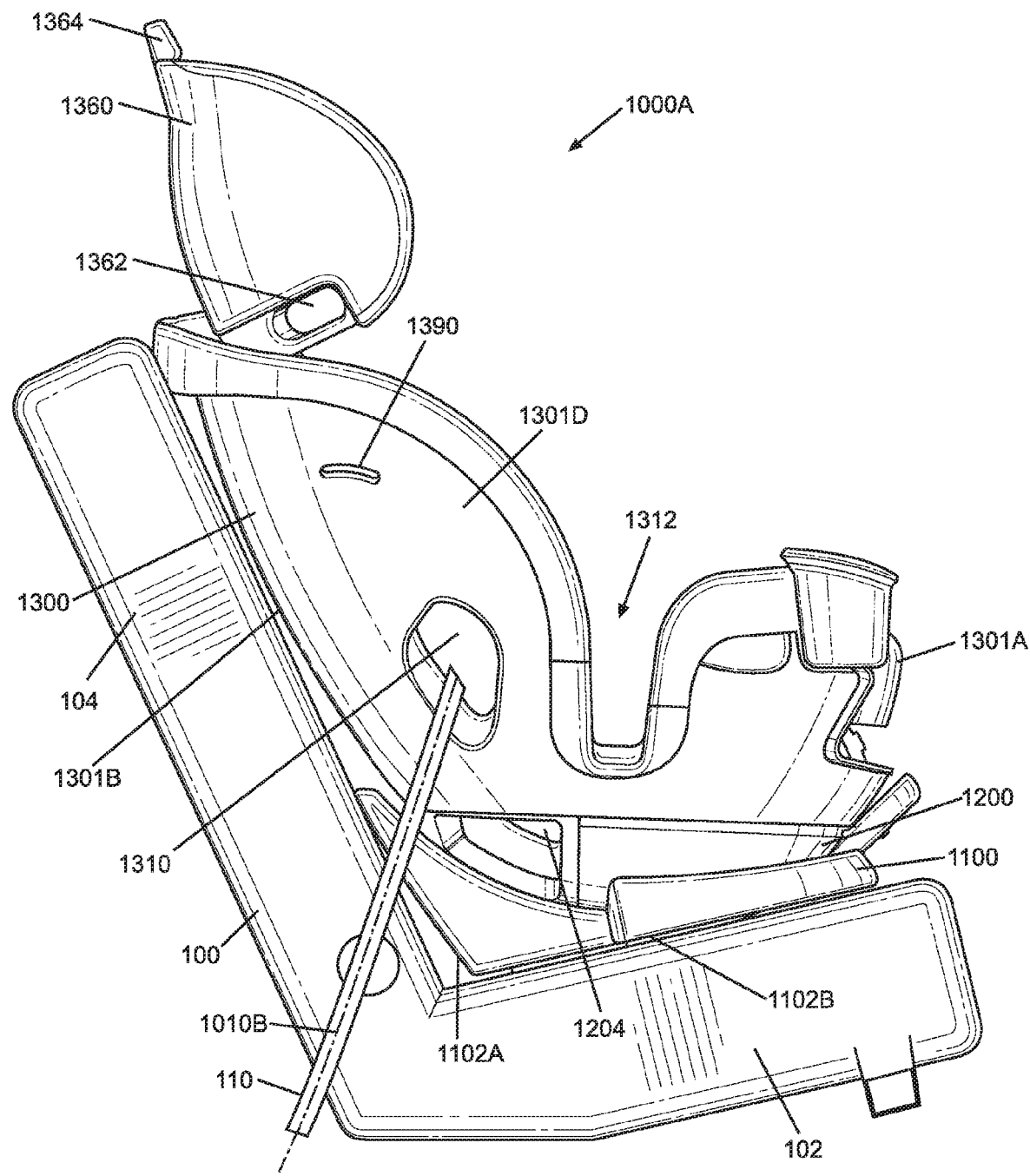
FIG. 3A shows a side view of the convertible child restraint of FIG. 1 installed onto a vehicle seat in a forward-facing configuration via a belt where the belt is only used to secure the child restraint to the vehicle seat.

The child restraint 1000a may also be installed in a forward-facing configuration (i.e., the rear side 1301b of the seat shell 1300 is closer to the rear portion 1102a of the lower base 1100 than the front side 1301a) to support a toddler and/or a larger or heavier child requiring a belt positioning booster. For example, FIG. 3A shows the child restraint 1000a installed in a forward-facing configuration for use with a separate harness (not shown) to restrain the child. As shown, the seat shell 1300 may include one or more openings 1310 disposed along one or both of the sides 1301c and 1301d of the seat shell 1300, which define, in part, a forward-facing belt path 1010b.

The openings 1310 may be positioned towards the rear side 1301b of the seat shell 1300 such that the openings 1310 align with a seatback section 1303 and, in particular, a seatback insert 1350 supporting a child's back. In this manner, the belt 110 may be routed through the openings 1310 and placed against the seatback insert 1310. In other words, the belt 110 is only used to secure the child restraint 1000a to the vehicle seat 100 and not to restrain the child. The child may instead be secured to the seat shell 1300 using a harness (not shown).

Figure 3B:
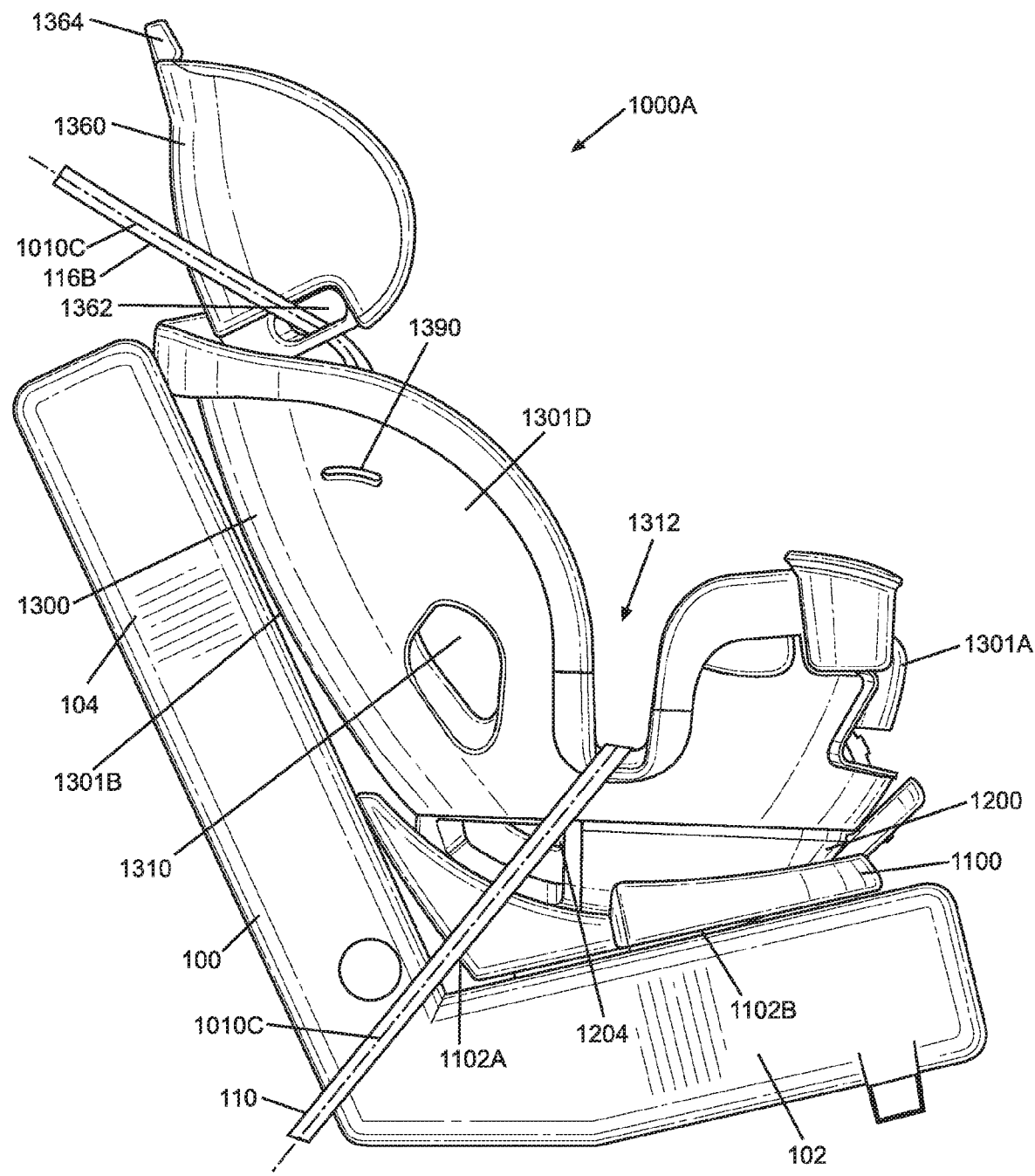
FIG. 3B shows a side view of the convertible child restraint of FIG. 1 installed onto a vehicle seat in a forward-facing configuration via a belt where the belt is used to secure the child restraint to the vehicle seat and restrain a child.

In another example, FIG. 3B shows the child restraint 1000a installed in a forward-facing configuration via a forward-facing belt path 1010c to support a child requiring a belt positioning booster. For this configuration, the belt 110 may be a vehicle seat belt that secures the child restraint 1000a to the vehicle seat 100 and restrains the child to the child restraint 1000a. The vehicle seat belt typically includes a lap strap 116a covering the lower waist and/or thighs of the child and a shoulder strap 116b to cover the upper body of the child. To accommodate the different parts of the vehicle seat belt, the seat shell 1300 may include one or more notches 1312 disposed along one or both of the sides 1301c and 1301d of the seat shell 1300 defining a portion of the forward-facing belt path 1010c to support at least the lap strap 116a and possibly the part of the shoulder strap 116b joined to a belt tongue (not shown). The seat shell 1300 may further include an adjustable headrest 1360 with one or more openings 1362 defining another portion of the forward-facing belt path 1010c to support the shoulder strap 116b. In this manner, the forward-facing belt path 1010c may emulate a typical vehicle seat belt arrangement to restrain an adult on the vehicle seat 100.

As shown in FIGS. 3A and 3B, the forward-facing belt path 1010c may be different from the forward-facing belt path 1010b and, in some instances, may not even overlap with one another when the child is placed into the child restraint 1000a. However, when either of the forward-facing belt paths 1010b or 1010c are used, the belt 110 may limit or, in some instances, prevent the rotation of the seat shell 1300.

In some implementations, the child restraint 1000a may support the rear-facing belt path 1010a and both the forward facing belt paths 1010b and 1010c in order provide parents and/or caregivers the ability to use the child restraint 1000a in various configurations as the child physically develops and ages. However, it should be appreciated other inventive child restraints may include only one or two belt paths selected from the rear-facing belt path 1010a and the forward-facing belt paths 1010b and 1010c. For example, the child restraint may be configured to only support infants and toddlers and, hence, may only provide features for the rear-facing belt path 1010a and the forward-facing belt path 1010b.

Additionally, different portions of the convertible child restraint 1000a may be color-coded and/or labeled to provide visual indications and/or instructions to the parent and/or caregiver as to the proper installation of the child restraint 1000a for the particular configuration of interest (e.g., rear-facing car seat, forward-facing car seat, belt positioning booster seat configurations). For instance, the rear portion 1102a of the lower base 1100 may be labeled to indicate the rear portion 1102a should be placed against the vehicle seatback 104. The rear-facing and forward-facing belt paths 1010a-1010c may also be color coded to better distinguish which belts paths should be used based on the desired configuration of the child restraint 1000a. For example, the openings 1204, 1310, and 1362 and/or the notches 1312 may be colored according to the supported belt path.

Figure 5:
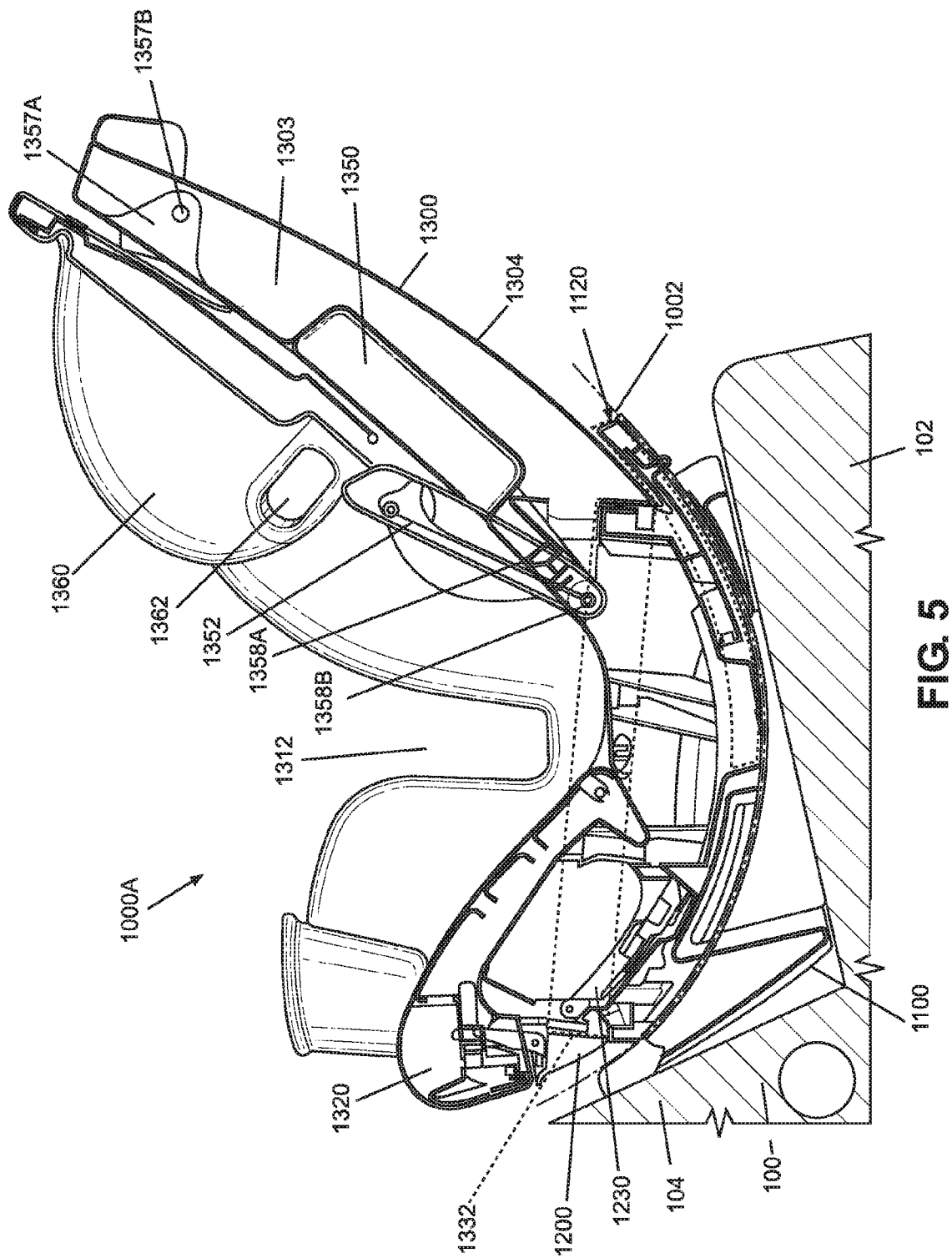
FIG. 5 shows a cross-sectional side view of the convertible child restraint of FIG. 1 with an annotated recline arc.

The lower base 1100 provides a platform to support the child restraint 1000a on the vehicle seat 100. As described above, the lower base 1100 may be coupled to the mid base 1200 via a recline mechanism 1120 to adjust a recline position of the seat shell 1300 relative to the lower base 1100. In some implementations, the recline mechanism 1120 may be configured to rotate the mid base 1200 and, by extension, the seat shell 1300 about a transverse axis (not shown) positioned near the center of gravity of the child restraint 1000a and the occupant (e.g., the child). For example, FIG. 5 shows a cross-sectional view of the child restraint 1000a and, in particular, a recline arc 1002. The recline position of the mid base 1200 and the seat shell 1300 may be constrained to follow the recline arc 1002. In some implementations, the recline arc 1002 may be disposed below the portion of the rear-facing belt path 1010a passing through the mid base 1200.

In some implementations, the recline mechanism 1120 may define two or more indexed recline positions at which the recline position of the mid base 1200 and the seat shell 1300 may be locked to the lower base 1100. In some implementations, the recline mechanism 1120 may preferably define at least four indexed recline positions. The recline mechanism 1120 may include an actuation mechanism with an actuation handle 1122 to facilitate a change between the various indexed recline positions. The recline mechanism 1120 will be described in more detail below in relation to a child restraint 1000b. It should be appreciated the various features of the recline mechanism 1120 of the child restraint 1000b may be readily incorporated into the recline mechanism 1120 of the child restraint 1000a. In some implementations, the inclusion of the recline mechanism 1120 may allow the child restraint 1000a to exclude other secondary recline mechanisms, such as an adjustable foot.

The mid base 1200 may mechanically link the seat shell 1300 to the lower base 1100 while allowing the seat shell 1300 to be rotatable relative to the lower base 1100. As described above, the mid base 1200 may be coupled to the seat shell 1300 via the rotation mechanism 1332, which allows the seat shell 1300 to rotate 360 degrees. The rotation mechanism 1332 may define a rotation plane 1006, as shown in FIG. 6, along which the seat shell 1300 is rotatable relative to the mid base 1200.

Figure 6:
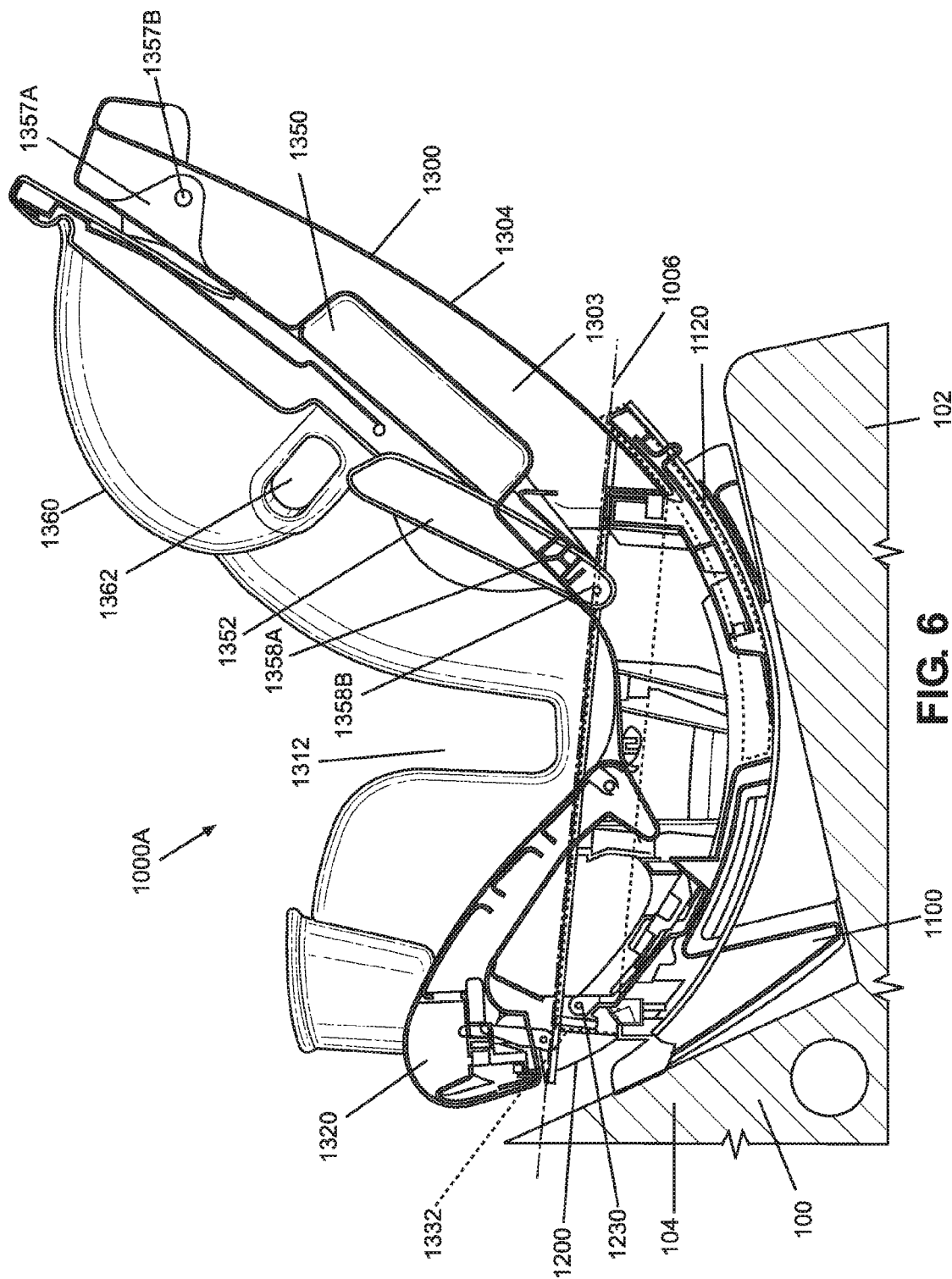
FIG. 6 shows a cross-sectional side view of the convertible child restraint of FIG. 1 with an annotated rotation plane (i.e., the turn surface) between the mid base and the lower base.

As shown in FIGS. 5 and 6, the rotation mechanism 1332 and the rotation plane 1006 may generally be disposed above the recline mechanism 1120 and the recline arc 1002. FIGS. 5 and 6 further show the lower base 1100 and/or the mid base 1200 may be shaped such that the rotation plane 1006 is tilted when the child restraint 1000a is placed onto a horizontal surface. The tilt may be chosen to compensate, at least in part, the recline angle of the vehicle seat pan 102 supporting the child restraint 1000a so that the rotation plane 1006 is approximately horizontal for at least one recline position when the child restraint 1000a is installed onto the vehicle seat 100. In some implementations, the rotation plane 1006 may be intentionally tilted when the child restraint 1000a is installed so that the range of recline positions for the seat shell 1300 may vary depending on whether the child restraint 1000a is installed with a rear-facing or forward-facing configuration. The effects of a tilted rotation plane 1006 on the recline adjustment will be discussed in more detail below.

In some implementations, the recline mechanism 1120 and the rotation mechanism 1332 may be mechanically decoupled so that a recline position and a rotational position of the seat shell 1300 is adjustable independently with respect to one another. The seat shell 1300 may also be permanently affixed to the mid base 1200. Said in another way, the seat shell 1300 may not be removable from the mid base 1200 during normal operation of the child restraint 1000a unlike an infant carrier in a conventional infant car seat.

The rotation mechanism 1120 may include a turn ring 1330 mounted to the seat shell 1300 via one or more attachment features 1334. The turn ring 1330 is rotatably coupled to one or more brackets 1240 mounted to the mid base 1200 (see, for example, FIGS. 9 and 10). In some implementations, the bracket(s) 1240 may constrain the turn ring 1330 to rotate about a single rotation axis. In other words, the bracket(s) 1240 may limit or, in some instances, prevent the turn ring 1300 from rotating about another rotation axis and/or translate along any direction relative to the brackets 1240.

As shown, the brackets 1240 and the turn ring 1330 may be disposed along the periphery of the mid base 1200 and/or the bottom portion of the seat shell 1300 to provide space for other components in the child restraint 1000a. For example, the turn ring 1330 may include an opening 1331 through which a portion of the seat shell 1300 (e.g., the seat pan 1302) may be placed at least partially through the turn ring 1330 as shown in FIGS. 5 and 6. In this manner, the seat shell 1300 may be positioned closer to the lower base 1100, thus reducing the overall height of the child restraint 1000a. A child restraint 1000a with a smaller height may allow the child restraint 1000a to be more easily installed into vehicles with limited interior space.

The turn ring 1330 may have various cross-sectional shapes including, but not limited to a squared C-shape and an I-shape. The turn ring 1330 may be further formed of various materials including, but not limited to steel and magnesium.

Figure 7:
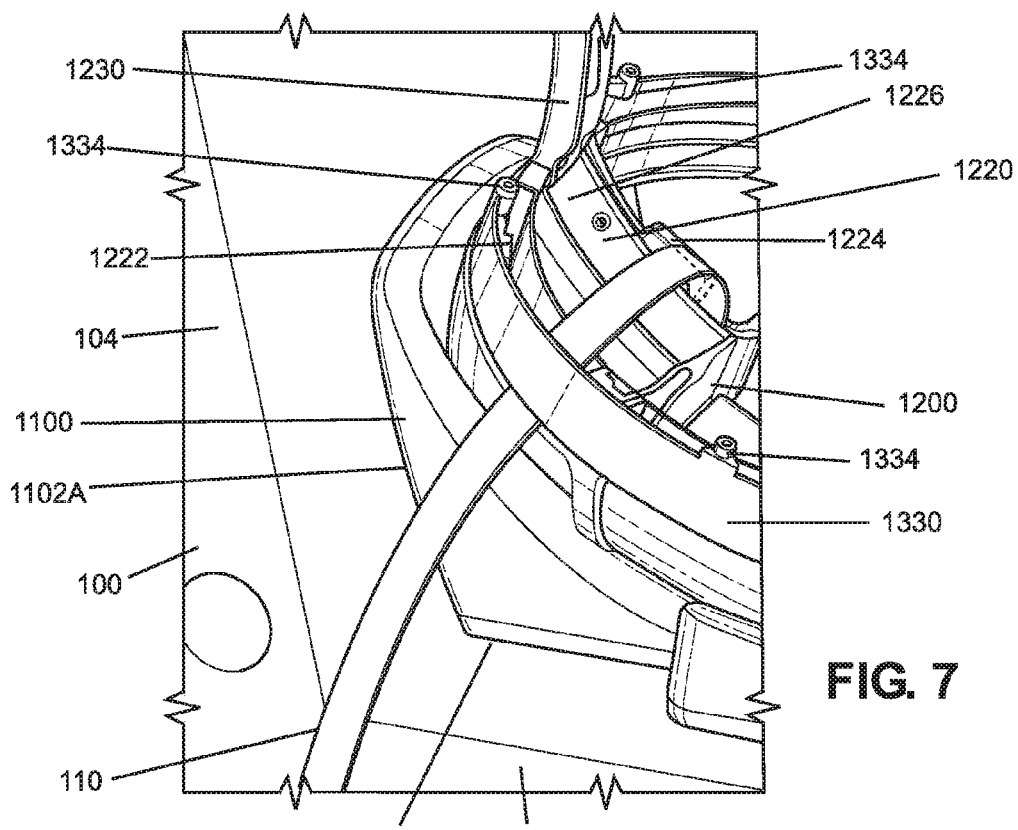
FIG. 7 shows a magnified view of a rotation lockout in the convertible child restraint of FIG. 1 engaged by a vehicle seat belt or LATCH belt installed along the rear-facing belt path. The seat shell is not shown for clarity.
Figure 8:
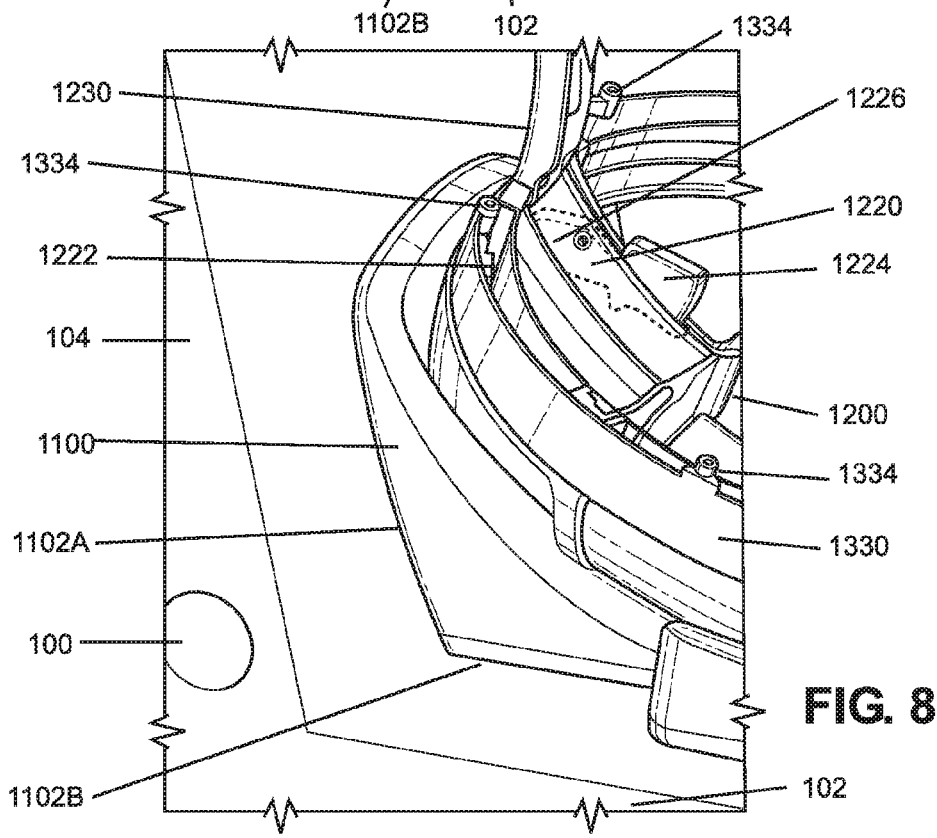
FIG. 8 shows a magnified view of the rotation lockout in the convertible child restraint of FIG. 7 where the rotation lockout is disengaged. The seat shell is not shown for clarity.
Figure 9:
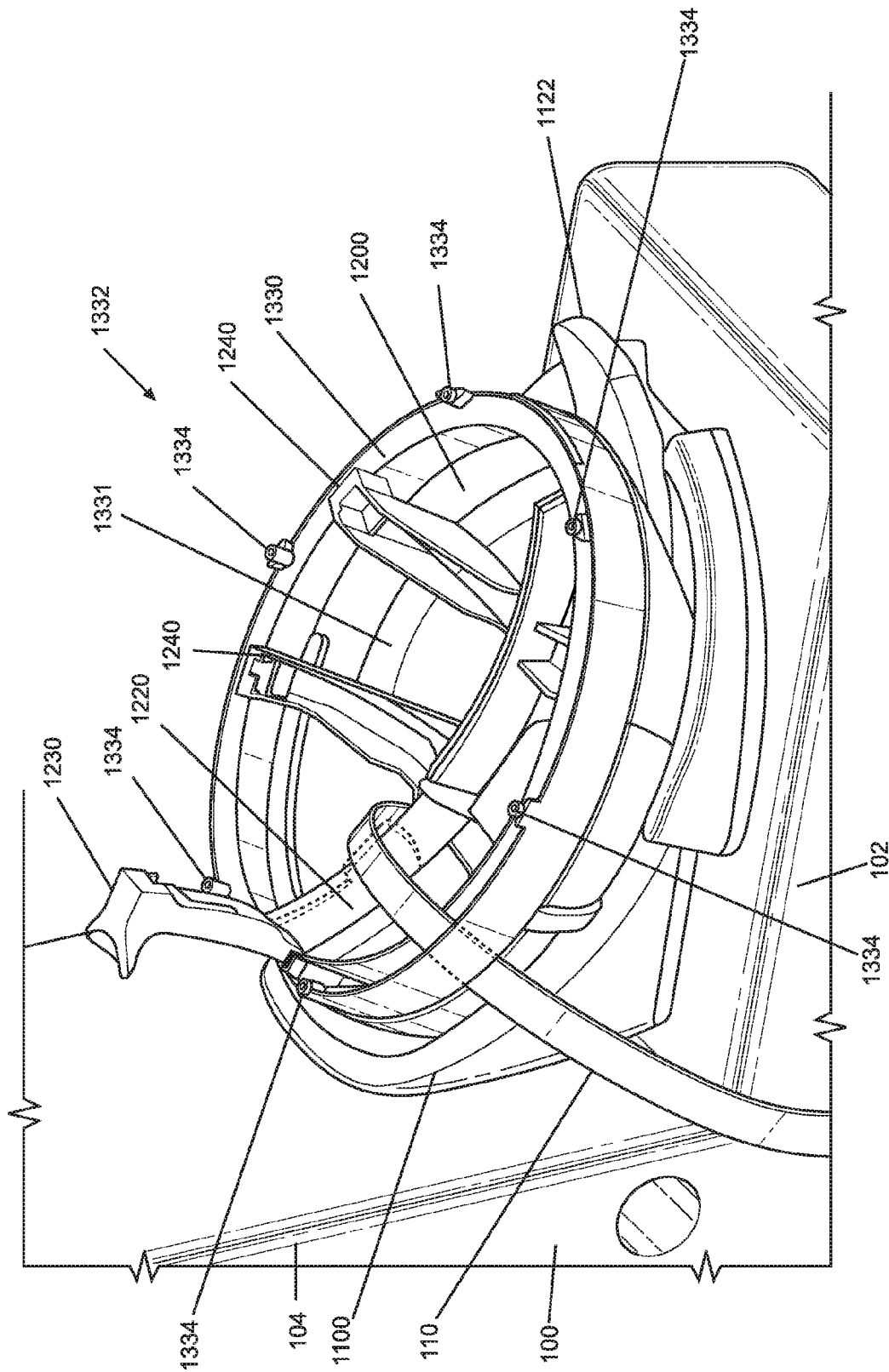
FIG. 9 shows a perspective view of the convertible child restraint of FIG. 1 with a belt locking arm in an open position and a vehicle or LATCH belt routed along the rear-facing belt path.
Figure 10:
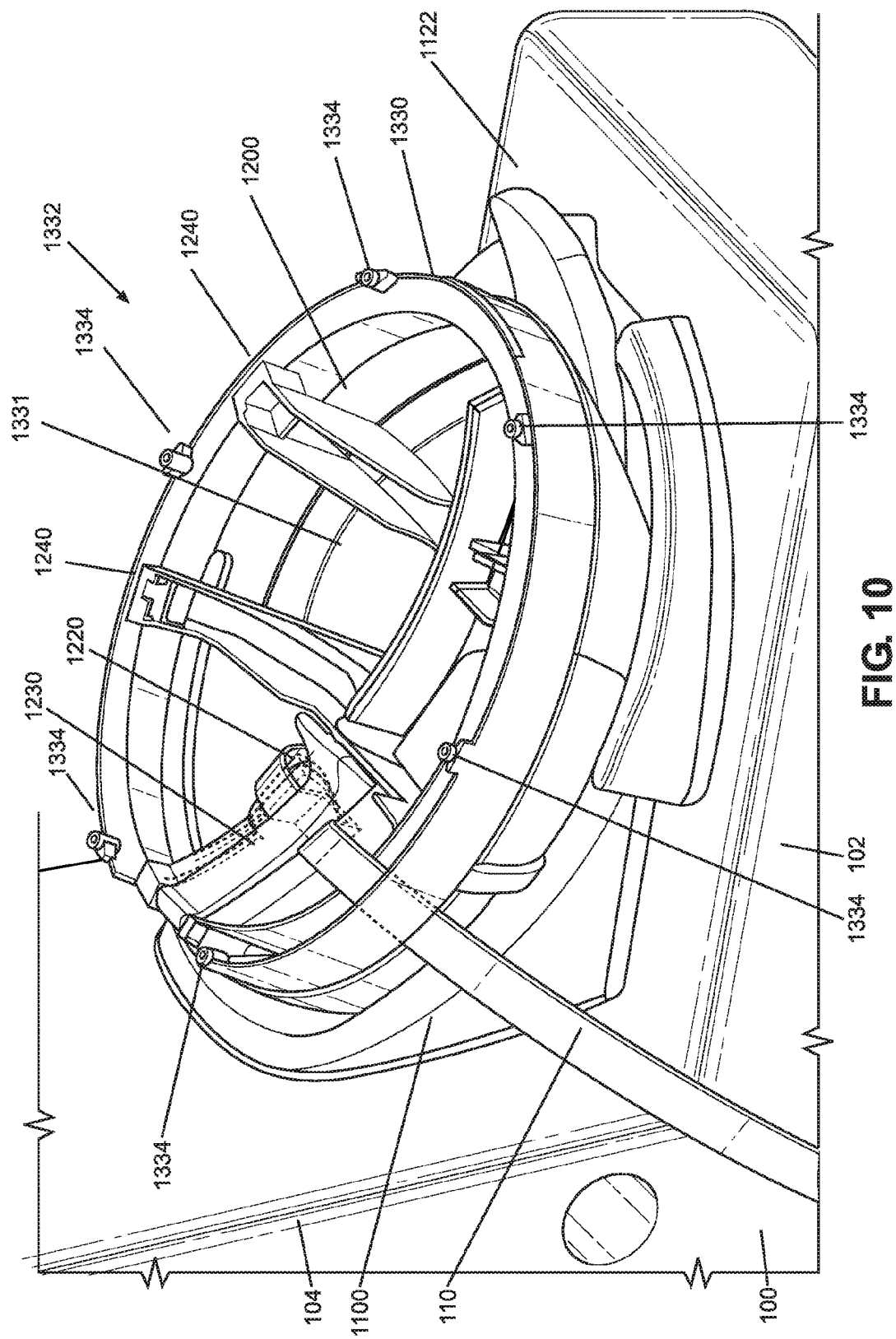
FIG. 10 shows a perspective view of the convertible child restraint of FIG. 9 with the belt locking arm in a closed position to clamp the vehicle or LATCH belt to the child restraint.

In order to secure the belt 110 to the child restraint 1000a using the rear-facing belt path 1010a, the mid base 1200 may include a belt locking arm 1230 (see, for example, FIGS. 1, 5-8). The belt locking arm 1230, which may be disposed within an interior portion of the mid base 1200, may be a lever mechanism that is pivotally mounted at the top of the rear-facing belt path 1010a in the mid base 1200. When the belt locking arm 1230 is opened, the belt 110 may be laid across a recess in the mid base 1200 below the belt locking arm 1230 as shown in FIG. 9. When the belt locking arm 1230 is then closed and locked to the mid base 1200, the belt 110 is pressed and/or corrugated into the recess as shown in FIG. 10. In this manner, the belt locking arm 1230 may consume some of the length of the belt 110, which tensions the belt 110 and enables the child restraint 1000a to be more tightly installed to the vehicle seat 100 when the belt locking arm 1230 is closed.

In some implementations, the belt locking arm 1230 may only be accessed and opened when the seat shell 1300 is at the rear-facing position and a belt access panel 1320, which will be discussed in more detail below, is opened to uncover a belt access opening 1322. When the child restraint 1000a is installed in a forward-facing configuration, the belt locking arm 1230 may remain closed. In some implementations, the belt locking arm 1230 may hinder or, in some instances, prevent the belt 110 from being routed through the mid base 1200 along the rear-facing belt path 1010b by forcing the belt 110 around the belt locking arm 1230. In this manner, the belt locking arm 1230 may discourage the parent and/or the caregiver from pushing or pulling the belt 110 through the mid base 1200 via the openings 1204 without utilizing the belt access opening 1322.

The mid base 1200 may also include a rotation lockout feature 1220, which may restrict the range of rotational adjustment of the seat shell 1300 when the child restraint 1000a is installed in a rear-facing configuration to prevent the seat shell 1300 from being rotated to a forward-facing position. FIG. 8 shows the rotation lockout 1220 may be a lever mechanism that is rotatably coupled to the mid base 1200 and includes a plunger end 1224 and a lockout end 1226. When the plunger end 1224 is actuated, the rotation lockout 1220 may rotate causing the lockout end 1226 to lie along the same rotation plane as a rotation stop 1222 formed on the turn ring 1330. When the seat shell 1300 is then rotated sufficiently far from the rear-facing position, the lockout end 1226 may contact the rotation stop 1222, preventing the seat shell 1300 from being rotated further. In some implementations, the turn ring 1330 may include more than one rotation stop 1222 to limit the rotation of the seat shell 1300 to a side-facing position. For example, the rotation stop(s) 1222 may only allow the seat shell 1300 to rotate between −120 degrees and +120 degrees where 0 degrees corresponds to the rear-facing position. It should also be appreciated that the rotation stop 1222 may be formed directly on the seat shell 1300 and/or various features disposed on the seat shell 1300 as well.

The rotation lockout 1220 may be spring-biased so that the lockout end 1226 does not engage the rotation stop 1222 unless the plunger end 1224 is actuated. In some implementations, the belt 110 may be used to actuate the rotation lockout 1220. For example, FIG. 7 shows the belt 110 may lie across the plunger end 1224 when laid across the mid base 1200 along the rear-facing belt path 1010a. When the belt locking arm 1230 is then closed, the belt 110 may be pressed onto the plunger end 1224, thus actuating the rotation lockout 1220. When the belt 110 is removed from the rear-facing belt path 1010a, the rotation lockout 1220 may return to its spring biased open position as shown in FIG. 8, thus disengaging the stop 1222 and allowing full 360 degree rotation of the seat shell 1300 above the mid base 1200.

The seat shell 1300 may generally include a seat pan 1302 and a seatback section 1303 to support the child. As described above, the seat shell 1300 may include sides 1301c and 1301d in which an opening 1310 or a notch 1312 may be formed to define portions of the forward-facing belt paths 1010b and 1010c. The seat shell 1300 may further include various attachment features (not shown) to mount to the turn ring 1330.

Figure 4:
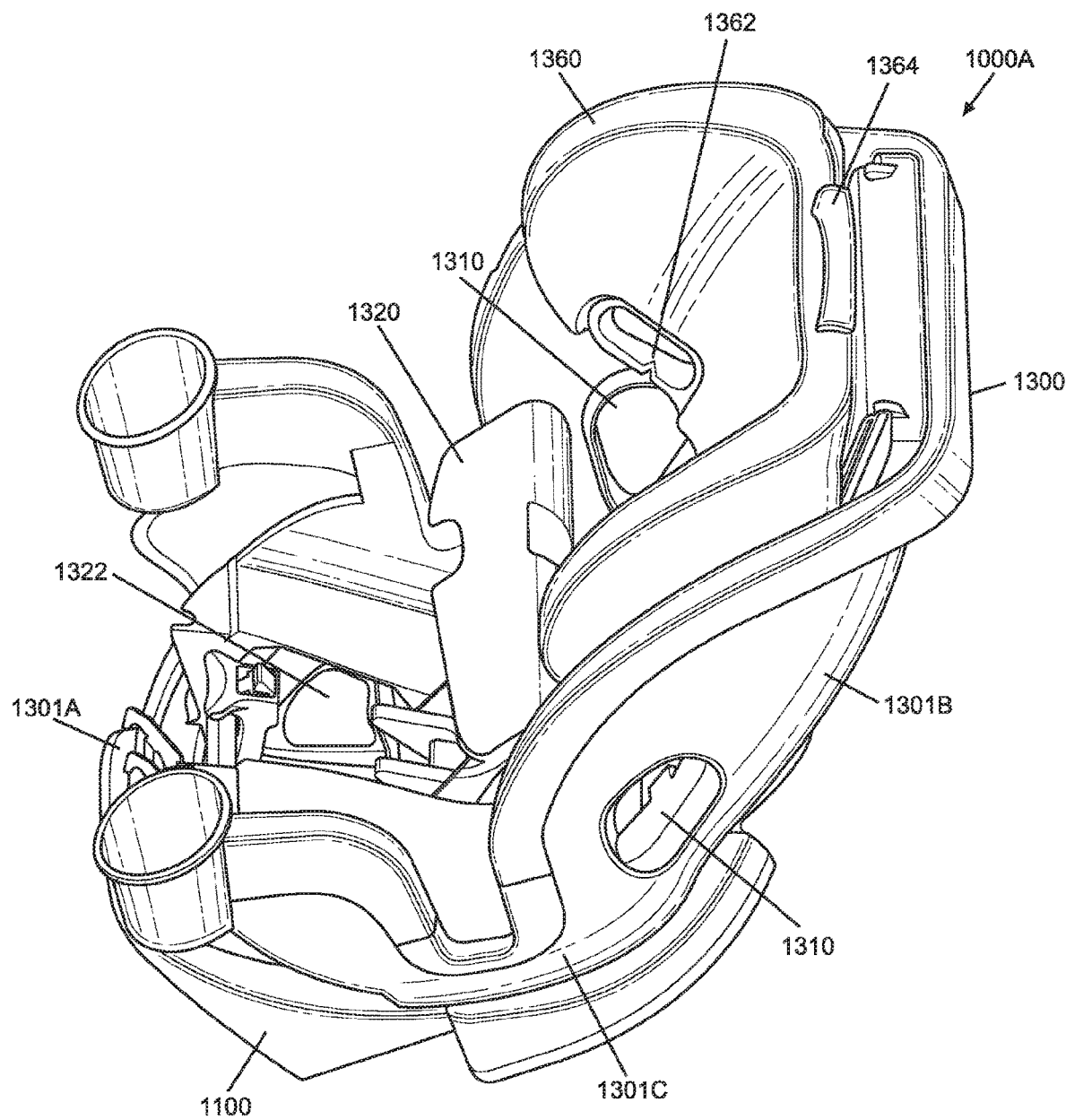
FIG. 4 shows a top perspective view of the convertible child restraint of FIG. 1 with a belt access panel open exposing a portion of a rear-facing belt path.
Figure 11:
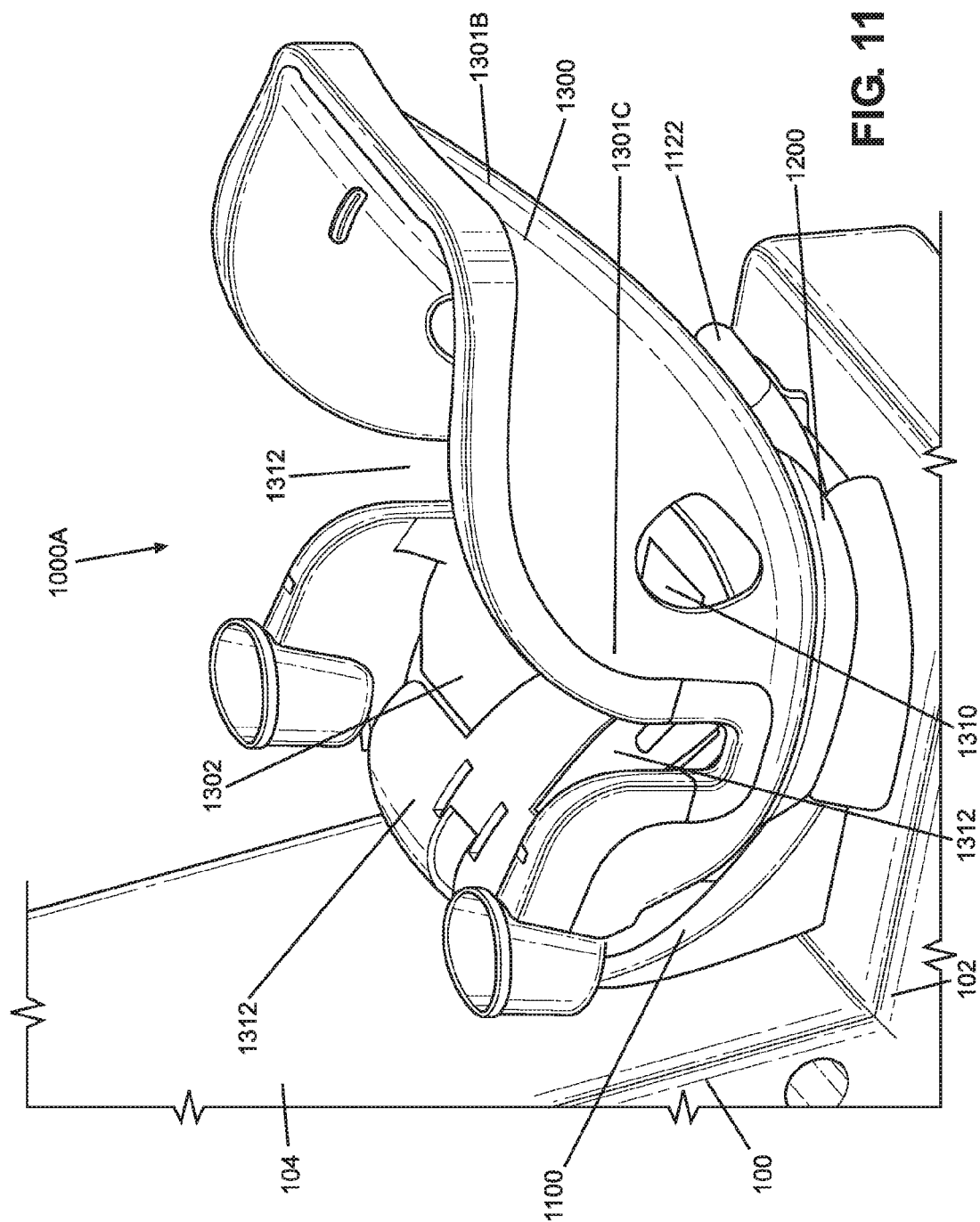
FIG. 11 shows a perspective view of the convertible child restraint of FIG. 1 in a rear-facing configuration with the belt access panel closed.
Figure 12:
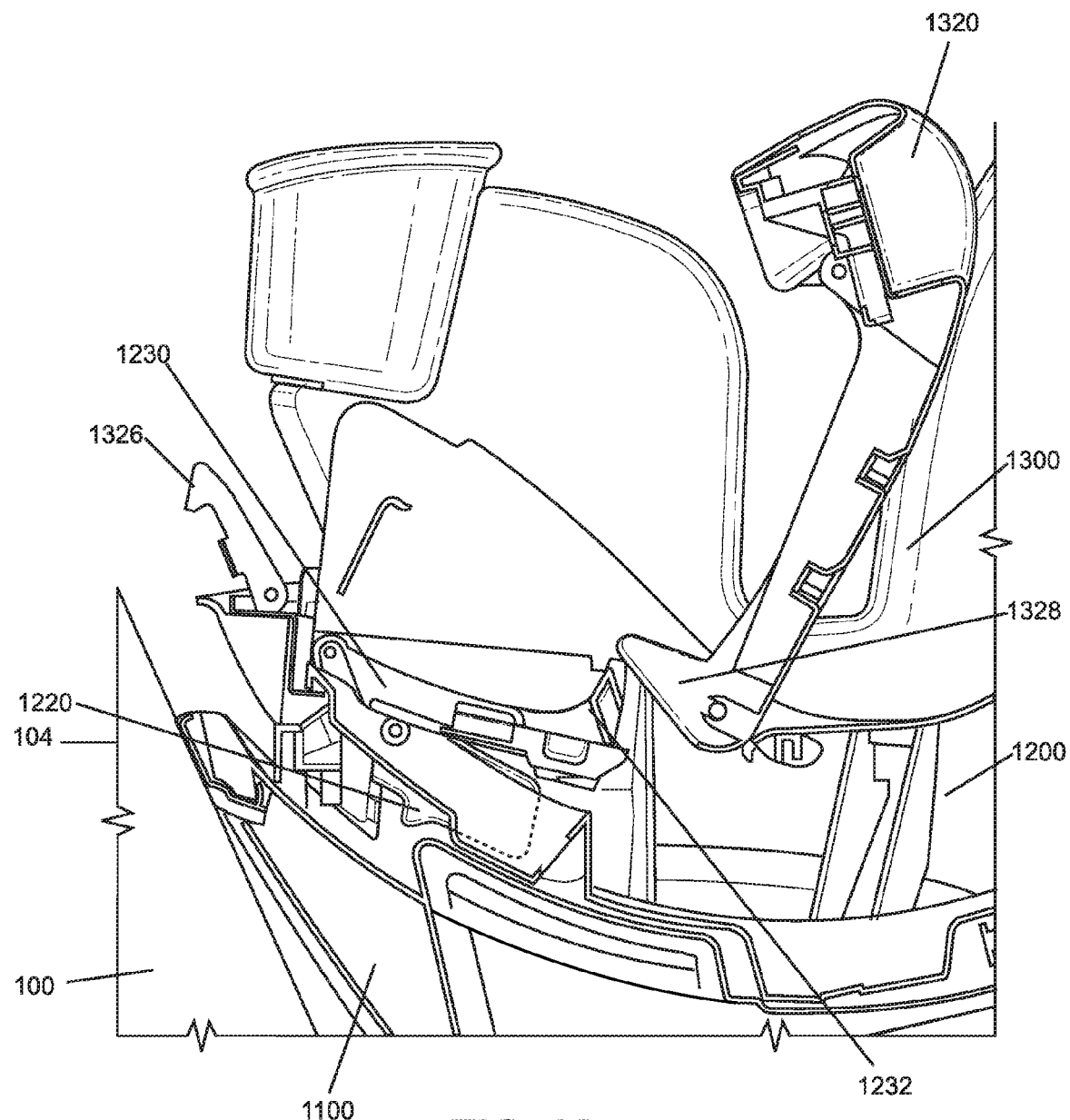
FIG. 12 shows a cross-sectional side view of the convertible child restraint of FIG. 1 where the belt access panel is open and disengaged from a latch coupled to the belt locking arm.
Figure 13:
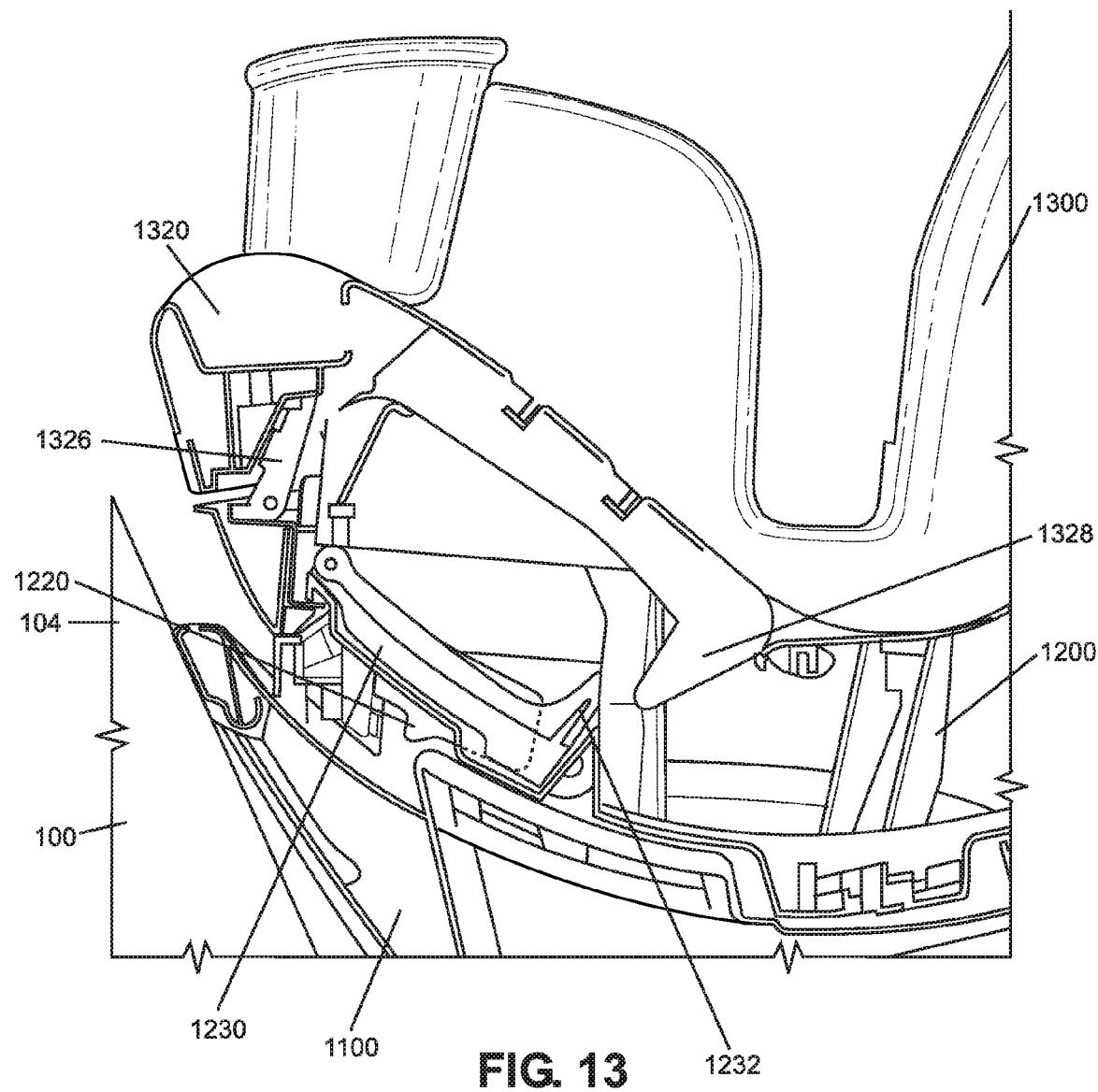
FIG. 13 shows a cross-sectional side view of the convertible child restraint of FIG. 12 where the belt access panel is closed and engaged to a latch coupled to the belt locking arm.

In some implementations, the seat shell 1300 may include a belt access panel 1320 disposed along the front end 1301a of the seat pan 1302 as shown in FIG. 11. As shown in FIGS. 12 and 13, the belt access panel 1320 may be hinged to the seat pan 1302 near the junction of the seat pan 1302 and a seatback insert 1350. When the belt access panel 1320 is closed, the distal end of belt access panel 1320 is locked to the seat shell 1300 via a latch 1326 near the edge where the child's feet are located when placed into the child restraint 1000a. When the belt access panel 1320 is opened, a belt access opening 1322 is uncovered that allows the parent and/or caregiver to have access to the belt 110 disposed within the mid base 1200, the belt locking arm 1230, and/or the rotation lockout 1220 as shown in FIGS. 4 and 12. In some implementations, the belt access opening 1322 may be at least about 4.5 inches wide to provide sufficient space for the parent and/or the caregiver to install and/or uninstall the belt 110 from the child restraint 1000a.

Figure 14:
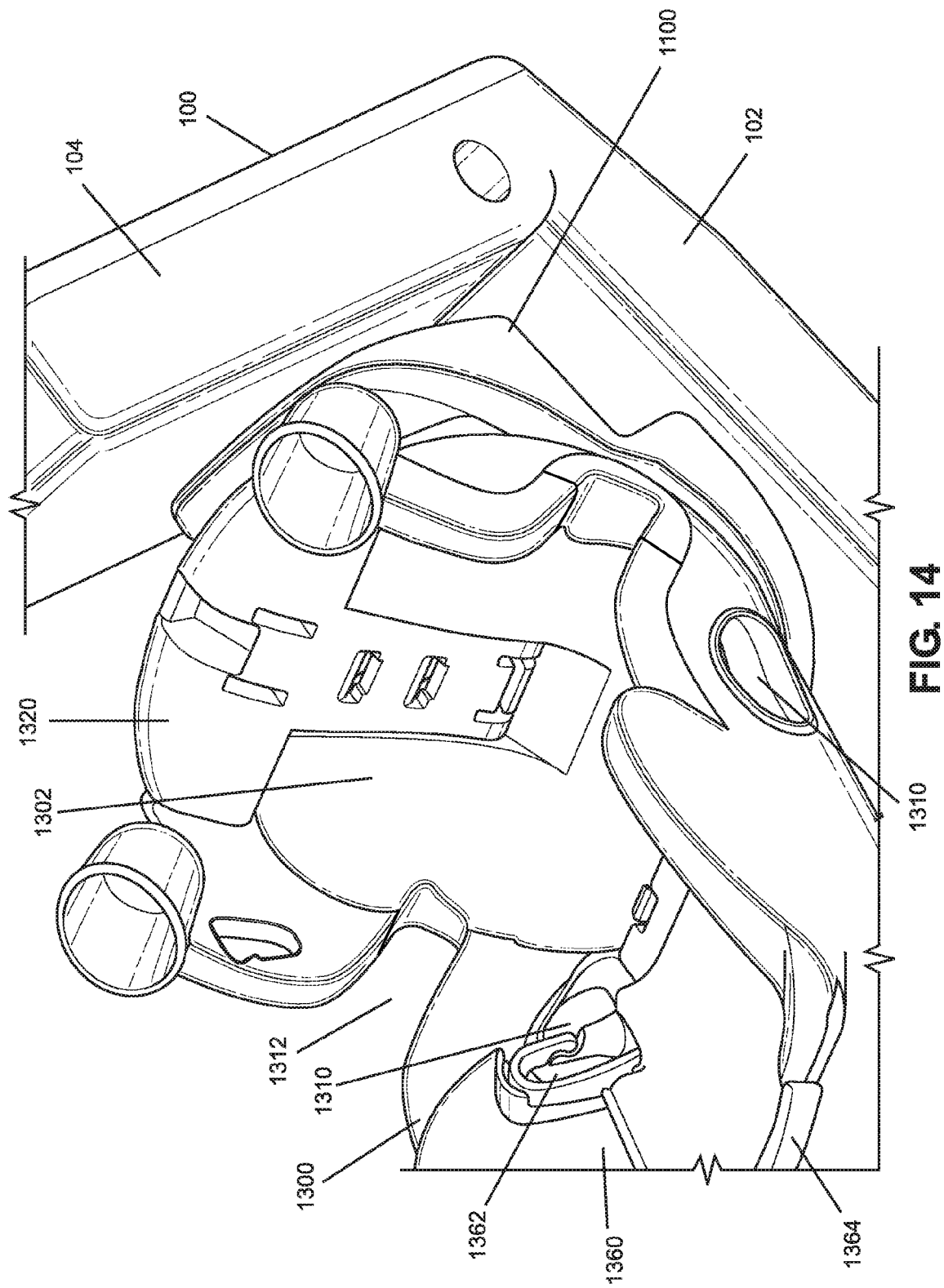
FIG. 14 shows a top perspective view of the convertible child restraint of FIG. 1 where the seat shell together with the belt access panel are rotated away from a rear-facing position.

In some implementations, the belt access panel 1320 may include a cam 1328 configured to mechanically contact a tail section 1232 of the belt locking arm 1230. In particular, the cam 1328 may be positioned on the belt access panel 1320 to provide a mechanical advantage (i.e., the parent and/or the caregiver can provide a smaller force) to push the belt locking arm 1230 slightly past its locking point, thus closing the belt locking arm 1230 as the belt access panel 1320 is being closed. Once the belt locking arm 1230 is closed, the cam 1328 may continue to move away from the tail section 1232 to provide sufficient clearance for the cam 1328 as well as the other features of the seat shell 1300 to rotate relative to the mid base 1200 and the belt locking arm 1230 as shown in FIG. 14. By utilizing the belt access panel 1320 to close the belt locking arm 1230, the parent and/or the caregiver does not have to provide a large force to achieve a tight installation.

In some implementations, the seatback section 1303 may be an assembly that includes a seatback 1304 formed as part of the seat shell 1300 and a seatback insert 1350 as shown in FIGS. 5 and 6. The seatback insert 1350 may include a base end 1358a coupled to the seat shell 1300 via a pin joint 1358a and a tail end 1357a coupled to the seat shell 1300 via a pin joint 1357b. The seatback insert 1350 may structurally reinforce the seatback section 1303. In some implementations, the inclusion of the seatback insert 1350 may allow the seat shell 1300 to exclude other, heavier structures typically found in conventional convertible car seats including, but not limited to metal tubing, L tubing, and bulky plastic structures, thus reducing the overall weight of the child restraint 1000*a*.

The seatback insert 1350 may include a belt locking arm 1352 to secure the belt 110 to the seat shell 1300 when the forward-facing belt path 1010*b* is used for installation. The belt locking arm 1352 may operate in a similar manner to the belt locking arm 1230 (i.e., the belt locking arm 1352 may press and/or corrugate the belt 110 into a recess or channel thus tightening the belt 110). The seatback insert 1350 may also include a storage compartment 1356 to store a harness when the harness is not being used (e.g., when the child restraint 1000*a* is used as a belt positioning booster).

The seat shell 1300 may also include an adjustable headrest 1360 to support a child's head. As described above, the headrest 1360 may include one or more openings 1362 to support and guide a shoulder strap 116*b* in a vehicle seat belt. In general, the opening(s) 1362 may be disposed near a bottom portion of the headrest 1360 where a child's shoulders are likely to be located. In some implementations, the opening(s) 1362 may be offset from the bottom portion of the headrest 1360. In some implementations, the seatback insert 1350 may include a track (not shown) that defines two or more indexed headrest positions for the headrest 1360 to be positioned and locked to the seat shell 1300. The headrest 1360 may further include an actuation handle 1364 that, when actuated, may release the headrest 1360 from one indexed headrest position so that the position of the headrest 1360 may be changed.

In some implementations, the seat shell 1300 may also include a level indicator 1390 to provide a visual indication to the parent and/or the caregiver as to the proper recline angle of the seat shell 1300 for both rear-facing and forward-facing configurations. For example, FIGS. 3A and 3B show the level indicator 1390 may be directly mounted to one side of the seat shell 1300. By placing the level indicator 1390 on the seat shell 1300, the level indicator 1390 may provide a reading on the recline angle relative to a global horizontal reference plane. Thus, the level indicator 1390 may enable the parent and/or the caregiver to readily compensate for the recline angle of a vehicle seat 100, which may vary for different types of vehicle seats and/or different vehicles. The level indicator 1390 may be various types of level indicators including, but not limited to a bubble indicator and a ball indicator.

Figure 15:
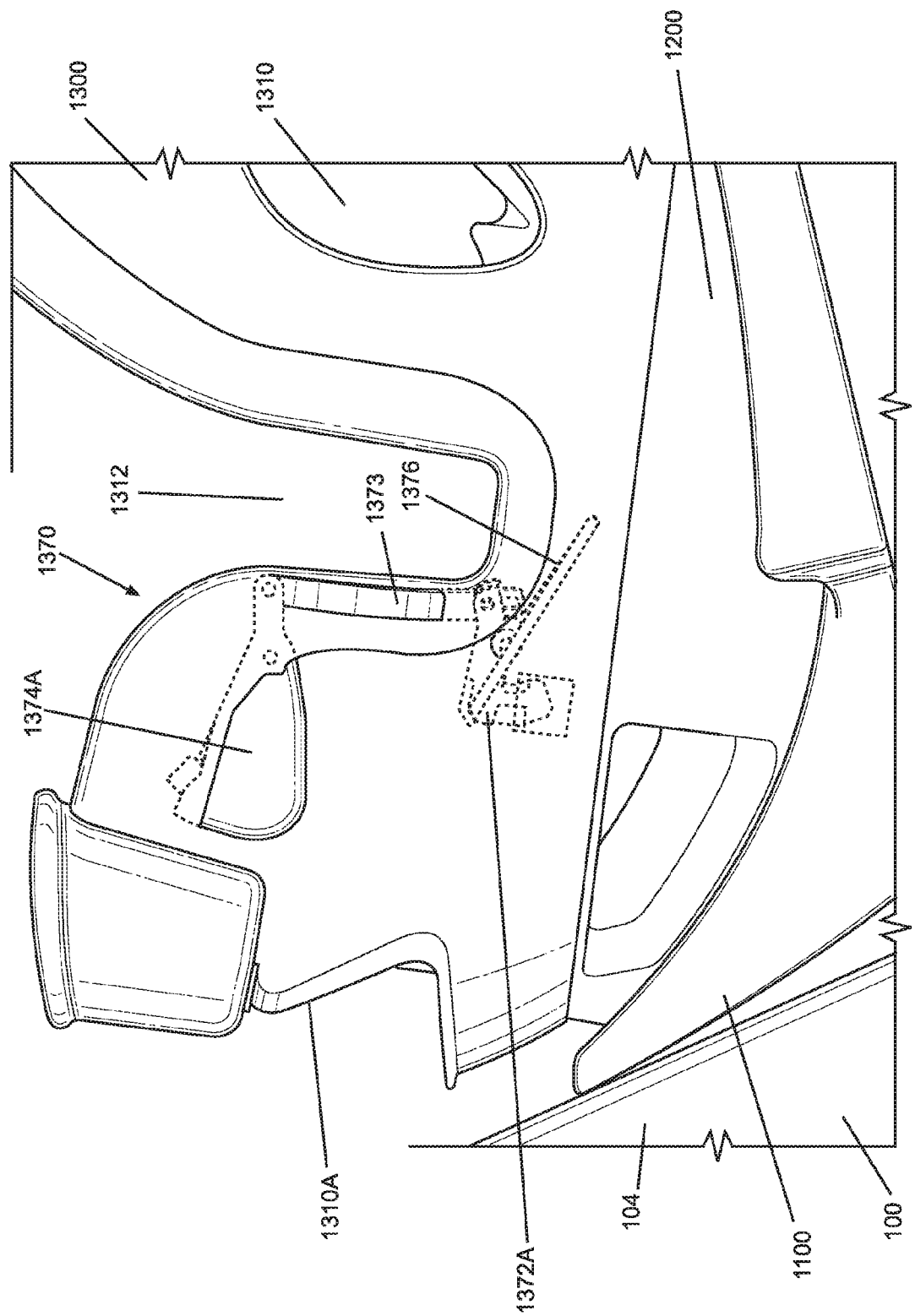
FIG. 15 shows a side view of a lock pin mechanism in the convertible child restraint of FIG. 1 to lock the seat shell to the mid base in either a forward-facing or a rear-facing configuration.
Figure 16:
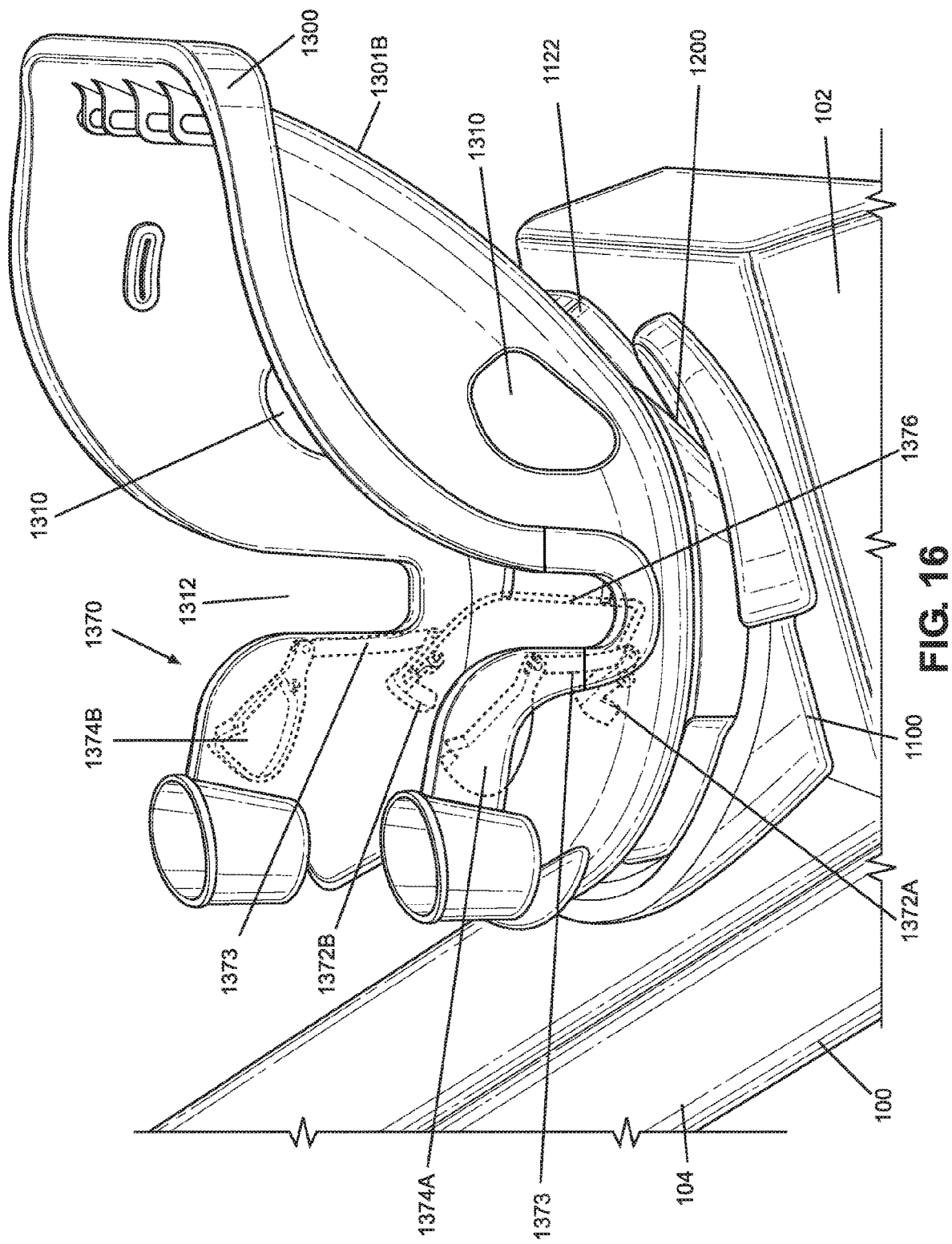
FIG. 16 shows a top perspective view of the convertible child restraint of FIG. 15 where the pair of spring-biased lock pins in the lock pin mechanism are linked together by a torsion wire.

In some implementations, the seat shell 1300 may further include a lock pin mechanism to lock the rotational position of the seat shell 1300 to the mid base 1200. For example, FIGS. 15 and 16 show an exemplary lock pin mechanism 1370. As shown, the lock pin mechanism 1370 may include a pair of lock pins 132, which may be inserted into openings (not shown) disposed on the mid base 1200 along the rotation plane 1006, thus restricting the rotation of the seat shell 1300 relative to the mid base 1200. It should be appreciated that in other implementations, the lock pin mechanism 1370 may include a single lock pin or three or more lock pins. The lock pins 1372*a* and 1372*b* may each be coupled to a spring that imparts a force that insert and/or retains the lock pins 1372*a* and 1372*b* in the openings of the mid base 1200. In some implementations, the lock pin mechanism 1370 may be configured to lock the seat shell 1300 only when the seat shell 1300 is at the rear-facing or forward-facing positions.

As shown in FIG. 15, the lock pin 1372*a* may be mechanically linked to an actuation handle 1374*a* via a linkage member 1373 disposed on the left side 1301*c* of the seat shell 1300. The actuation handle 1374*a* may be disposed along a ridge of the seat shell 1300 forming part of an arm rest and the linkage member 1373 may be disposed along the portion of the seat shell 1300 defining the notch 1312. The lock pin 1372*b* may similarly be coupled to an actuation handle 1374*b* via a linkage member 1373 on an opposing side of the seat shell 1300 (e.g., the right-side 1301*d*).

In this example, the actuation handle 1374*a* and the lock pin 1372*a* may each be rotatably coupled to the seat shell 1300. When the actuation handle 1374*a* is actuated, the linkage member 1373 is displaced downwards towards the mid base 1200, which, in turn, causes the lock pin 1372*a* to rotate out of the opening in the mid base 1200 as shown in FIG. 16. The lock pin 1372*b* may be similarly actuated via the actuation handle 1374*b*. When both the lock pins 1372*a* and 1372*b* are released, the seat shell 1300 may then be rotated. In some implementations, the lock pins 1372*a* and 1372*b* may be mechanically linked via a cable or a torsion wire 1376 as shown in FIG. 16 such that actuation of one of the actuation handles 1374*a* or 1374*b* releases both the lock pins 1372*a* and 1372*b*.

Second Examples of a Child Restraint with a Rotatable Seat

Figure 17:
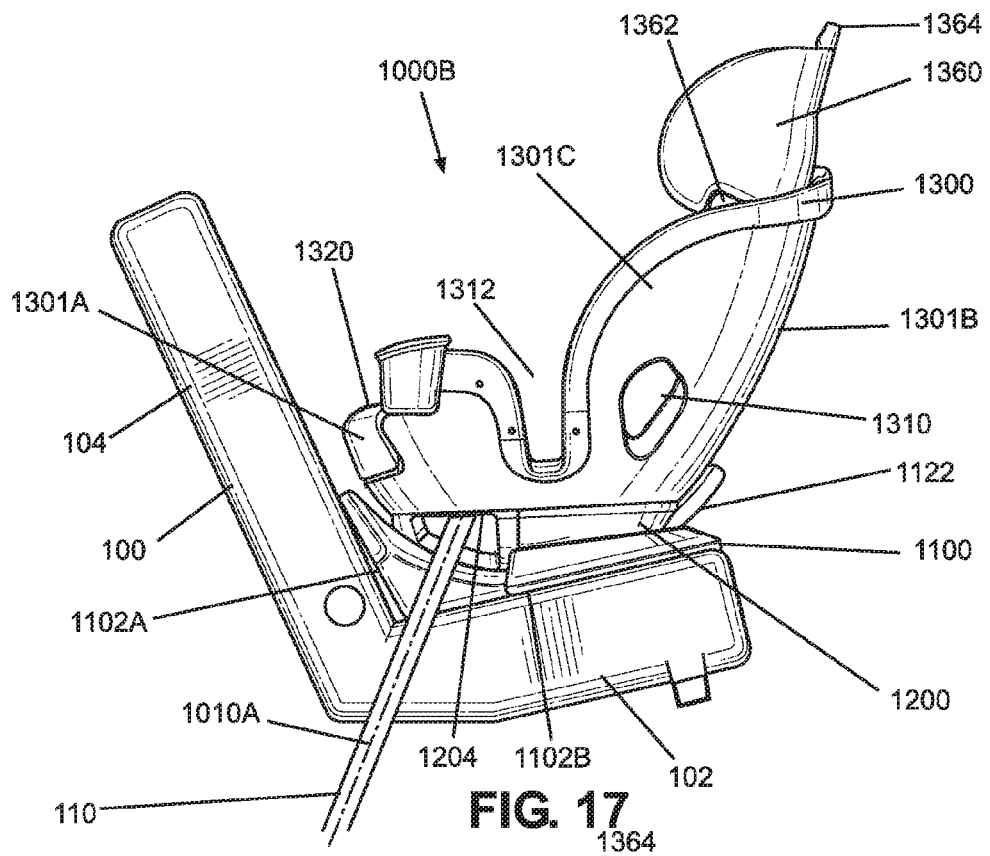
FIG. 17 shows a side view of another exemplary convertible child restraint installed onto a vehicle seat in a rear-facing configuration.

FIG. 17 shows another exemplary convertible child restraint 1000*b* installed onto a vehicle seat 100 in a rear-facing configuration. As before, the child restraint 1000*b* may include a lower base 1100 to support the child restraint 1000*b* on the vehicle seat 100, a seat shell 1300 to support a child, and a mid base 1200 located between the lower base 1100 and the seat shell 1300 to facilitate recline adjustment of the mid base 1200 and, by extension, the seat shell 1300 relative to the lower base 1100 via a recline mechanism 1120 and rotational adjustment of the seat shell 1300 relative to the mid base 1200 via a rotation mechanism 1332. The child restraint 1000*b* may be secured to the vehicle seat 100 via a belt, such as a vehicle seat belt or a LATCH belt depending on the particular installation configuration. It should be appreciated the child restraint 1000*b* may incorporate several of the same features as the child restraint 1000*a* and, similarly, the child restraint 1000*a* may incorporate several of the same features as the child restraint 1000*b*.

As before, the lower base 1100 and the mid base 1200 may define a rear-facing belt path 1010*a* for the belt 110 to couple the child restraint 1000*b* to the vehicle seat 100 when the child restraint 1000*b* is installed in the rear-facing configuration. For example, FIG. 17 shows the rear-facing belt path 1010*a* may pass through the interior of the mid base 1200 via one or more openings 1204. In some implementations, the rear-facing belt path 1010*a* may be preferably placed near the rear portion 1102*a* and the bottom portion 1102*b* of the lower base 1100 in order to accommodate a variety of vehicle stalk lengths. The rear-facing belt path 1010 may also be placed proximate to a center of gravity of the child restraint 1000*b* and the child.

Figure 18:
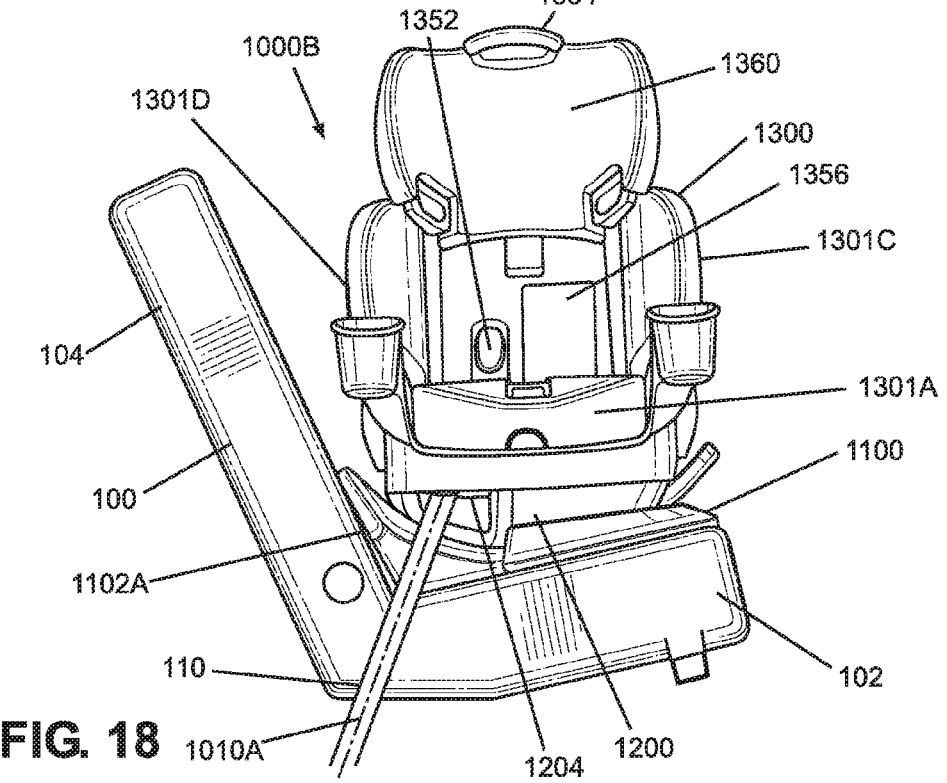
FIG. 18 shows a side view of the convertible child restraint of FIG. 17 rotated to a side-facing position.

After the child restraint 1000*b* is installed onto the vehicle seat 100 using the rear-facing belt path 1010*a*, the seat shell 1300 may still be rotatable, allowing a parent and/or a caregiver may rotate the seat shell 1300 from a rear-facing position to a side-facing position, as shown in FIG. 18, to more easily place a child into or take a child out of the child restraint 1000*b*. The mid base 1200 may further include a rotation lockout 1220 to prevent the seat shell 1300 from being rotated to a forward-facing position when the rear-facing belt path 1010*a* is used and the rotation lockout 1220 is engaged. When the rotation lockout 1220 is disengaged, the seat shell 1300 may rotate freely 360 degrees (e.g., from the rear-facing position to the forward-facing position).

Figure 19:
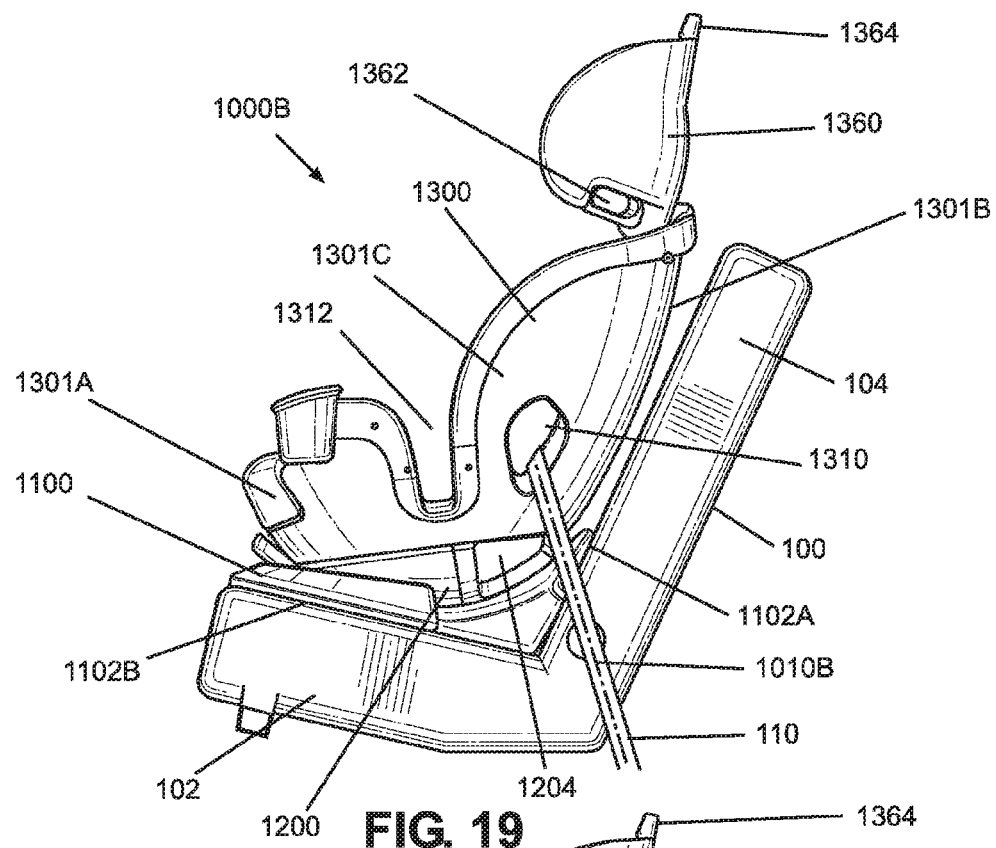
FIG. 19 shows a side view of the convertible child restraint of FIG. 17 installed onto a vehicle seat in a forward-facing configuration via a belt where the belt is only used to secure the child restraint to the vehicle seat.

The seat shell 1300 may also support forward facing belt paths 1010b and 1010c to support a toddler and a child requiring a belt positioning booster, respectively. For example, FIG. 19 shows the child restraint 1000b installed onto the vehicle seat 100 in a forward-facing configuration using the forward-facing belt path 1010b where the belt 110 is routed through opening(s) 1310 on the sides 1301c and 1301d of the seat shell 1300. For this configuration, the belt 110 may be only be used to secure child the restraint 1000b to the vehicle seat 100 and a separate integrated harness (not shown) may restrain the child.

Figure 20:
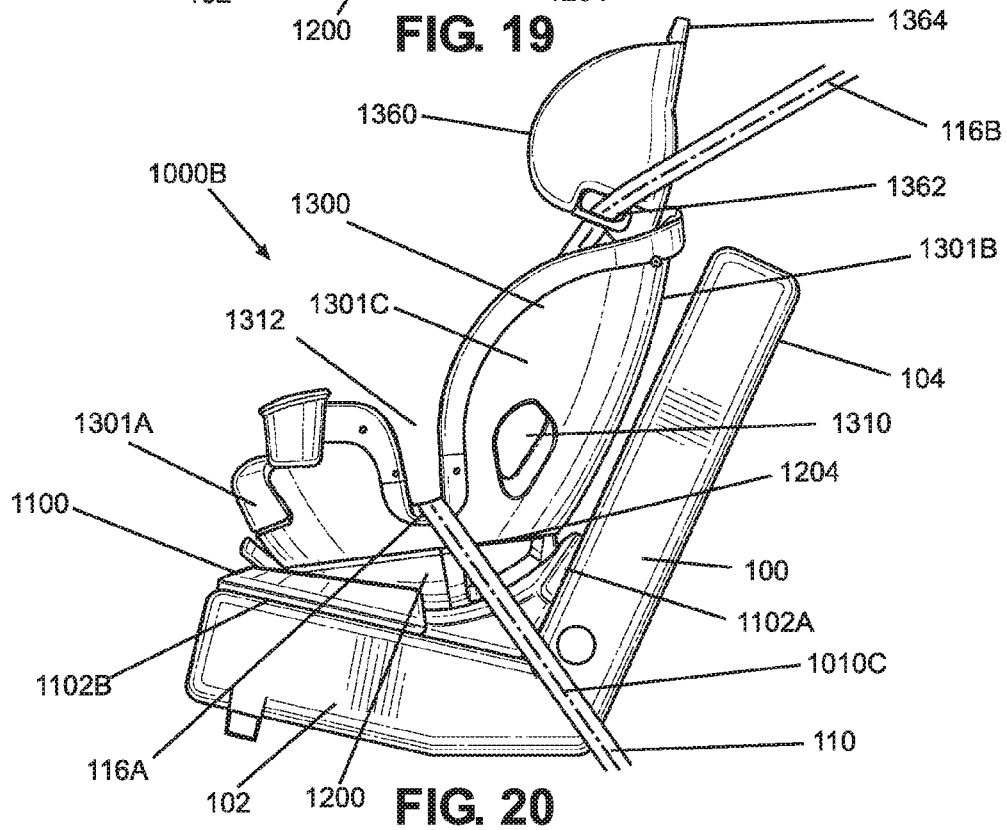
FIG. 20 shows a side view of the convertible child restraint of FIG. 17 installed onto a vehicle seat in a forward-facing configuration via a belt where the belt is used to secure the child restraint to the vehicle seat and restrain a child.

In another example, FIG. 20 shows the child restraint 1000b installed onto the vehicle seat 100 in a forward-facing configuration using the forward-facing belt path 1010c. In this configuration, a vehicle seat belt with a lap strap 116a and a shoulder strap 116b may be used to secure the child restraint 1000b to the vehicle seat 100 and restrain the child to the child restraint 1000b. In other words, the forward-facing belt path 1010c may allow the child restraint 1000b to be used as a belt positioning booster or a high-back booster. As shown, the seat shell 1300 may include one or more notches 1312 disposed on one or both of the sides 1301c and 1301d defining a portion of the forward-facing belt path 1010c for the lap strap 116a. The seat shell 1300 may further include a headrest 1360 having one or more openings 1362 that define a portion of the forward-facing belt path 1010c for the shoulder strap 116b.

Figure 22:
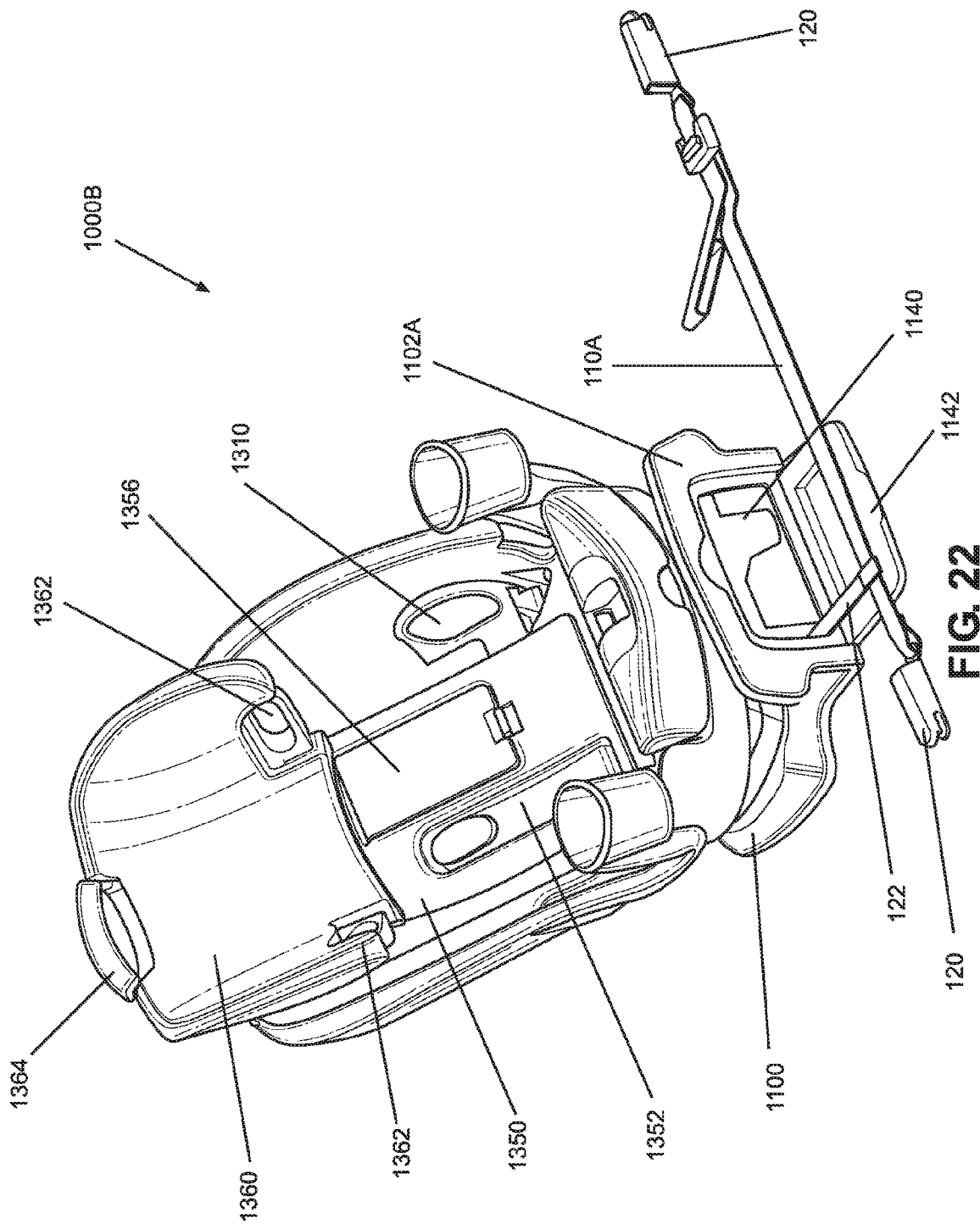
FIG. 22 shows a perspective view of the convertible child restraint of FIG. 17 in a rear-facing configuration where a hinged door in a back cover is open to provide access to a LATCH storage pocket.

The lower base 1100 may include a rear portion 1102a and a bottom portion 1102b that abuts the surfaces of the vehicle seat 100 (e.g., the vehicle seat pan 102 and the vehicle seatback 104). In some implementations, the lower base 1100 may include a LATCH storage compartment 1140 formed in a portion of the lower base 1100 near the rear portion 1102a. FIG. 22 shows the lower base 1200 may include a hinged door 1142 on the rear portion 1102a, which, when opened, provides access to the LATCH storage compartment 1140. As shown, the child restraint 1000b may include a LATCH belt 110a with one or more LATCH anchors 120 that may each connect to a vehicle seat anchor. A tether strap 122 may attach the LATCH belt 110a to the lower base 1100 to adhere with regulatory guidelines that require the LATCH belt 110a to be permanently affixed to the child restraint 1000b.

Figure 21:
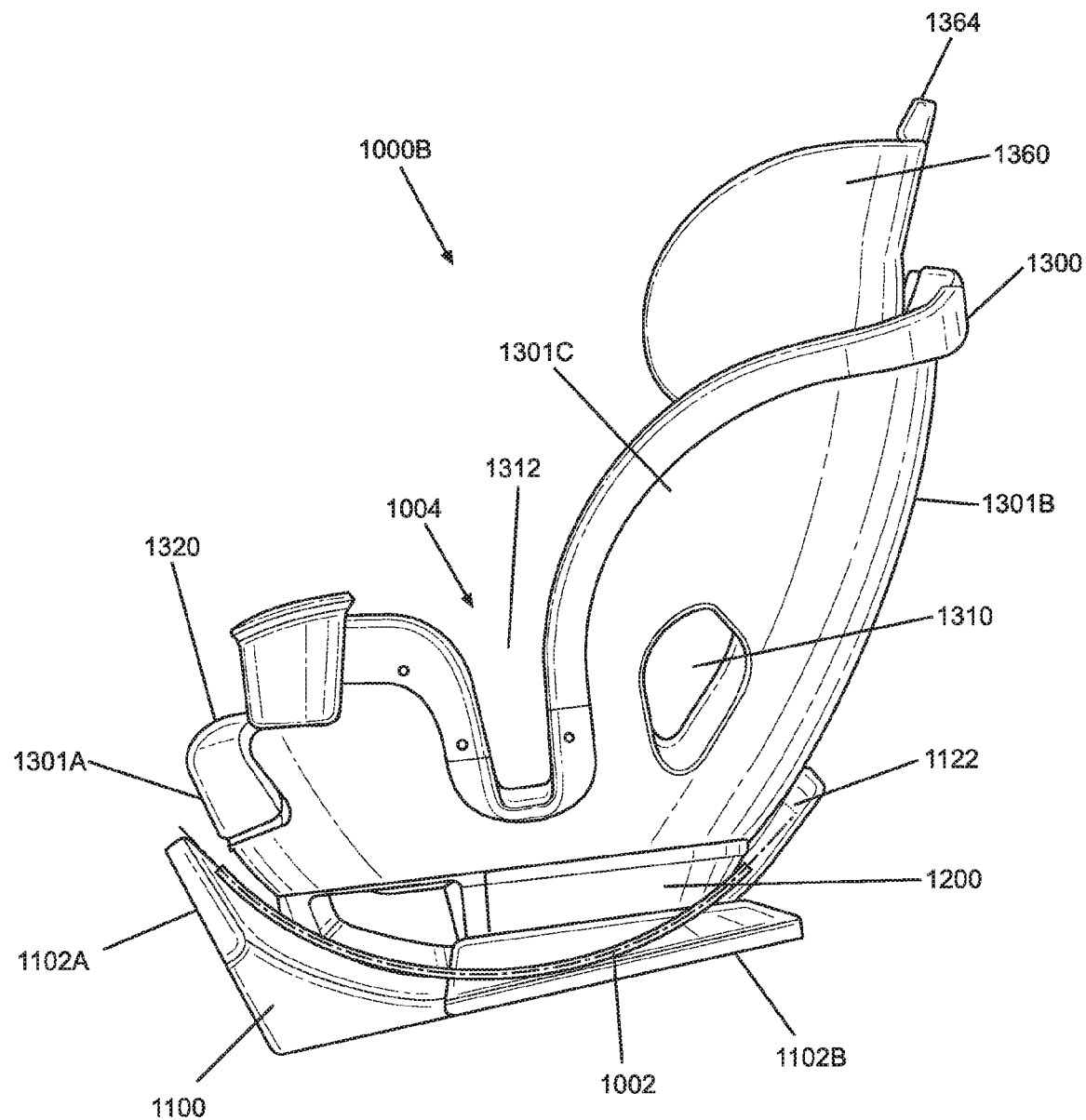
FIG. 21 shows a side view of the convertible child restraint of FIG. 17 with an annotated recline arc and transverse rotation axis.

The lower base 1100 may be coupled to the mid base 1200 via a recline mechanism 1120. As before, the recline mechanism 1120 may define a recline arc 1002, as shown in FIG. 21, along which the recline positions of the mid base 1200 and the seat shell 1300 may be adjusted relative to the lower base 1100. As shown, the mid base 1200 and the seat shell 1300 may be rotated about a transverse axis 1004 corresponding to the recline arc 1002, which may be located near the center of gravity of the occupant in the child restraint 1000b.

In some implementations, the recline mechanism 1120 may define two or more indexed recline positions and, preferably, at least four indexed recline positions, at which the recline position of the mid base 1200 and the seat shell 1300 may be locked to the lower base 1100. In some implementations, the inclusion of the recline mechanism 1120 may allow the child restraint 1000a to exclude other secondary recline mechanisms, such as an adjustable foot.

Figure 44A:
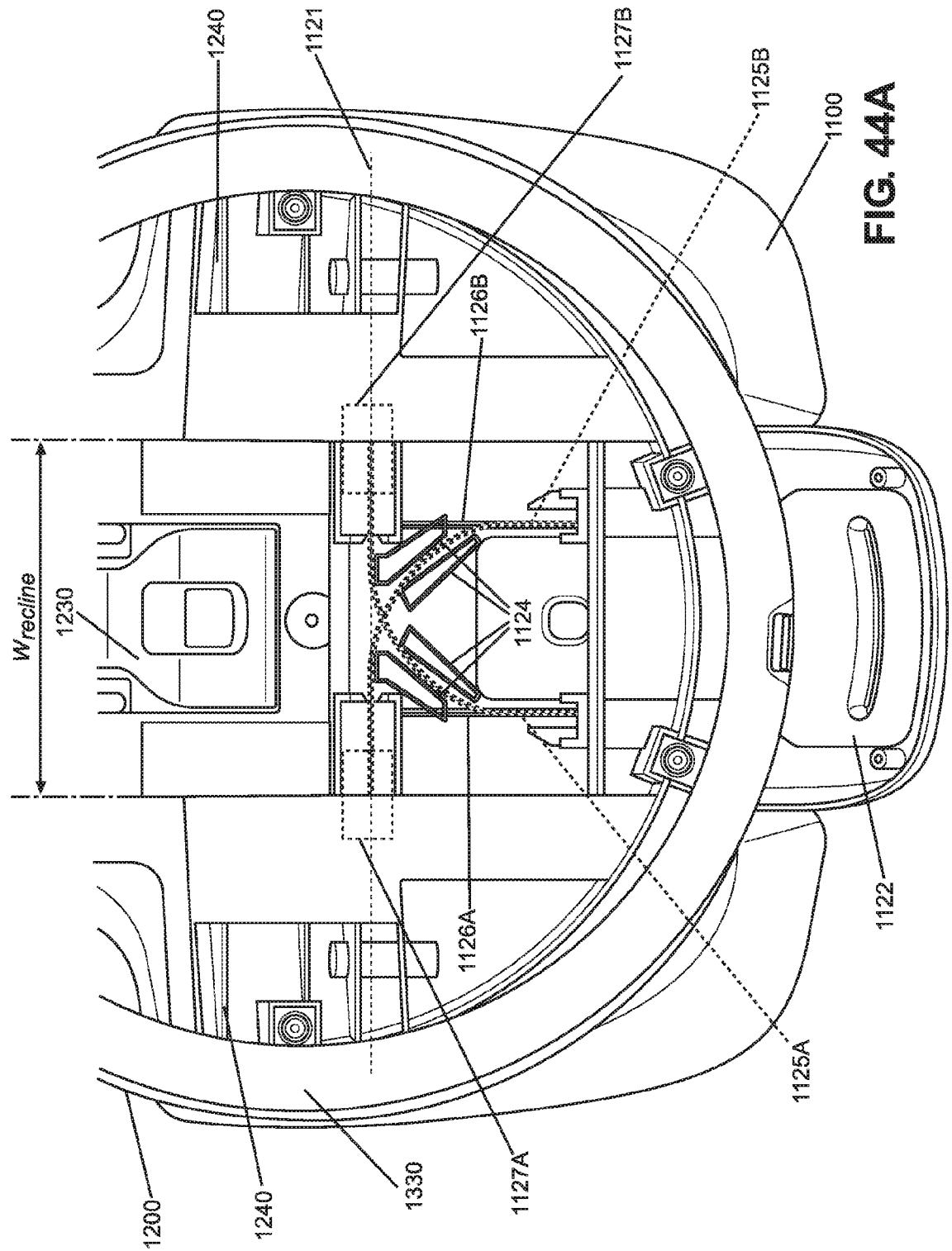
FIG. 44A shows a top view of the convertible child restraint of FIG. 17 showing the guide paths of a recline mechanism. The seat shell and the shield(s) are not shown for clarity.
Figure 44B:
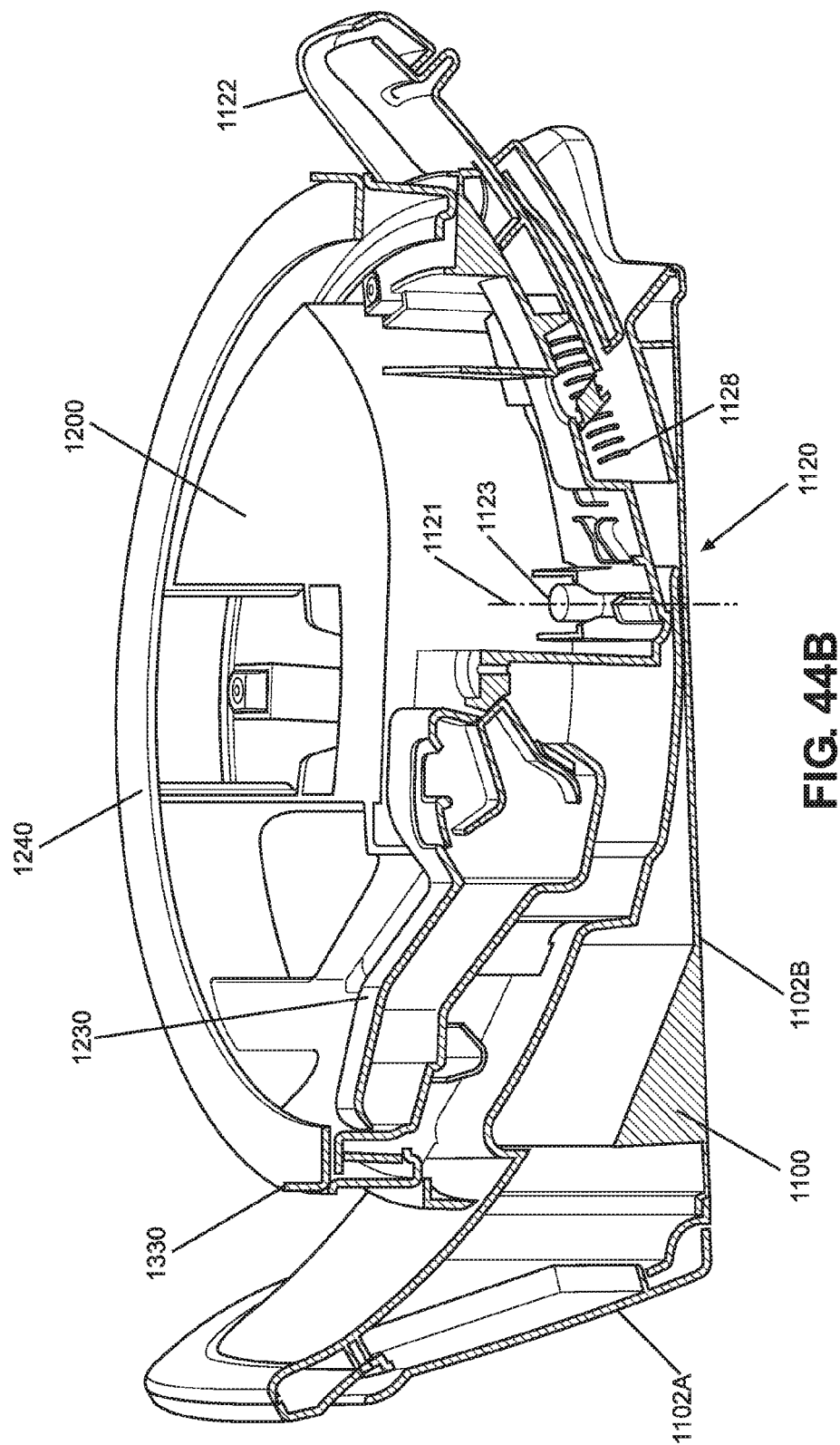
FIG. 44B shows a cross-sectional perspective view of the child restraint of FIG. 44A where the cross-section plane bisects the recline mechanism.
Figure 44C:
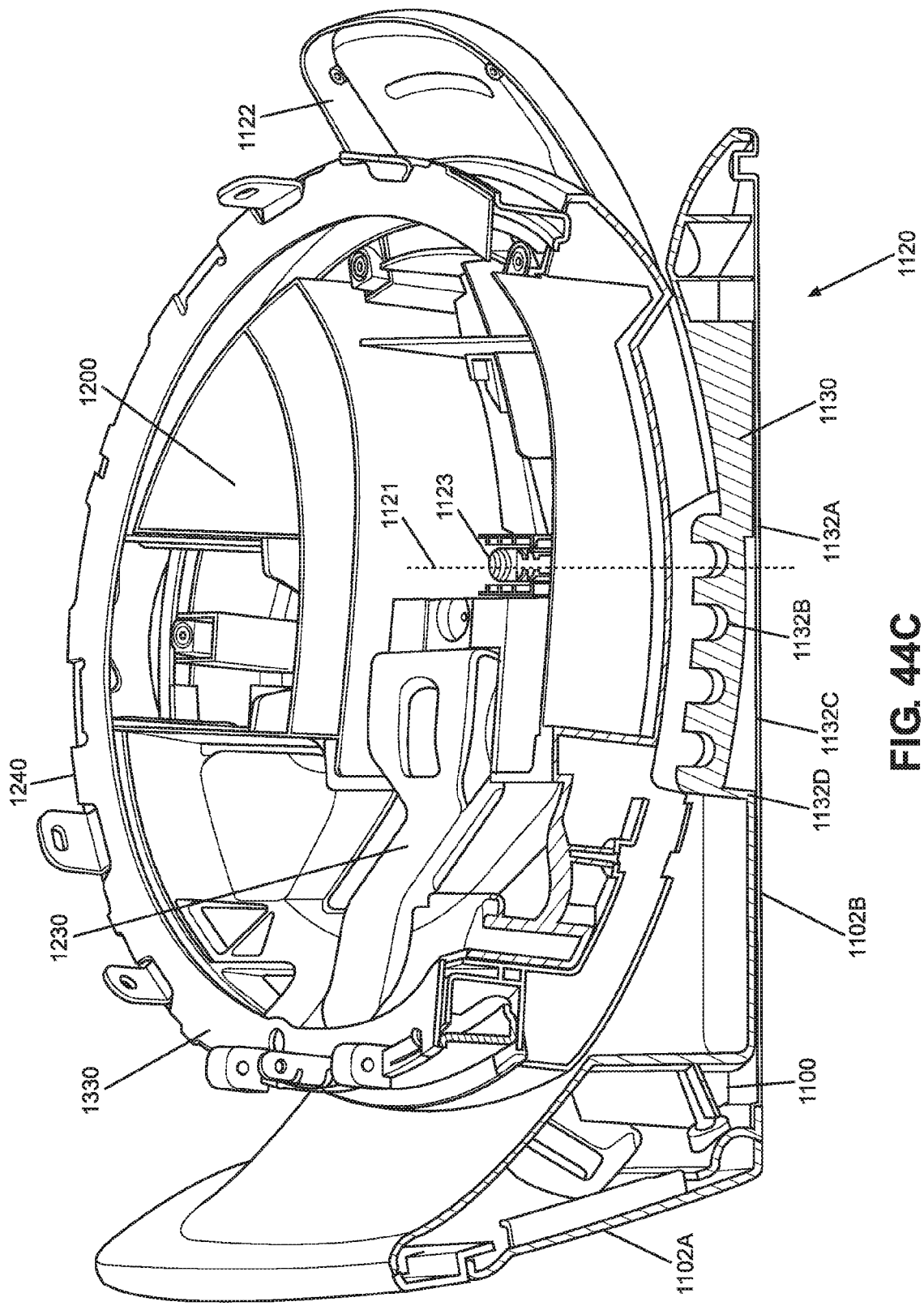
FIG. 44C shows a cross-sectional perspective view of the child restraint of FIG. 44A where the cross-section plane intersects a rail in the recline mechanism.

The recline mechanism 1120 may be an actuated mechanism that is actuated by an actuation handle 1122 disposed towards the front end of the child restraint 1000b when changing the recline position of the mid base 1200 and/or the seat shell 1300. In some implementations, the recline mechanism 1120 may be operated by the parent and/or the caregiver using a single hand. FIGS. 44A-44C show several views of an exemplary recline mechanism 1120 in the lower base 1100 and the mid base 1200 of the child restraint 1000b As shown in FIG. 44C, the recline mechanism 1120 may include one or more rails 1130 mounted to the lower base 1100. Each rail 1130 may include one or more openings/slots (e.g., slots 1132a-1132d) corresponding to the indexed recline positions. In some implementations, the recline mechanism 1120 may include a pair of rails 1130 aligned parallel with respect to one another (i.e., the respective slots 1132a-1132d of each rail 1130 are aligned) and positioned on opposing sides of the actuation handle 1122.

FIGS. 44A and 44B further show the recline mechanism 1120 may include a pair of lock pins 1127a and 1127b, which may be aligned along an axis 1121 and inserted through respective openings 1123 in the mid base 1200 and into one of the openings/slots 1132a-1132d of the rails 1130 to secure the mid base 1200 and the seat shell 1300 at a particular recline position. The lock pins 1127a and 1127b may be coupled to the actuation handle 1122 via flexible members 1125a and 1125b, respectively. The flexible members 1125a and 1125b may be various elongated components capable of supporting tensile and/or compressive loads such that pushing (towards the rear side 1301b) or pulling (towards the front side 1301a) the actuation handle 1122 causes the lock pins 1127a and 1127b to move into or out from the openings/slots 1132a-1132d, respectively. For example, the flexible members 1125a and 1125b may include, but are not limited to a strap, a band, and a cable. When the actuation handle 1122 is actuated and the lock pins 1127a and 1127b are disengaged from the rails 1130, the recline position of the mid base 1200 and the seat shell 1300 may then be adjusted. The recline mechanism 1120 may include a spring 1128 disposed within the mid base 1200 and coupled to the actuation handle 1122 such that the lock pins 1127a and 1127b are engaged to the rails 1130 when the actuation handle 1122 is not actuated.

FIG. 44A further shows the flexible members 1125a and 1125b may be constrained to follow guide paths 1126a and 1126b, respectively, within the mid base 1200. The guide paths 1126a and 1126b may be defined, in part, by various protruding features within the mid base 1200. As shown, the guide paths 1126a and 1126b may define a curved path with a curvature chosen to reduce the frictional resistance between the flexible members 1125a and 1125b and the protruding features defining the guide paths 1126a and 1126b. In some implementations, the guide paths 1126a and 1126b may be arranged to cross and/or overlap with one another. For example, FIG. 44A shows the guide path 1126a may be curved to the right and the guide path 1126b may be curved to the left, resulting in a single crossover point. This arrangement of the guide paths 1126a and 1126b may allow the recline mechanism 1120 to occupy less space within the mid base 1200, which, in turn, may lead to more clearance for other features of the child restraint 1000b (e.g., the rotation mechanism 1332) without increasing the overall size and/or envelope of the child restraint 1000b and/or reduce the size of the child restraint 1000b. For instance, the separation distance, $w_{recline}$, between the rails 1130 may be less than or equal to about 5.5 inches.

Figure 23:
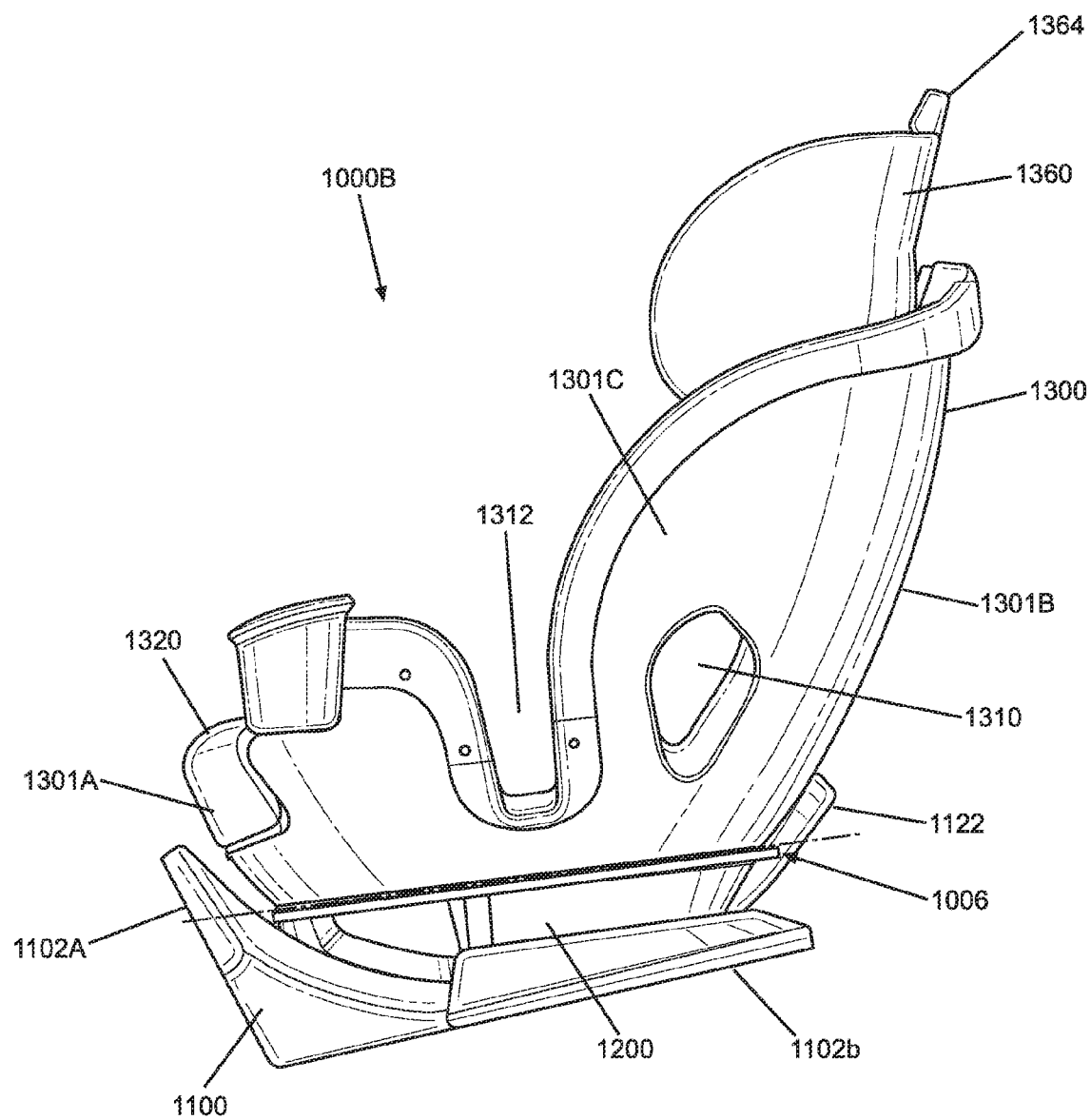
FIG. 23 shows a side view of the convertible child restraint of FIG. 17 with an annotated rotation plane between the mid base and the lower base.

The mid base 1200 may be coupled to the seat shell 1300 via the rotation mechanism 1332, which defines a rotation plane 1006 along which the seat shell 1300 is rotatable relative to the mid base 1200 as shown in FIG. 23. As before, the rotation mechanism 1332 may allow the seat shell 1300 to rotate 360 degrees when the child restraint 1000*b* is not installed on the vehicle seat 100. Similar to the child restraint 1000*a*, the rotation mechanism 1332 may be disposed above the recline mechanism 1120. In some implementations, the portion of the rear-facing belt path 1010*a* in the mid base 1200 may disposed above the recline mechanism 1120 and below the rotation mechanism 1332 to allow any forces or loads experienced by the child restraint 1000*b* to be effectively transferred between the belt 110 and the rotation mechanism 1332 while reducing the loads applied to the recline mechanism 1120.

Figure 24:
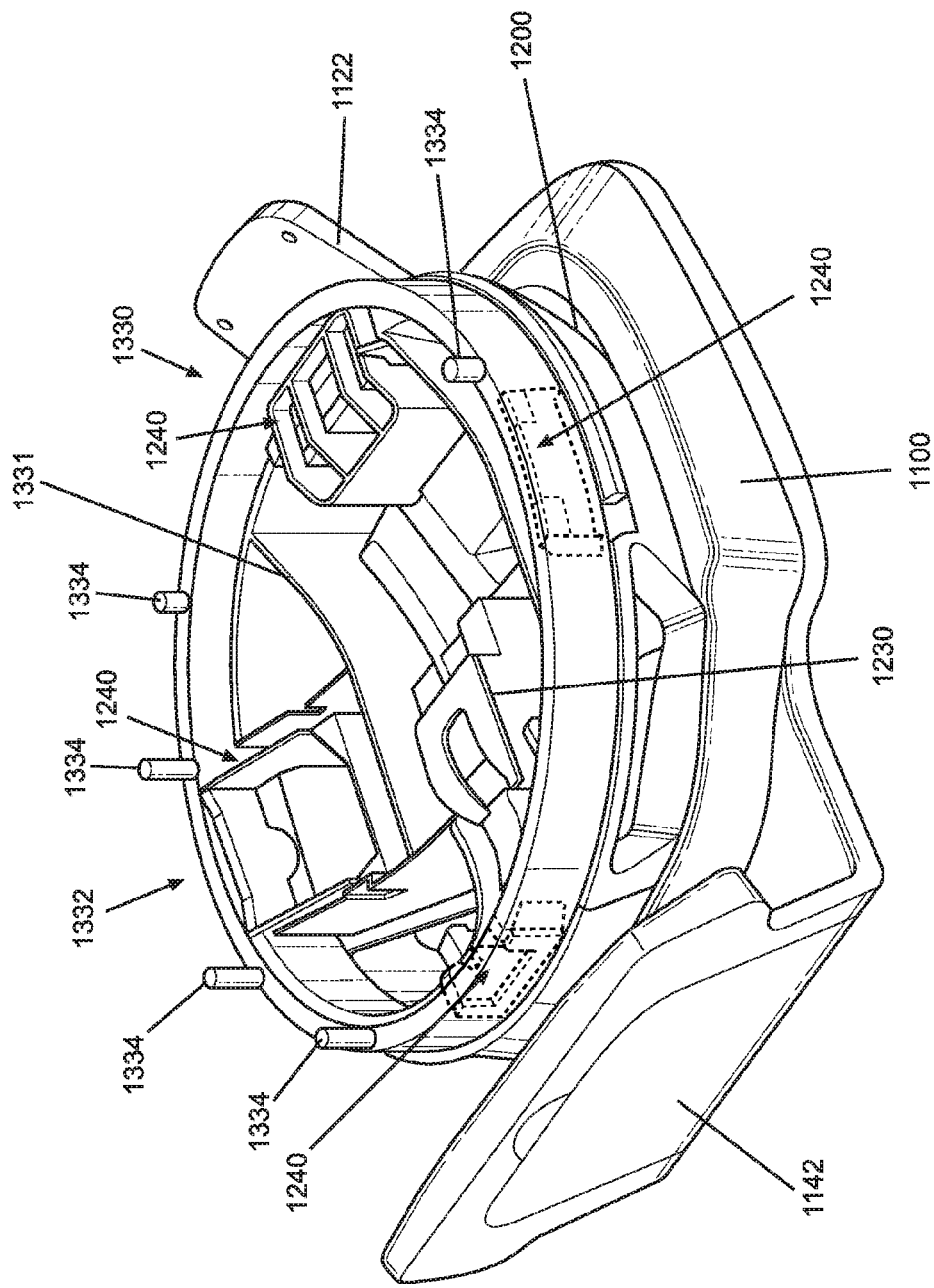
FIG. 24 shows a perspective view of a rotation mechanism in the convertible child restraint of FIG. 17 with a turn ring mounted to the seat shell rotatably coupled to several brackets mounted to the mid base. The seat shell is not shown for clarity.
Figure 25:
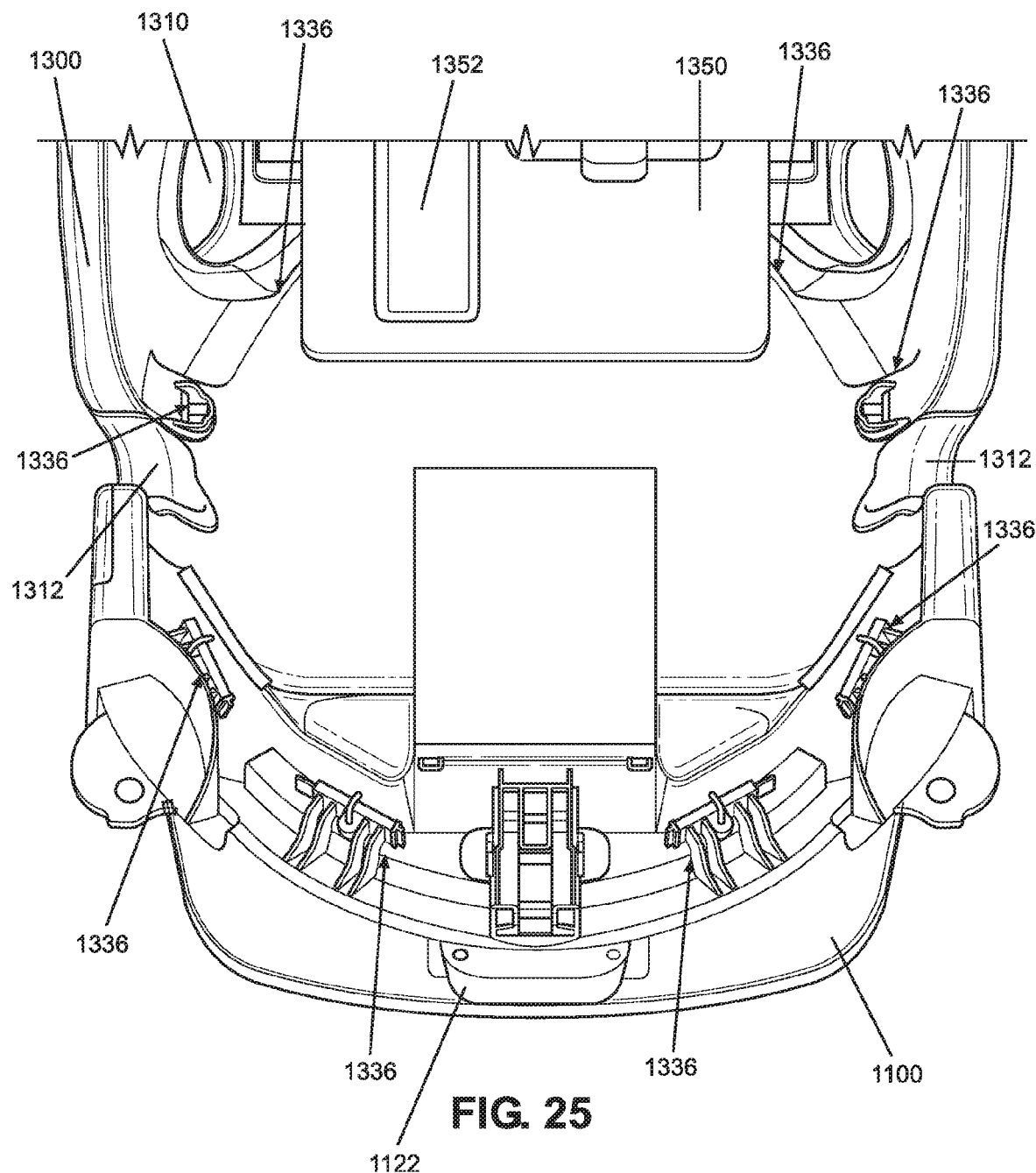
FIG. 25 shows a top view of the convertible child restraint of FIG. 17 without the belt access panel and attachment points to couple the seat shell to the turn ring.

The rotation mechanism 1332 may include a turn ring 1330 mounted to the seat shell 1300 and rotatably coupled to one or more brackets 1240 mounted to the mid base 1200 as shown in FIG. 24. The turn ring 1330 may be used, in part, to mechanically reinforce the child restraint 1000*b*. As shown, the brackets 1240 may be disposed at regular intervals along the turn ring 1330 and around the mid base 1200. In some implementations, the brackets 1240 may constrain the turn ring 1330 to rotate about a central axis relative to the mid base 1200 while the bottom flange of the turn ring 1330 remains under the plurality of brackets 1240. FIG. 25 shows the turn ring 1330 may include one or more attachment features 1334 that align and couple to corresponding attachment features 1336 on the seat shell 1300.

Figure 26:
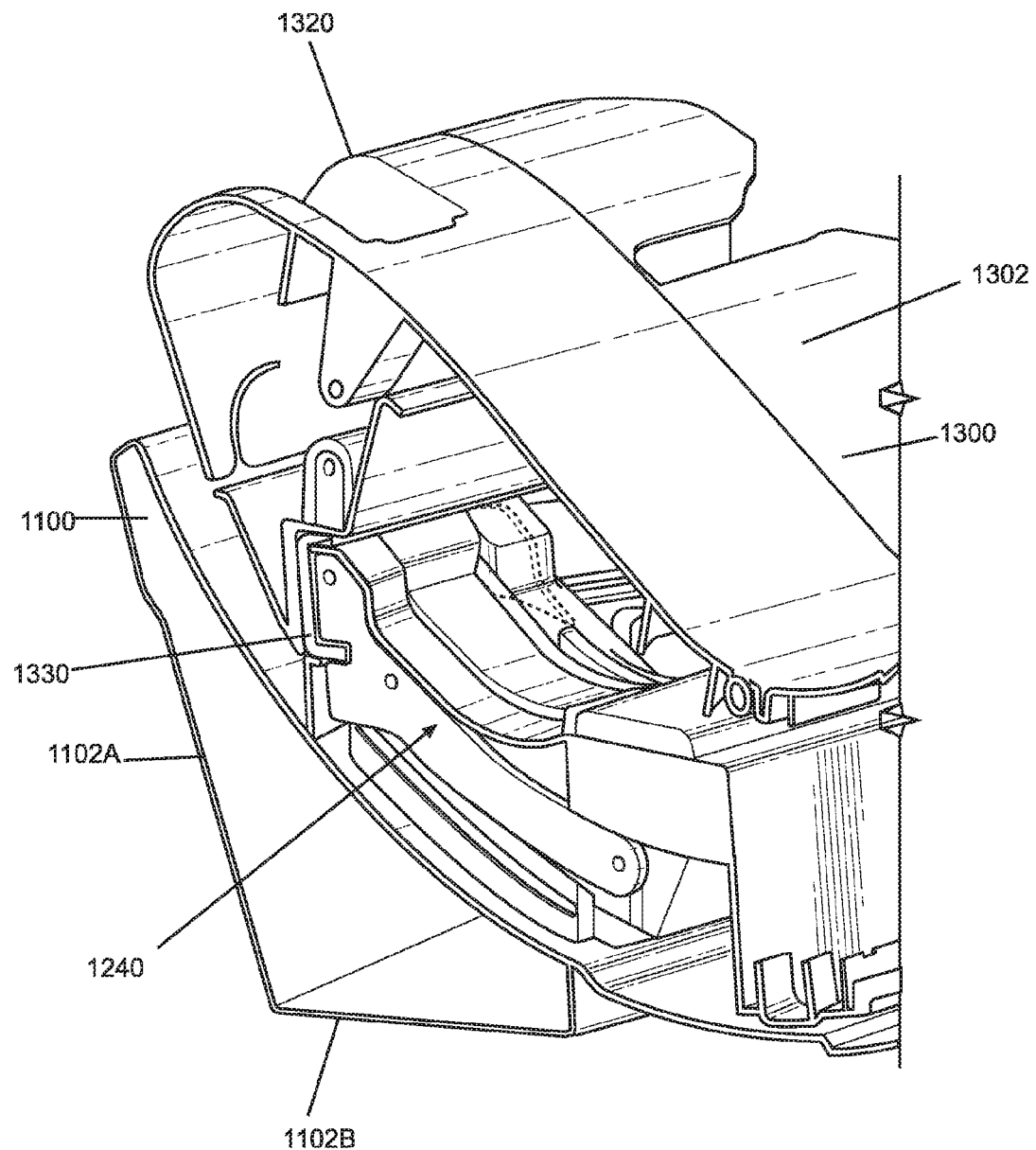
FIG. 26 shows a cross-sectional magnified view of one bracket located under the rear-facing belt path coupled to the turn ring.

The arrangement of the turn ring 1330 and the brackets 1204 may thus allow rotation of the seat shell 1300 relative to the mid base 1200 while holding the seat shell 1300 and mid base 1200 solidly together in every other direction except the intended rotation axis. The turn ring 1330 may be shaped and/or dimensioned to have similar, or in some instances, equal strength around the entire ring 1330. This may allow the turn ring 1330 to readily resist any forces experienced by the child restraint 1000*b* during, for example, a crash and transferred through the turn ring 1330 regardless of the rotational position of the seat shell 1300. FIG. 26 further shows one of the frame brackets 1240 may be located directly underneath the rear-facing belt path 1010*a* in the mid base 1200. The bracket 1240 may extend towards the outer periphery of the mid base 1200 from under the belt path 1010*a* to engage with the turn ring 1330. This allows for a very efficient and direct force transfer from the seat shell 1300 to the turn ring 1330, the turn ring 1330 to the bracket 1240, and finally to the bracket 1240 to the belt 110.

In some implementations, the turn ring 1330 and/or the brackets 1240 may be formed of various materials including, but not limited to steel and magnesium. The turn ring 1330 may also have a cross-sectional shape tailored to increase mechanical rigidity including, but not limited to a squared C-shape and an I-shape. In some implementations, the cross-sectional shape of the turn ring 1330 may be chosen, in part, to facilitate a connection with the brackets 1240.

Figure 31:
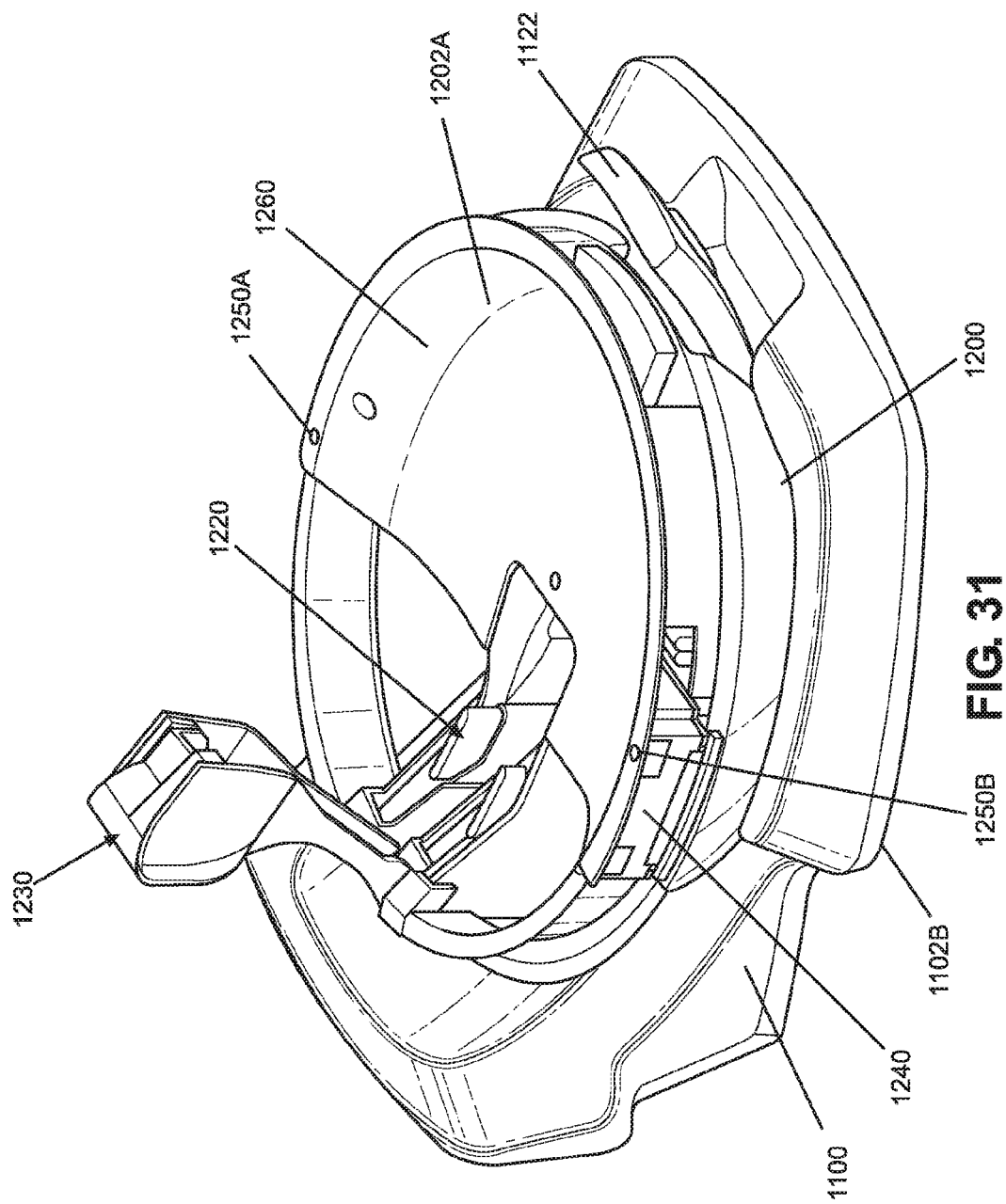
FIG. 31 shows a perspective view of a rotation lockout and a belt locking arm in the convertible child restraint of FIG. 17. The seat shell is not shown for clarity.
Figure 32:
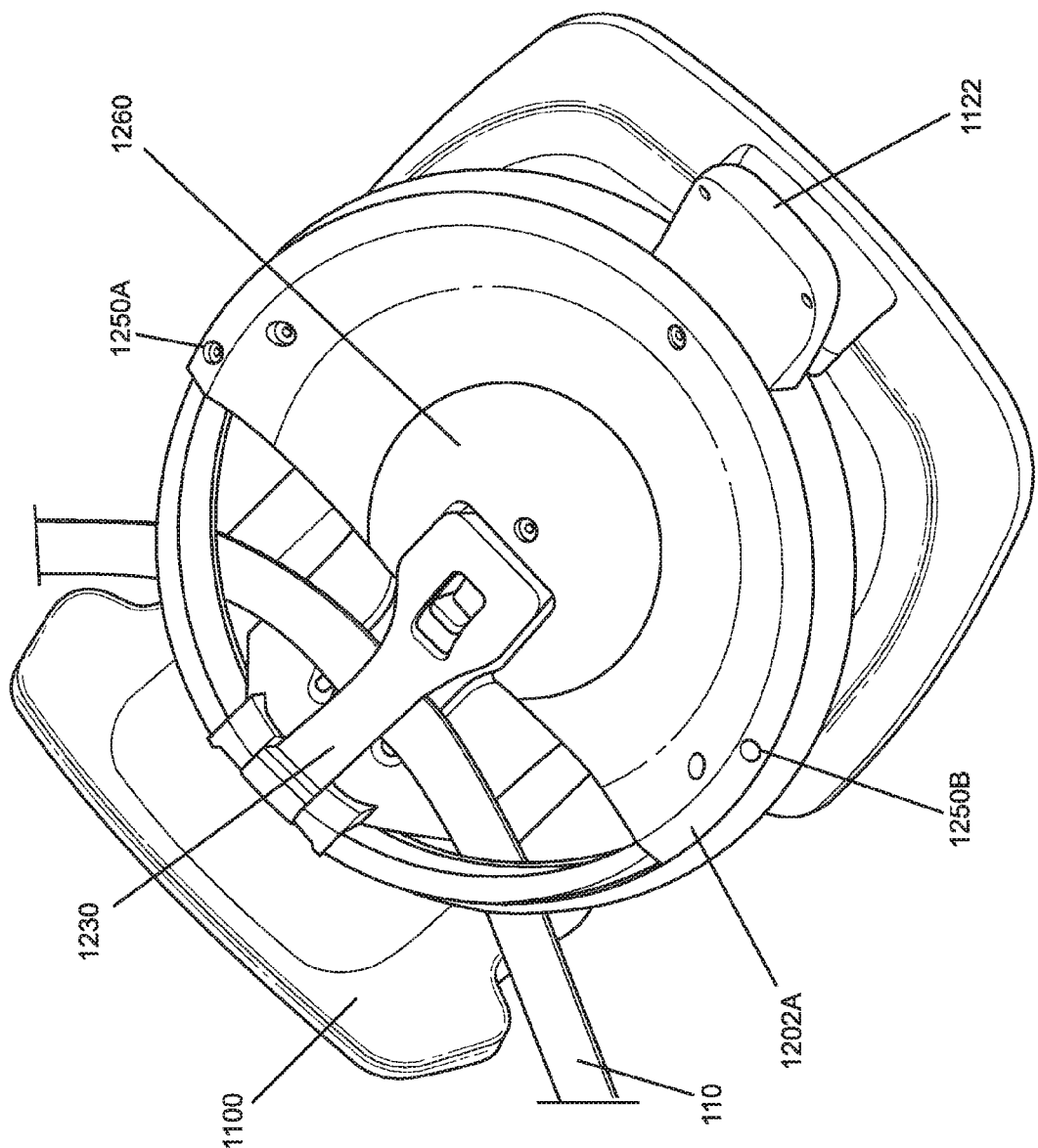
FIG. 32 shows a perspective view of the child restraint of FIG. 31 where the belt locking arm is in a closed position to engage a vehicle or LATCH belt. The seat shell is not shown for clarity.

The mid base 1200 may further include a belt locking arm 1230 to securely couple and tighten the belt 110 to the child restraint 1000*b* when the rear-facing belt path 1010*a* is used for installation. The belt locking arm 1230 may be pivotally mounted at the top of the belt path 1010*a* within the mid base 1200. During installation, the belt locking arm 1230 may be opened and the belt 110 may be laid across a recess or a channel along the rear-facing belt path 1010*a* below the belt locking arm 1230 (see, for example, FIG. 31). When the belt locking arm 1230 is pushed downwards, the belt 110 may be corrugated (e.g., a portion of the belt 110 may be consumed) and/or pressed into the recess or channel to tighten the belt 110 as shown in FIG. 32. The belt locking arm 1230 may then be locked in place, thus securing and tensioning the belt 110 to the child restraint 1000*b*.

The mid base 1200 may further include a rotation lockout 1220 to limit the range of rotation of the seat shell 1300 when the child restraint 1000*b* is installed in the rear-facing configuration. For example, the rotation lockout 1220, when actuated, may prevent the seat shell 1300 from being rotated from a rear-facing position to a forward-facing position, but may still allow the seat shell 1300 to rotate to a side-facing position to provide greater ease of access to the child restraint 1000*b* when loading or unloading a child. In some implementations, the child restraint 1000*b* may also include multiple rotation stops 1222. For example, the turn ring 1330 may include a pair of rotation stops 1222 arranged to allow the seat shell 1300 to be rotated approximately +/−120 degrees where 0 degrees corresponds to the rear-facing position.

Figure 33:
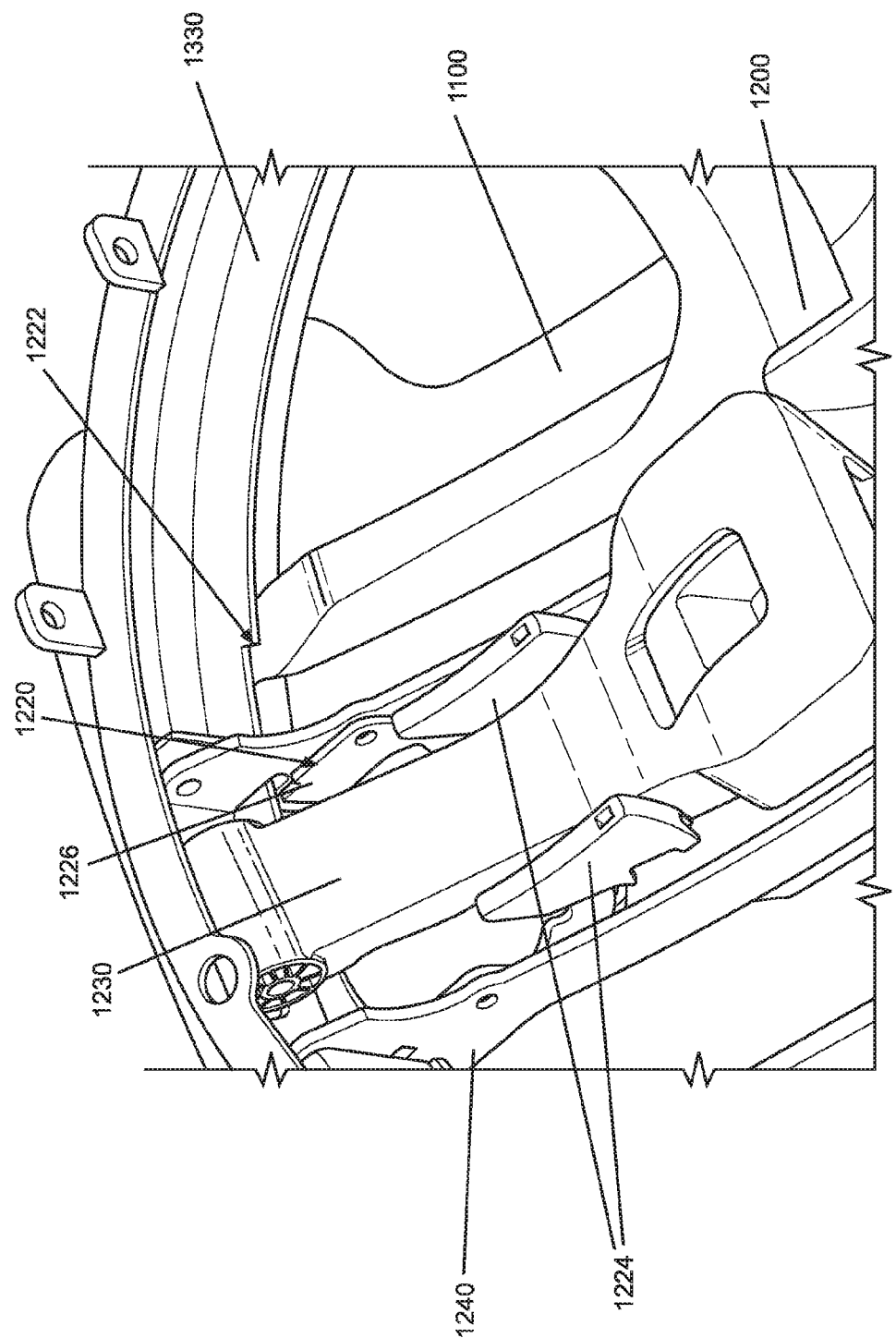
FIG. 33 shows a magnified view of a rotation lockout and a rotation stop on the mid base.

As before, the rotation lockout 1220 may be a lever mechanism that is rotatably coupled to the mid base 1200 and includes a plunger end 1224 and a lockout end 1226. When the belt 110 is secured to the child restraint 1000*b* via the belt locking arm 1230, the belt 110 may compress the plunger end 1224, causing the lockout end 1226 to rotate such that the lockout end 1226 is in the same plane as the rotation stop(s) 1222 on the turn ring 1330 as shown in FIG. 33. When the seat shell 1300 is subsequently rotated, the lockout end 1226 may contact the rotation stop 1222, thus preventing further rotation of the seat shell 1300. The rotation lockout 1220 may be spring-biased such that when the belt 110 is removed, the rotation lockout 1220 may disengage from the rotation stop 1222, thus allowing the seat shell 1300 to rotate freely 360 degrees.

In some implementations, the convertible child restraint 1000*b* may include multiple rotation lockouts 1220. For example, FIGS. 31 and 33 show the child restraint 1000*b* with a pair of rotation lockouts 1220 arranged such that the respective plunger ends 1224 of the rotation lockouts 1220 are disposed on opposing sides of the belt locking arm 1230. When the belt 110 is routed under the belt locking arm 1230 during a rear-facing installation, the belt 110 may actuate both rotation lockouts 1220.

Figure 34:
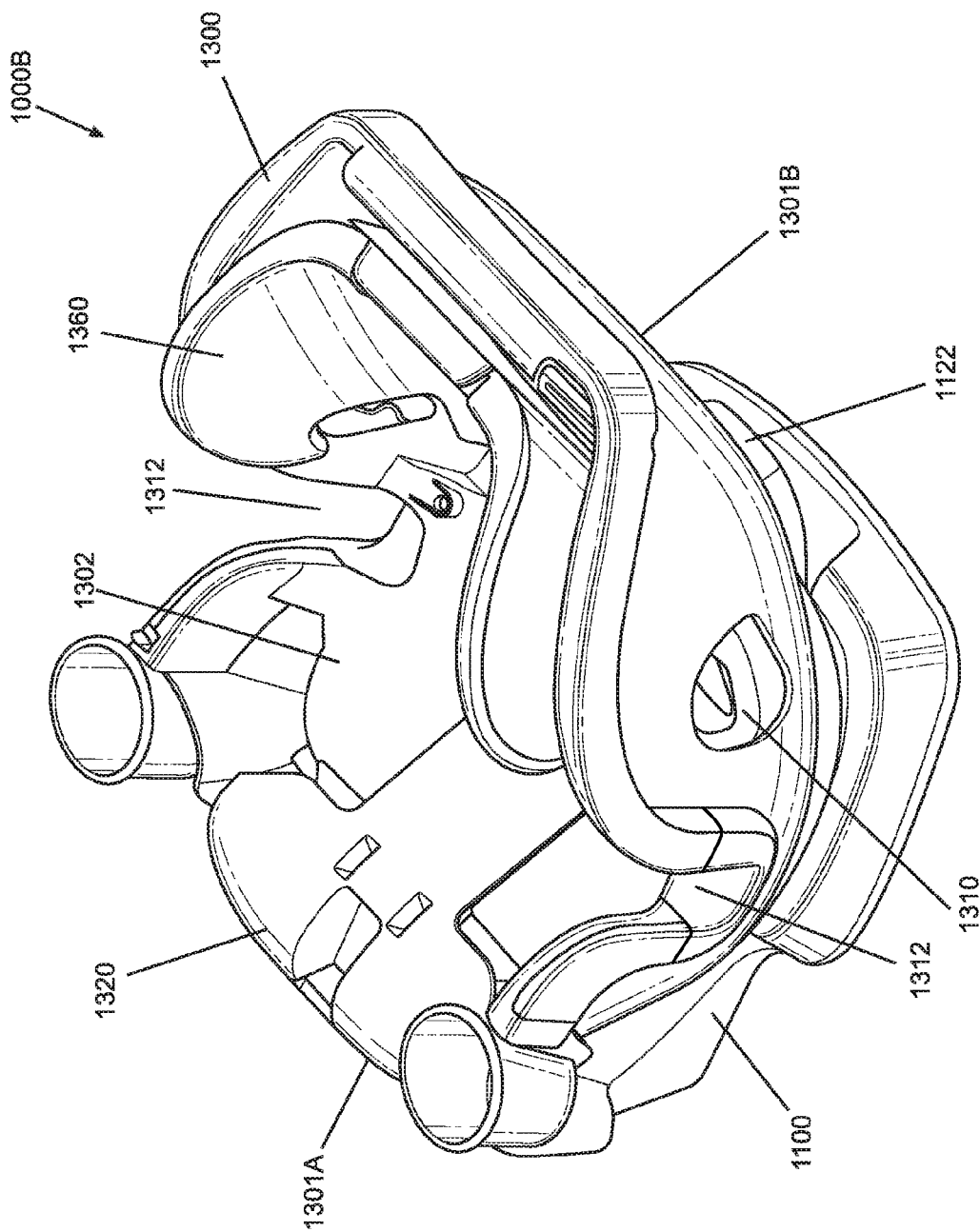
FIG. 34 shows a perspective view of the convertible child restraint of FIG. 17 where the seat shell is at a rear-facing position and the belt access panel is closed.
Figure 35:
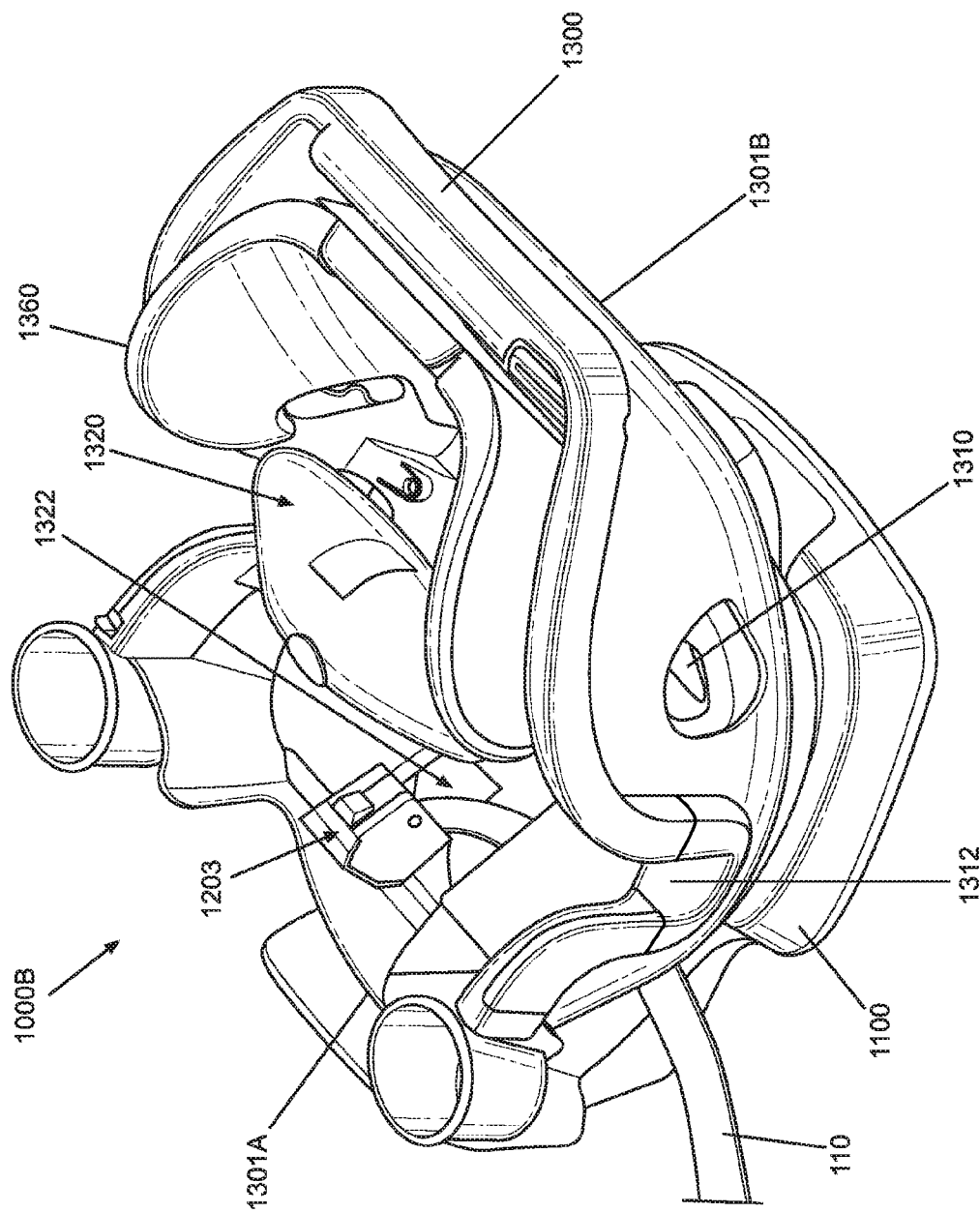
FIG. 35 shows a perspective view of the convertible child restraint of FIG. 34 where the belt access panel is opened.

The seat shell 1300 may include a seat pan 1302 and a seatback section 1303 to support the child and various features to facilitate installation of the child restraint 1000*b* to the vehicle seat 100 using the belt paths 1010*a*-1010*c*. For example, FIG. 34 shows the seat shell 1300 may include a belt path access panel 1320, which may be opened to expose an interior portion of the mid base 1200 via a belt access opening 1322. The belt access panel 1320 (also referred to herein as a "center front adjuster (CFA) panel") may be connected to the seat shell 1300 at a first end with a hinged joint near the bight of the seating pan 1302. When closed, the second end of belt access panel 1320 may be locked to the seat shell 1300 near the front side 1301*a* of the seat shell 1300 where the child's feet are located. With the belt access panel 1320 opened, the parent and/or the caregiver may have clear, unobstructed access to the rear facing belt path 1010*a* to install the vehicle or LATCH belt 110 via the belt locking arm 1230 as shown in FIG. 35.

Figure 27:
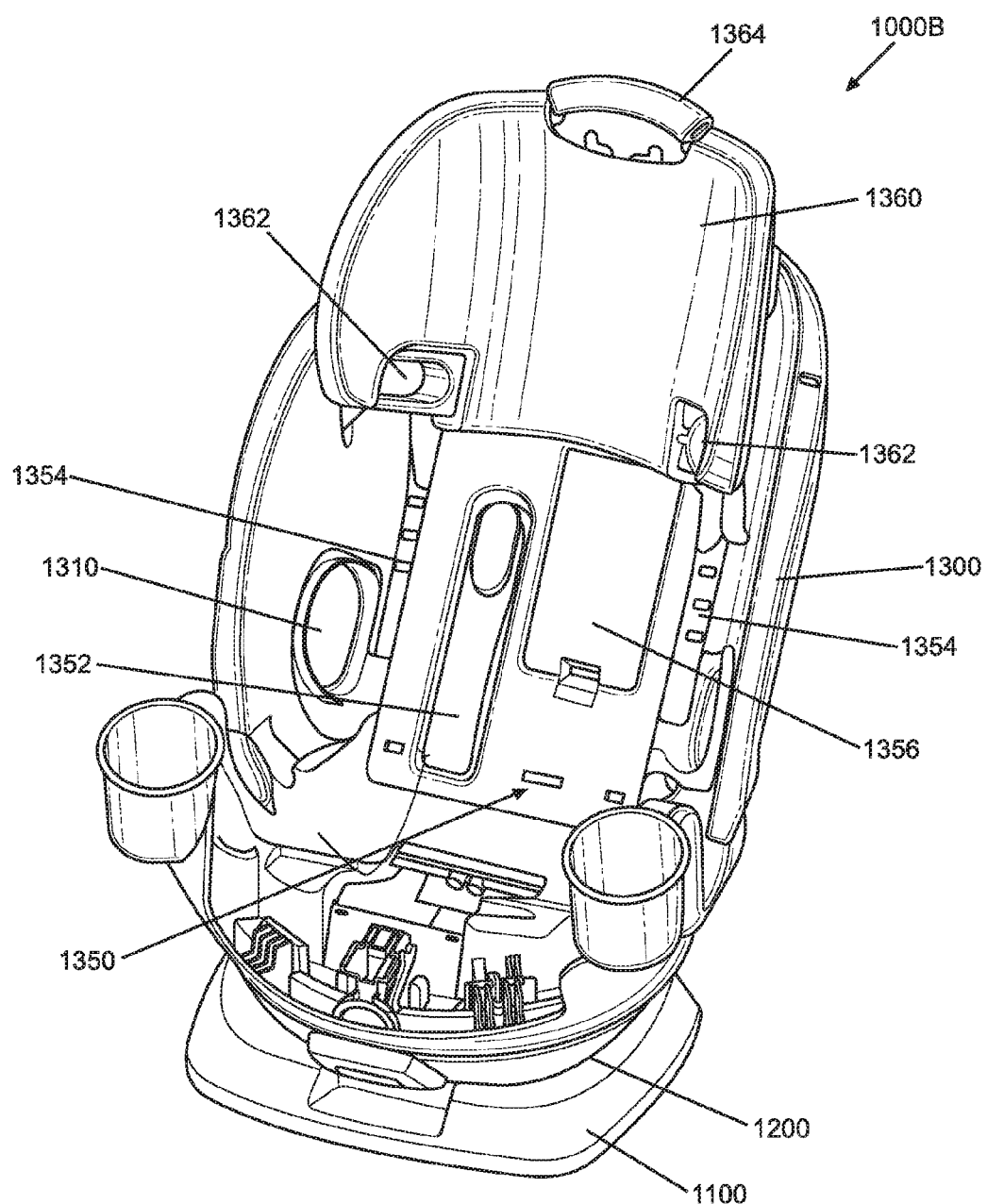
FIG. 27 shows a perspective view of a seatback insert disposed on the seat shell of the convertible child restraint of FIG. 17.
Figure 28:
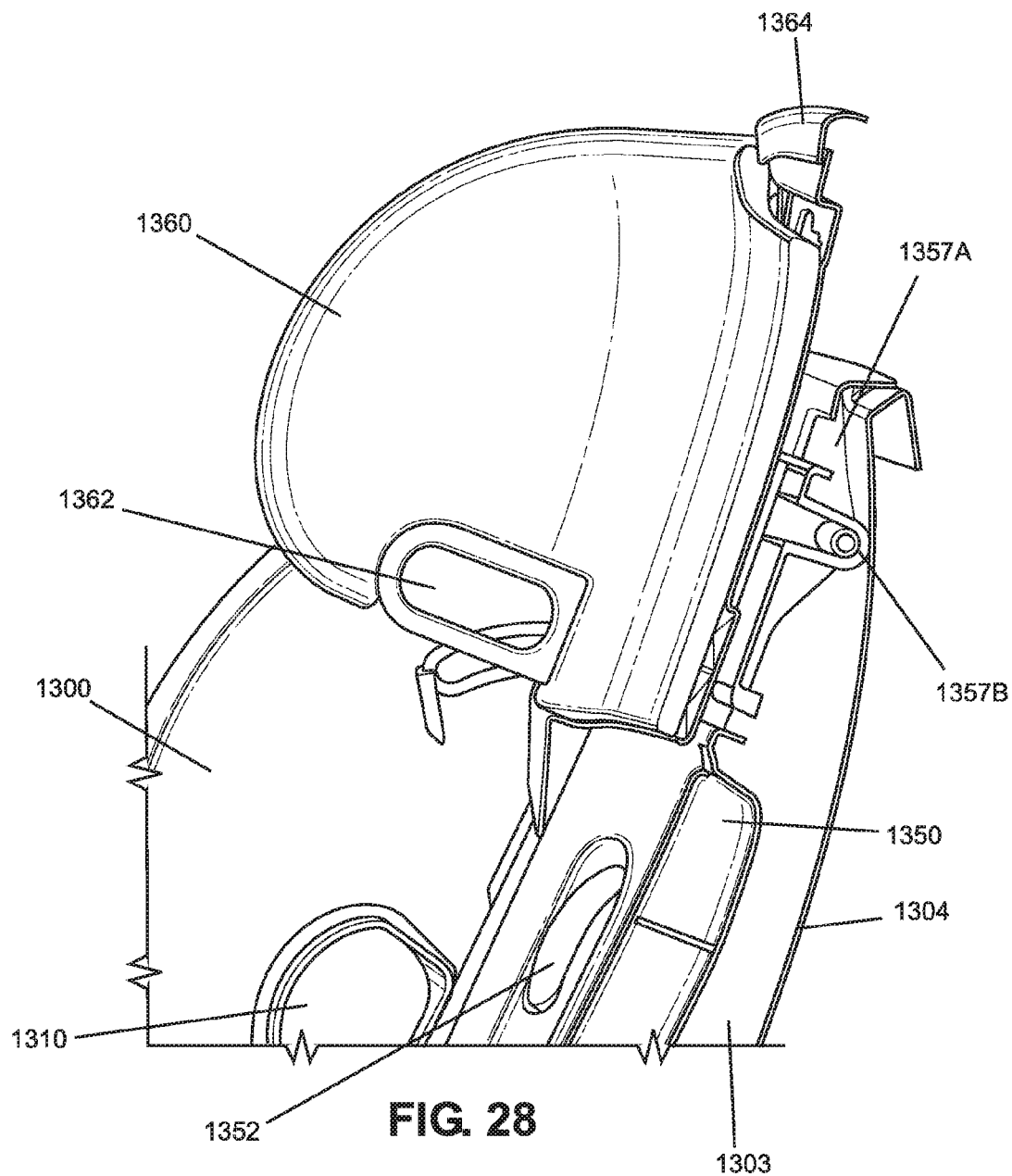
FIG. 28 shows a cross-sectional magnified view of a headrest and the seatback insert of the convertible child restraint of FIG. 17.
Figure 29:
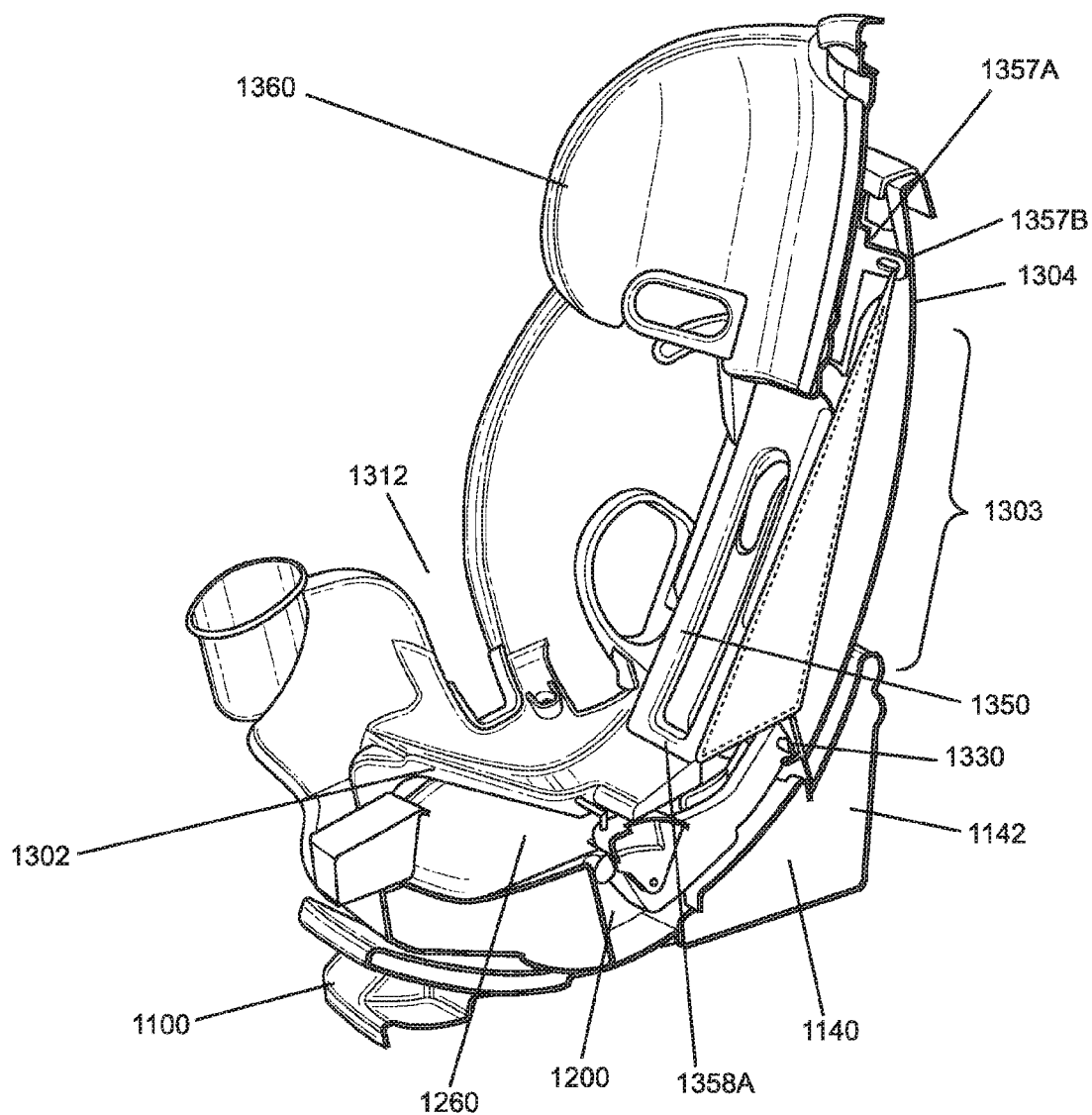
FIG. 29 shows a cross-sectional view of the convertible child restraint of FIG. 17 where the seatback insert, the seat shell, and the turn ring are shown to form a triangular structure.

In another example, FIG. 27 shows the seat shell 1300 may include a seatback insert part 1350, forming the upper portion of the occupant seating space. The seatback insert 1350 may be held in place at the lower end by a steel pin forming part of a pin joint 1358*b* which passes through a base 1358*a* of the seatback insert 1350, the turn ring 1330, and the seat shell 1300 to hold these components together. FIG. 28 shows the top end 1357*a* of the seatback insert 1350 is attached to the top end of the seat shell 1300 via another pin joint 1357*b*. In some implementations, the seatback insert 1350 may form one leg of a triangular structure with the seat shell 1300 forming a second leg and the turn ring 1330 forming a third leg as shown in FIG. 29. This triangular arrangement may sufficiently reinforce the seat shell 1300 such that additional metal frame tubing, L tubing, and/or other auxiliary plastic structures in the seatback section 1303 may be excluded from the child restraint 1000*b*, thus reducing the overall weight of the convertible child restraint 1000*b*.

In some implementations, the seatback insert 1350 may include a belt locking arm 1352 to secure the belt 110 to the child restraint 1000*b* when the forward-facing belt path 1010*b* is used for installation. The belt locking arm 1352 may operate in a similar manner to the belt locking arm 1230 to clamp and tighten the belt 110 to the child restraint 1000*b*. In some implementations, the seatback insert 1350 may also include a storage compartment 1356 to store an integrated harness when the harness is not used (e.g., the child restraint 1000*b* is not installed to the vehicle seat 100, the child restraint 1000*b* is installed using the belt positioning booster configuration).

Figure 30:
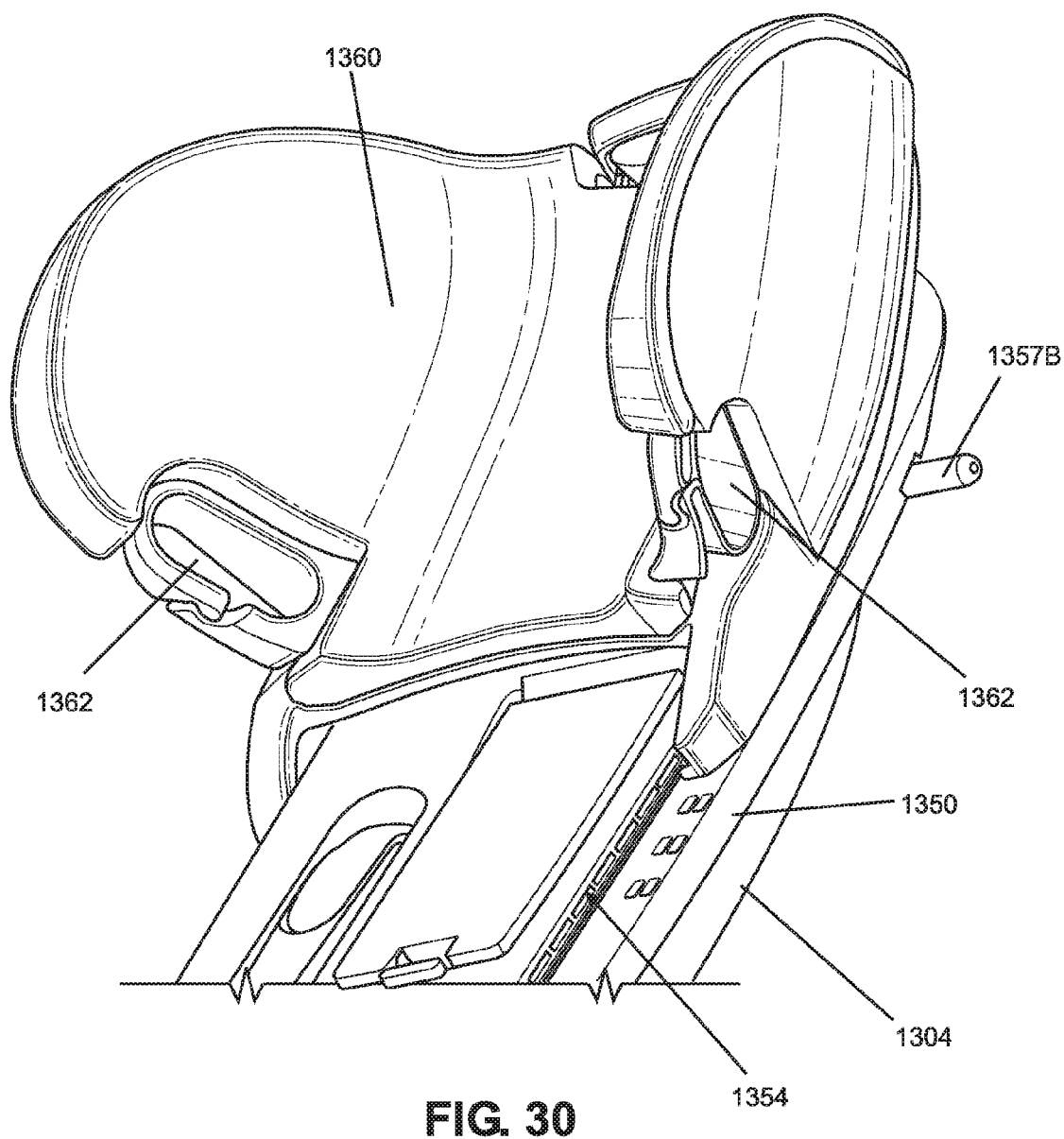
FIG. 30 shows a magnified view of the seatback insert part and the headrest in the convertible child restraint of FIG. 17.
Figure 42A:
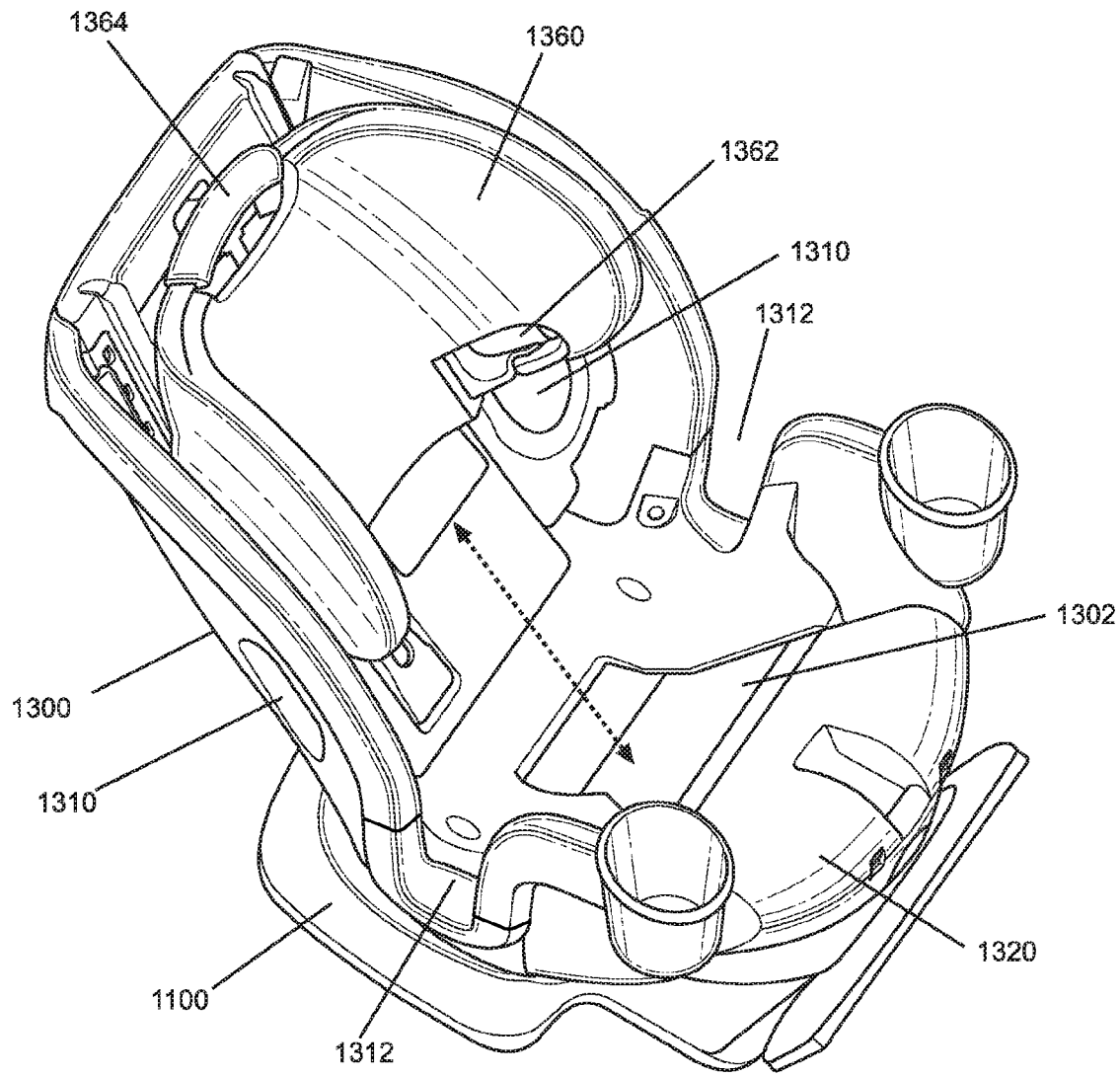
FIG. 42A shows a top perspective view of the convertible child restraint of FIG. 17 where a headrest is located at a lower position.
Figure 42B:
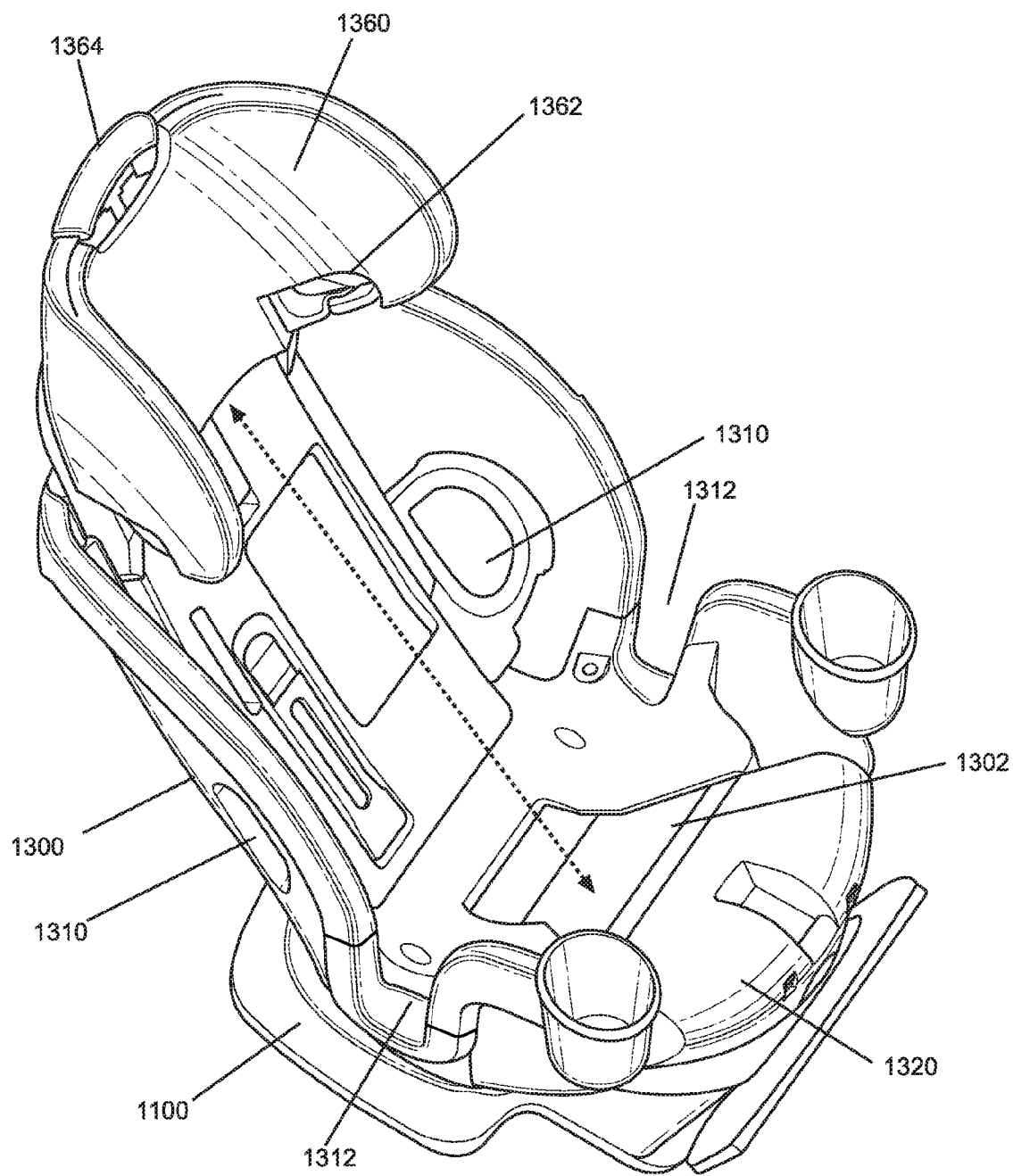
FIG. 42B shows a top perspective view of the convertible child restraint of FIG. 42A where the headrest is located at a higher position.

The seat shell 1300 may also support an adjustable headrest 1360. FIG. 30 shows the seatback insert 1350 may include a track 1354 to guide the movement of a headrest portion 1360 from a lower to a higher position. The track 1354 may define, in part, indexed headrest positions to position and lock the headrest 1360 to the seat shell 1300 at various heights. For example. FIG. 42A shows the headrest 1360 at a lower position along the seat shell 1300 and FIG. 42B shows the headrest 1360 at a higher position along the seat shell 1300. In some implementations, the distance between a bottom portion of the headrest 1360 and the seat pan 1302 may range between about 8.8 inches to about 18.7 inches.

In some implementations, the seatback section 1303 and, in particular, the seatback insert 1350 may be curved. The curvature of the seatback insert 1350 may cause the headrest 1360 to move forwards towards the front side 1301*a* of the seat shell 1300 as the headrest 1360 is raised to a higher position. The forward displacement of the headrest 1360 may provide sufficient clearance to avoid a collision between the headrest 1360 and a headrest on the vehicle seat 100. Thus, the curved seatback insert 1350 may provide a larger range of height adjustment for the headrest 1360. Additionally, the vertical and horizontal movement of the headrest 1360 may function as a secondary recline mechanism to position the child's head in a more upright position when the headrest 1360 is raised to a higher position.

As described above, the convertible child restraint 1000*b* may also include an integrated harness to restrain a child for both the rear-facing and forward-facing configurations. In some implementations, the harness may be a five-point harness in which multiple straps covering the child's torso and waist are connected at a single location and tightened via, for example, one or more cam locks. The harness may be mounted to the seat shell 1300 using, in part, an aloc strap 1400 that is routed below the seat pan 1302 and behind the seatback 1304. The aloc strap 1400 may thus be partially disposed within the interior portion of the mid base 1200. In general, it is preferable for the aloc strap 1400 to be coupled only to the seat shell 1300 and/or the belt access panel 1320 such that when the seat shell 1300 is rotated, the aloc strap 1400 moves together with the seat shell 1300. The aloc strap 1400 may further include a cam lock to tighten the integrated harness when the child is placed into the convertible child restraint 1000*b*.

Figure 41A:
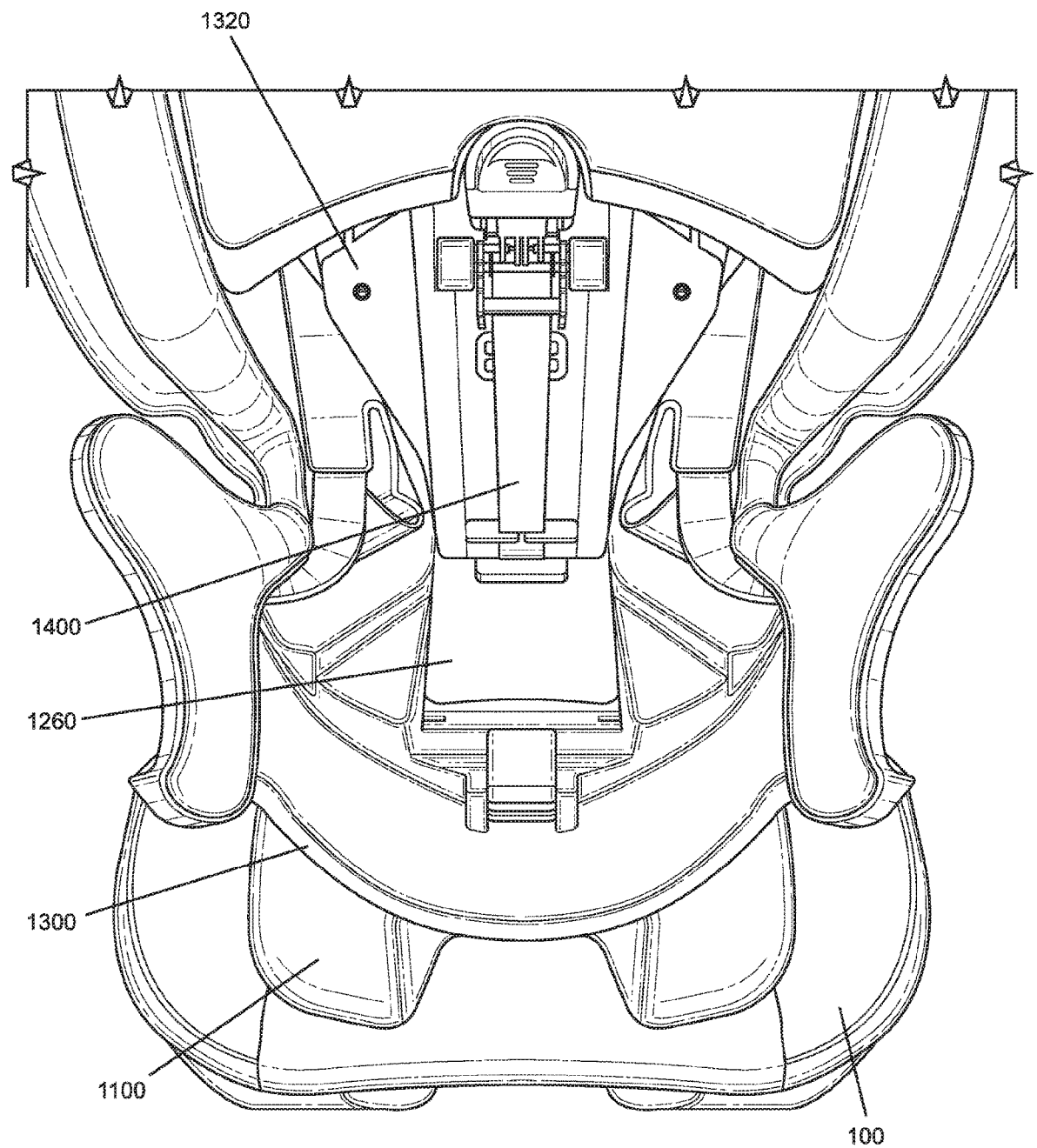
FIG. 41A shows a top perspective view of the convertible child restraint of FIG. 17 where the belt access panel is open and an aloc strap is routed underneath the seat pan and behind the seatback of the seat shell.
Figure 41B:
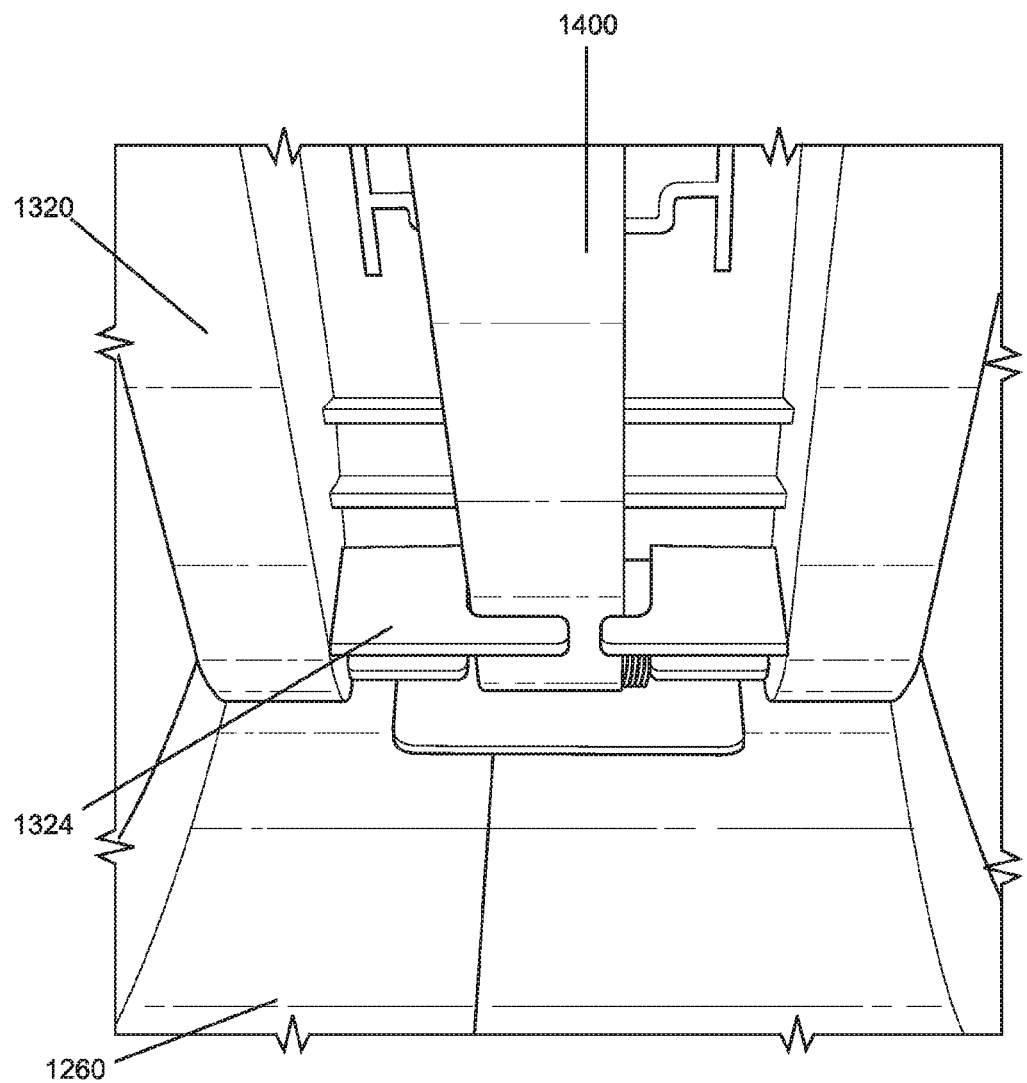
FIG. 41B shows a magnified view of a belt routing feature for the aloc strap of FIG. 41A disposed below the seat pan of the seat shell.

In some implementations, the convertible child restraint 1000*b* may include several features to reduce or, in some instances, prevent the aloc strap 1400 from getting caught onto various structural features within the mid base 1200. In one example, the mid base 1200 may include a shield component 1260 disposed above the brackets 1240 and below the seat shell 1300 (see, for example, FIGS. 32 and 36). The shield 1260 may cover an interior portion of the mid base 1200 and provide a substantially smooth surface for the aloc strap 1400 to contact in the event the aloc strap is loose. For instance, FIGS. 41A and 41B show the aloc strap 1400 may be disposed below the belt access panel 1320 and above the shield 1260. If the aloc strap 1400 is loose, the aloc strap 1400 may thus slide along the surface of the shield 1260 as the seat shell 1300 is rotated.

In another example, the seat shell 1300 may include a belt routing feature 1324 (also referred to as a "CFA strap control rib") to reduce or, in some instances, prevent the aloc strap 1400 from sagging down and contacting, for example, the shield 1260. As shown in FIGS. 41A and 41B, the belt routing feature 1324 may retain the aloc strap 1400 against the belt access panel 1320 and/or the bottom of the seat pan 1302 in order to reduce the likelihood of the aloc strap 1400 getting caught on the mid base 1200.

Figure 36:
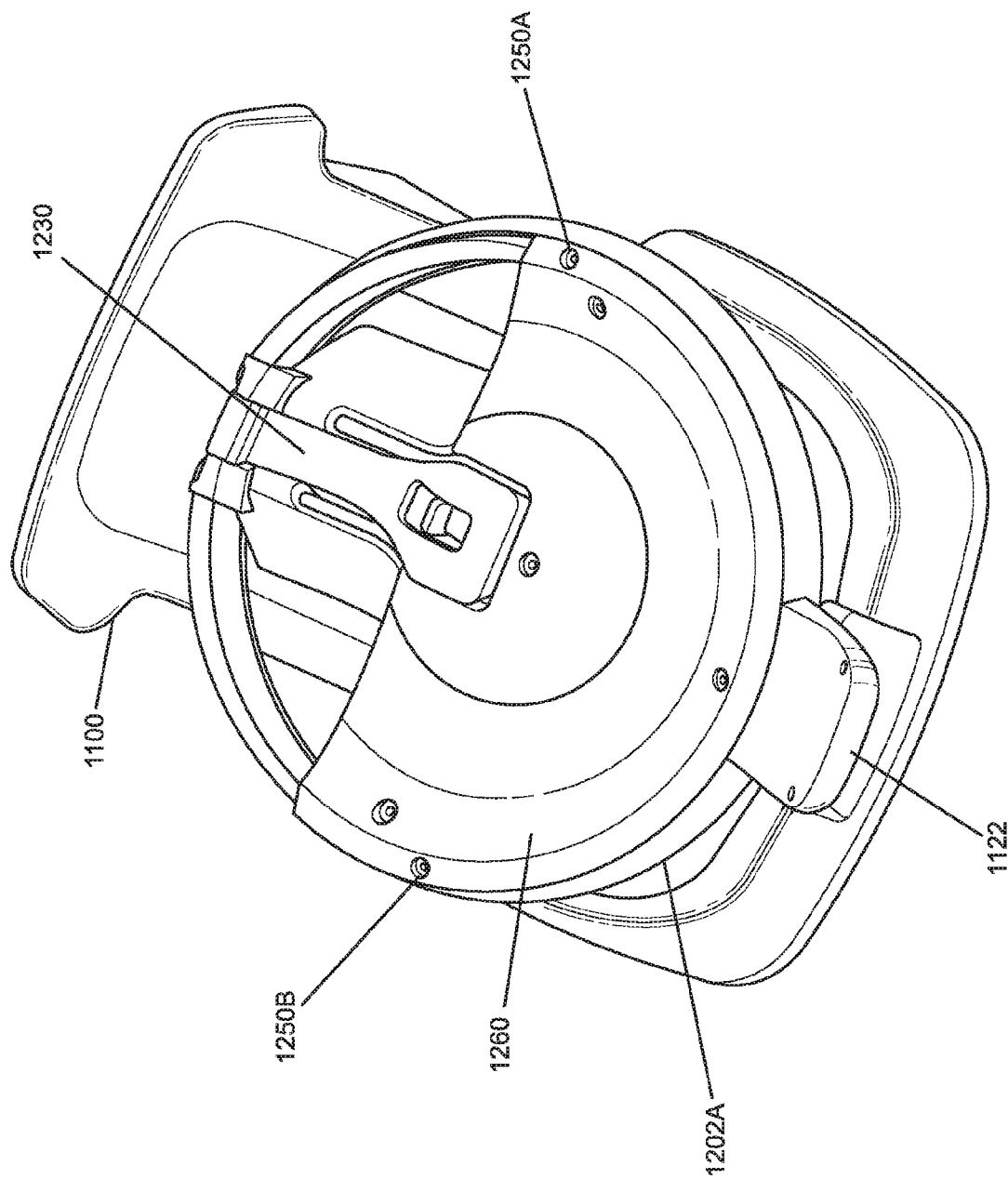
FIG. 36 shows a top perspective view of the mid base and the lower base in the convertible child restraint of FIG. 17. The seat shell is not shown for clarity.

In some implementations, the seat shell 1300 may include a lock pin mechanism 1370 to lock the seat shell 1300 to the mid base 1200 at a particular rotational position. For example, FIG. 36 shows the mid base 1200 may include openings 1250*a* and 1250*b* disposed on a top side 1202*a* of the mid base. The lock pin mechanism 1360 may include at least one lock pin 1372 that is spring-biased to move into the one of the openings 1250*a* and 1250*b*, thus locking the seat shell 1300 to the mid base 1200. In some implementations, the openings 1250*a* and 1250*b* may be arranged on the mid base 1200 such that the seat shell 1300 may only be locked into either a rear-facing or a forward-facing position relative to the mid base 1200. In some implementations, the mid base 1200 may not include openings to lock the seat shell 1300 at rotational positions between the rear-facing or forward-facing positions (e.g., a side-facing position) in order to discourage the parent and/or the caregiver from leaving the seat shell 1300 in a side-facing position and/or treating the side-facing position as another configuration of the convertible child restraint 1000*b*. Thus, the seat shell 1300 may be freely rotating between the rear-facing and forward-facing positions.

Figure 37A:
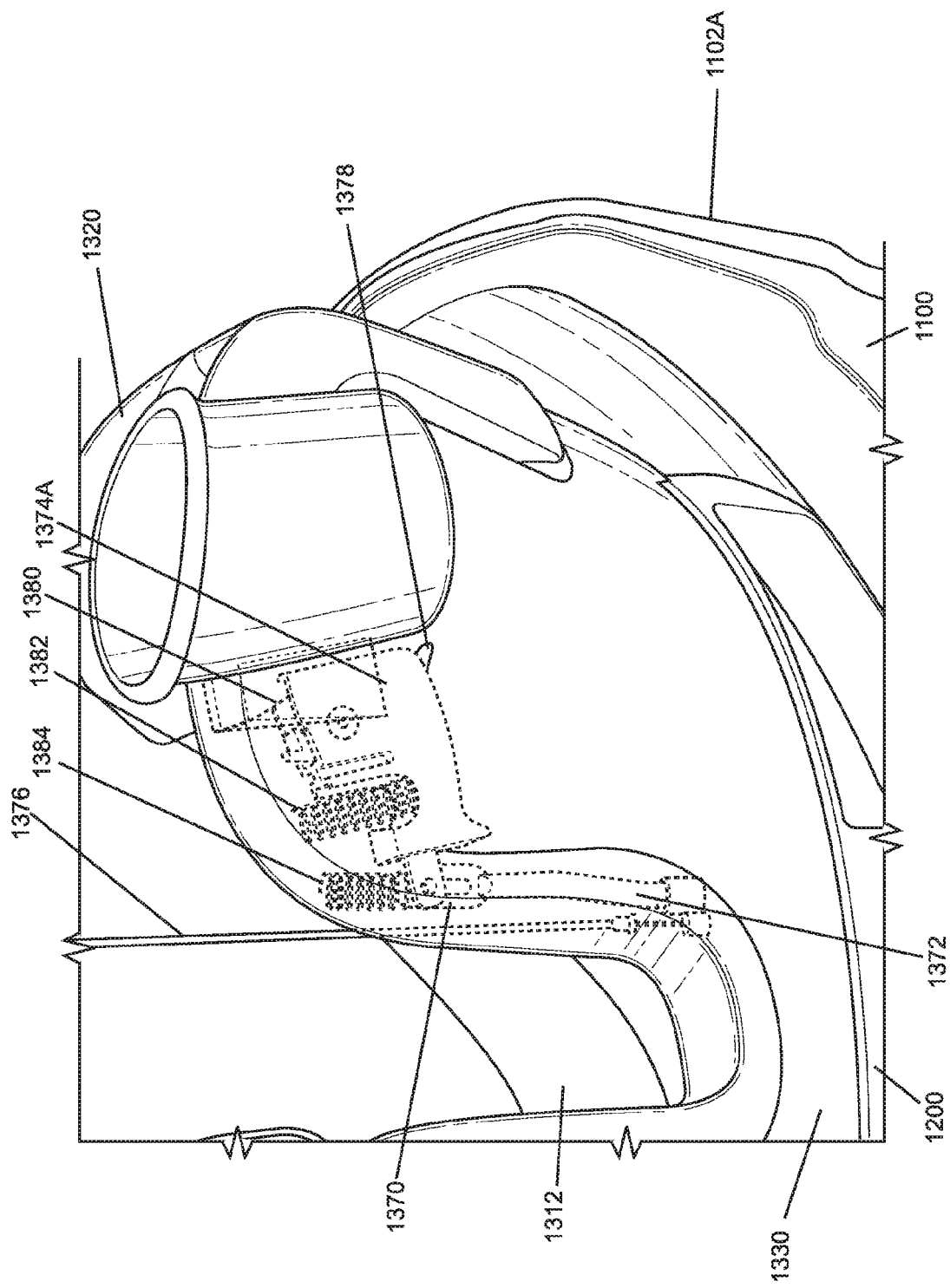
FIG. 37A shows a perspective view of a lock pin mechanism in the child restraint of FIG. 17 having an actuation handle and a secondary lock coupled to a lock pin.
Figure 37B:
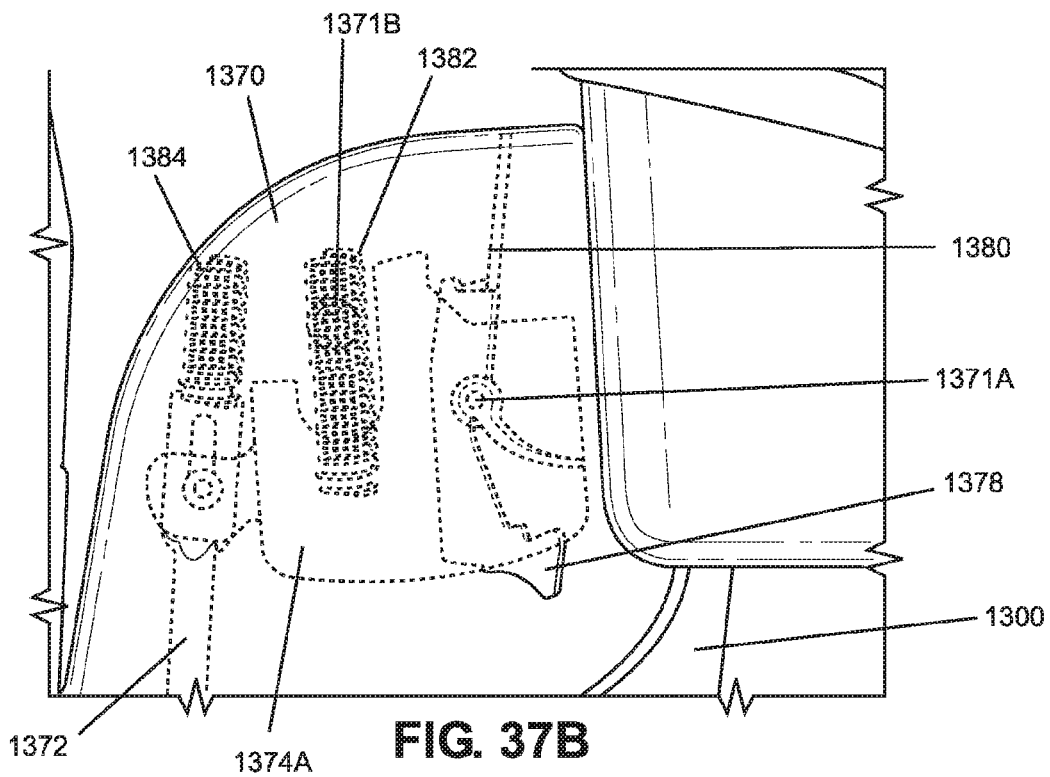
FIG. 37B shows a magnified view of the lock pin mechanism of FIG. 37A and, in particular, the actuation handle and the secondary lock.
Figure 37C:
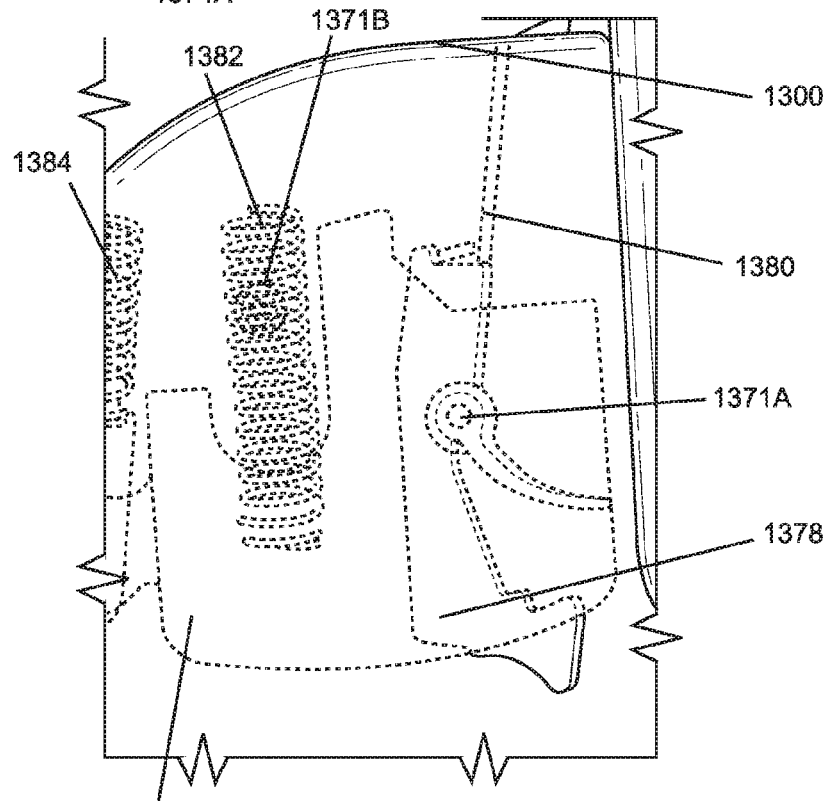
FIG. 37C shows a magnified view of the lock pin mechanism of FIG. 37A where the secondary lock is engaged with a rib in the seat shell.
Figure 37D:
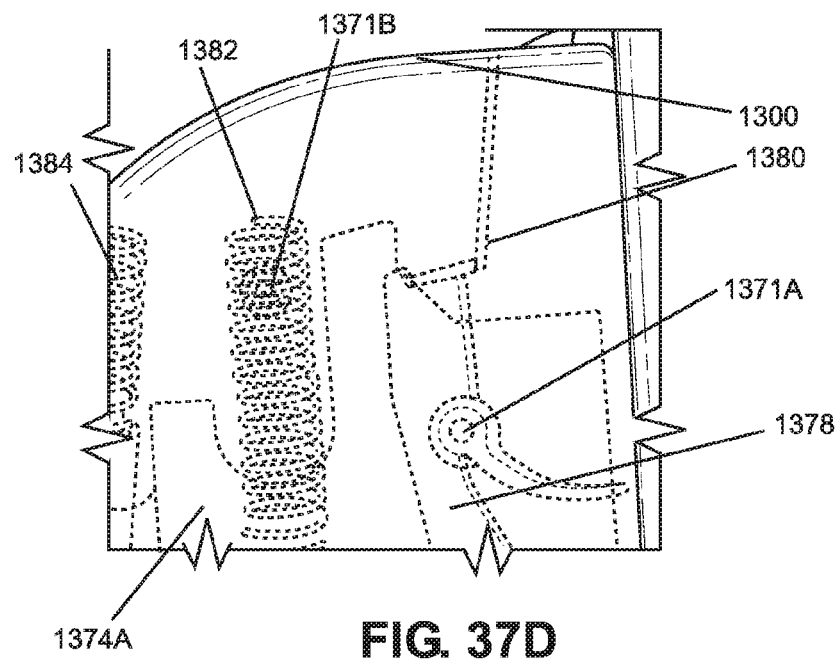
FIG. 37D shows a magnified view of the lock pin mechanism of FIG. 37C where the secondary lock is released from the rib on the seat shell via actuation of the secondary lock.
Figure 37E:
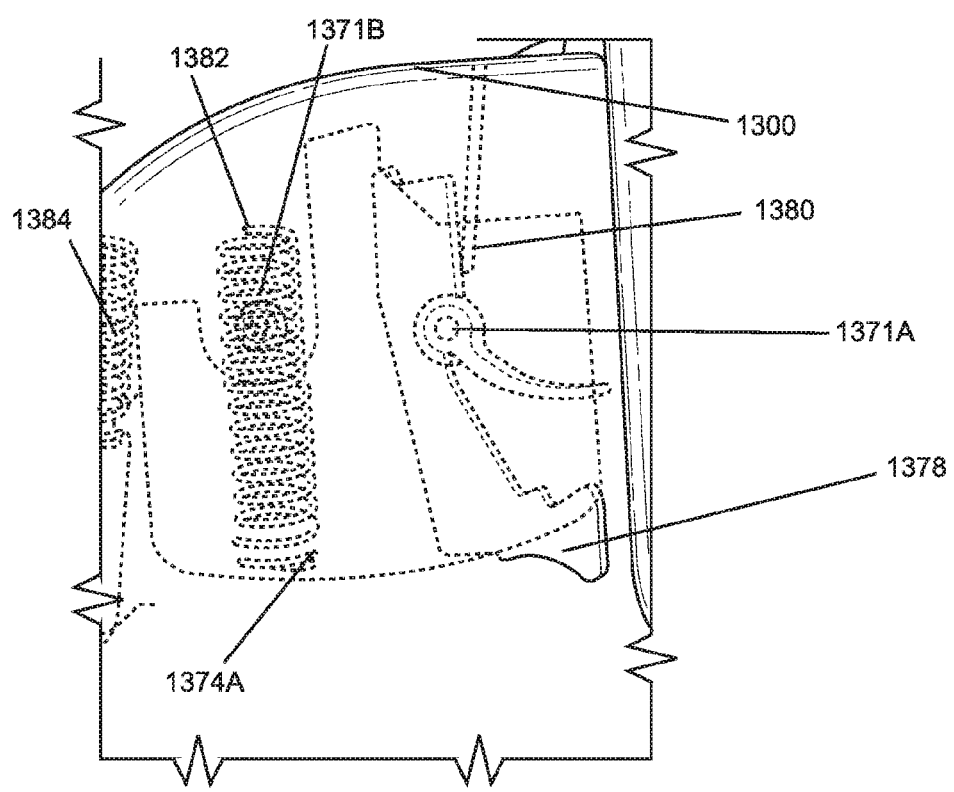
FIG. 37E shows a magnified view of the lock pin mechanism of FIG. 37D where the actuation handle is actuated to release the locking pin from the mid base.

FIGS. 37A-37E show the lock pin mechanism 1370 may further include an actuation handle 1374*a* mechanically coupled directly to the lock pin 1372. When the actuation handle 1374*a* is pressed, the lock pin 1372 may be release from the mid base 1200 allowing the seat shell 1300 to rotate. FIG. 37B shows the seat shell 1300 may include a mechanical stop 1371*b* to limit the extent the actuation handle 1374*a* may be pressed. FIG. 37A shows the lock pin mechanism 1370 may further include springs 1382 and 1384 to insert or maintain the lock pin 1372 within an opening of the mid base 1200 (e.g., the opening 1250*a* or 1250*b*) and maintain the actuation handle 1374*a* in a position accessible by the parent and/or the caregiver. In some implementations, the actuation handle 1374*a* may be disposed on the right side 1301*d* of the seat shell 1300 and the lock pin mechanism 1370 may further include another actuation handle 1374*b* disposed on the left side 1301*d* of the seat shell 1300. The actuation handles 1374*a* and 1374*b* may be linked together by a cable 1376 so that lock pin 1372 may be released by either of the actuation handles 1374a and 1374b.

In some implementations, the first and second actuation handles 1374a and 1374b each incorporate a secondary lock 1378. The secondary lock 1378 may make it more difficult for a child or a non-occupant (e.g., a passenger of the vehicle) to release the lock pin mechanism 1370 while the child restraint 1000b is in use (e.g., the child restraint 1000b is installed into a vehicle and the vehicle is being operated).

FIGS. 37B-37E show several magnified views of the actuation handle 1374a and the secondary lock 1378 to illustrate the operation of the secondary lock 1378. As shown, the secondary lock 1378 may be disposed within an interior portion of the actuation handle 1374 and rotatably coupled to the actuation handle 1374 via a pin joint 1371a. When the lock pin mechanism 1370 is in a locked position, a portion of the secondary lock 1378 may engage a rib 1380 formed on the seat shell 1300. The rib 1380 may be oriented such that the actuation handle 1374a cannot be actuated (e.g., pressed) when the secondary lock 1378 is engaged with the rib 1380 (see FIG. 37C). When the secondary lock 1378 is actuated (e.g. via rotation about the pin joint 1371a), the portion of the secondary lock 1378 in contact with the rib 1380 may be released (see FIG. 37D). When the secondary lock 1378 is released, the actuation handle 1374a may then be pressed to disengage the lock pins 1372, thus allowing the seat shell 1300 to be rotated.

Figure 38A:
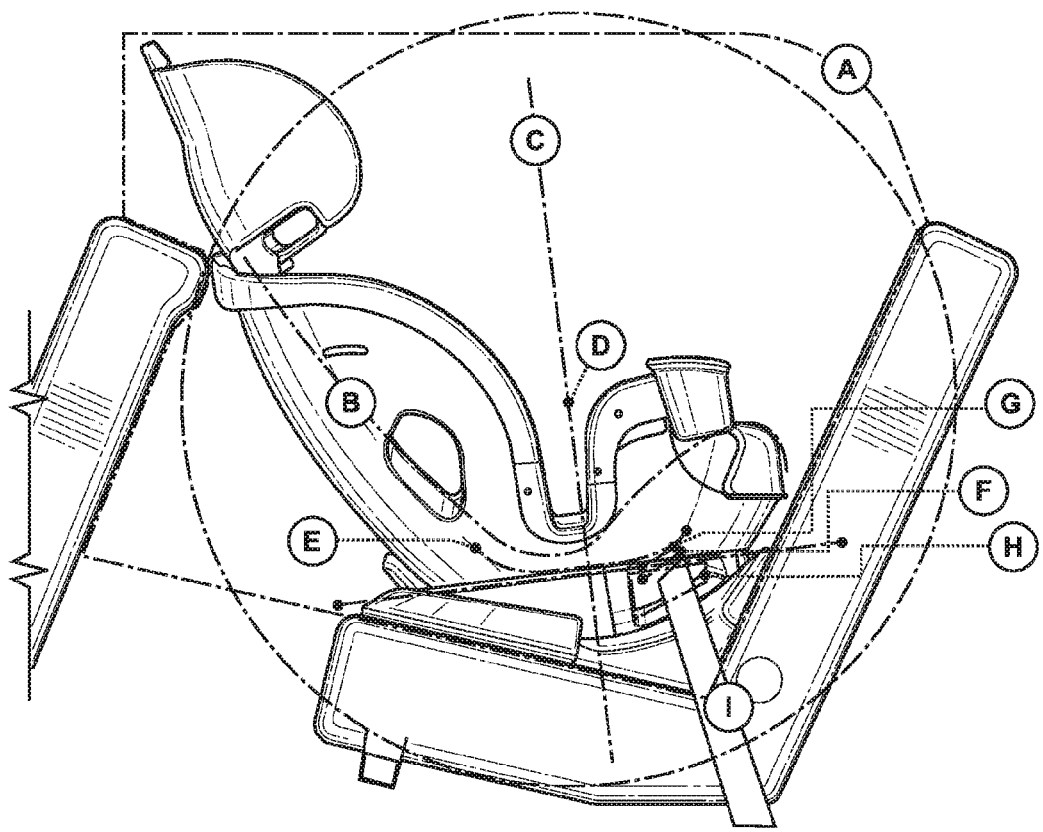
FIG. 38A shows a side view of the convertible child restraint of FIG. 17 with annotations to indicate the various features and degrees of freedom of the child restraint.

FIG. 38A an 38B show a side view of the convertible child restraint 1000b with several components and belt paths labeled to indicate their effect on the overall dimensions and/or shape of the child restraint 1000b particularly in relation to a vehicle envelope. As shown, "A" represent the vehicle design envelope, "B" represents the child seating surface (e.g., the seat pan 1302, the seatback section 1303), "C" represents the rotation axis for rear-facing and forward-facing configurations, "D" represents the recline axis 1004, "E" represents the interior seat shell rotation clearance, "F" represents the rear-facing belt path 1010a, "G" represents the rear-facing lock-out 1220, "H" represents the belt install lower access (e.g., the openings 1204), and "I" represents the vehicle belt 110.

Figure 38B:
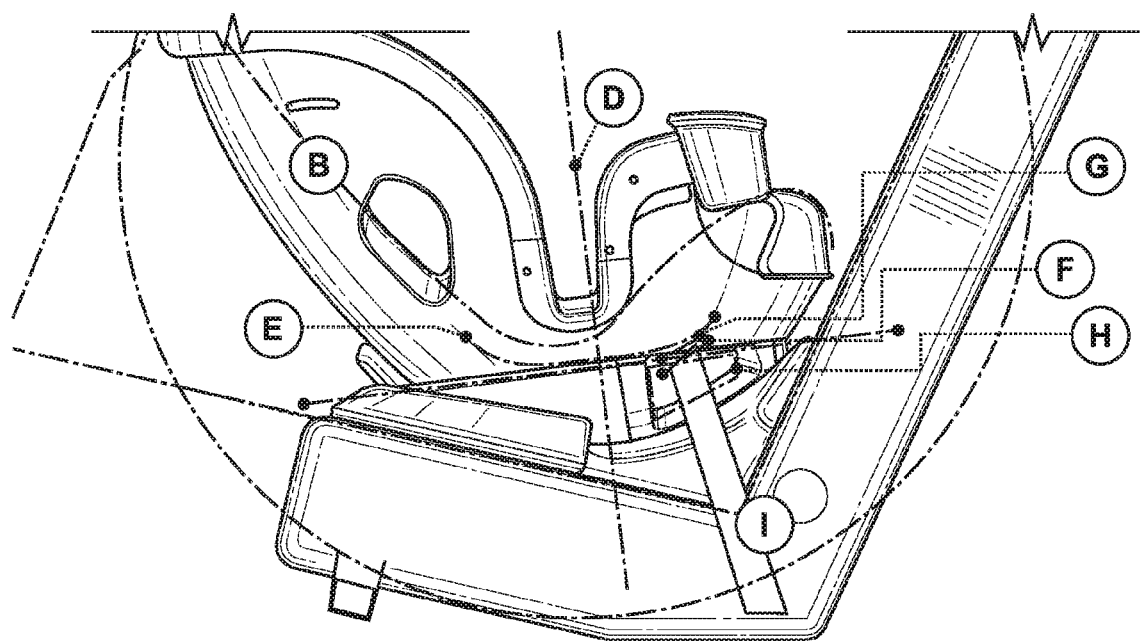
FIG. 38B shows a magnified side view of the convertible child restraint of FIG. 38A.

As shown, the geometry of the seat shell 1300 is based, in part, on "B" and "E," which may maintain a constant geometry relative to each other (e.g., the relative proportions and shapes of these features are fixed with respect to one another) regardless of the orientation of the seat shell 1300. In some implementations, it is preferable for the geometry of the seat shell 1300 to be positioned downwards and towards the right of FIG. 38B where the rear-facing belt path 1010a is located. This may allow for a lower center of gravity and a larger envelope to adjust, for example, the recline angle and/or the headrest position of the child restraint 1000b.

The geometry of the rear facing vehicle belt path 1010a is defined, in part, by "G" "F," and "H," which may maintain constant geometry relative to each other (e.g., the relative proportions and shapes of these features are fixed with respect to one another). In some implementations, it is preferable for this geometry to be positioned upwards and towards the left where the center of gravity (CG) of the system is located. In some implementations, the geometry of the child restraint 1000b may be constrained by the relationship between "E" and "G," which should preferably maintain a clearance for rotational movement of the seat shell 1300.

In general, the overall geometry and arrangement of the various structural features in the convertible child restraint 1000b may be chosen based, in part, on the various fits, dimensions, and buckle and LATCH designs of various vehicles to enable installation of the child restraint 1000b in a large variety of vehicles. For example, the desired recline angle of a convertible car seat may vary between rear-facing and forward-facing configurations. In general, the recline angle may be measured as the angle between the seatback of the convertible car seat and a horizontal reference plane. For a rear-facing configuration, it is desirable for the recline angle to be about 45 degrees (relative to a horizontal plane). For a forward-facing configuration, it is desirable for the recline angle to be between about 60 degrees and about 70 degrees.

In order to achieve the desired recline angle for different vehicle seats and/or vehicles in both rear-facing and forward-facing configurations, the child restraint 1000b may provide different ranges of recline angles for the rear-facing and forward-facing configurations. This may be accomplished, in part, by shaping the lower base 1100 so that the seat shell 1300 is initially reclined by an offset angle (e.g., the seat shell 1300 is tilted even when placed onto a horizontal surface). The offset angle may tilt the rotation plane 1006 such that the recline angles in the rear-facing configuration and the forward-facing configuration are different even without any adjustments via the recline mechanism 1120. The offset angle may be chosen such that the recline angle in the rear-facing and forward-facing configurations is near the desired angles described above when the convertible child restraint 1000b is installed into a vehicle. The recline mechanism 1120, in turn, may be used to adjust (e.g., fine tune) the recline angle of the seat shell 1300 to position the child as desired and to accommodate different types of vehicle seats and/or vehicles.

Figure 39A:
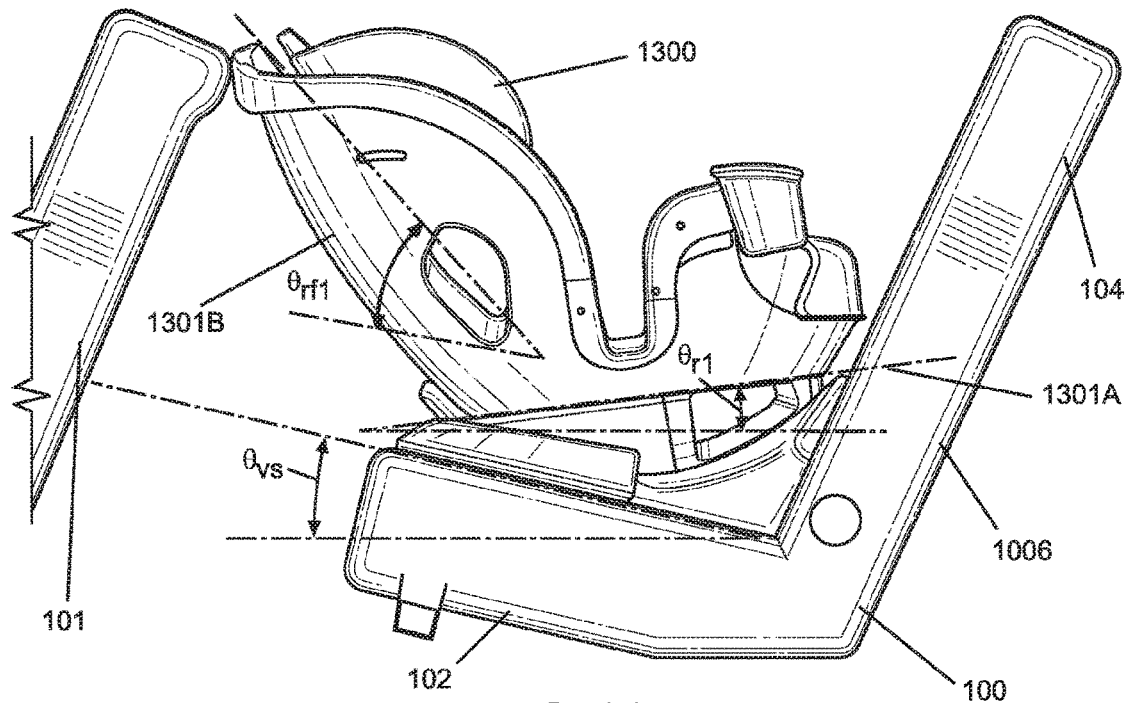
FIG. 39A shows a side view of the convertible child restraint of FIG. 17 in a reclined position and a rear-facing configuration.
Figure 39B:
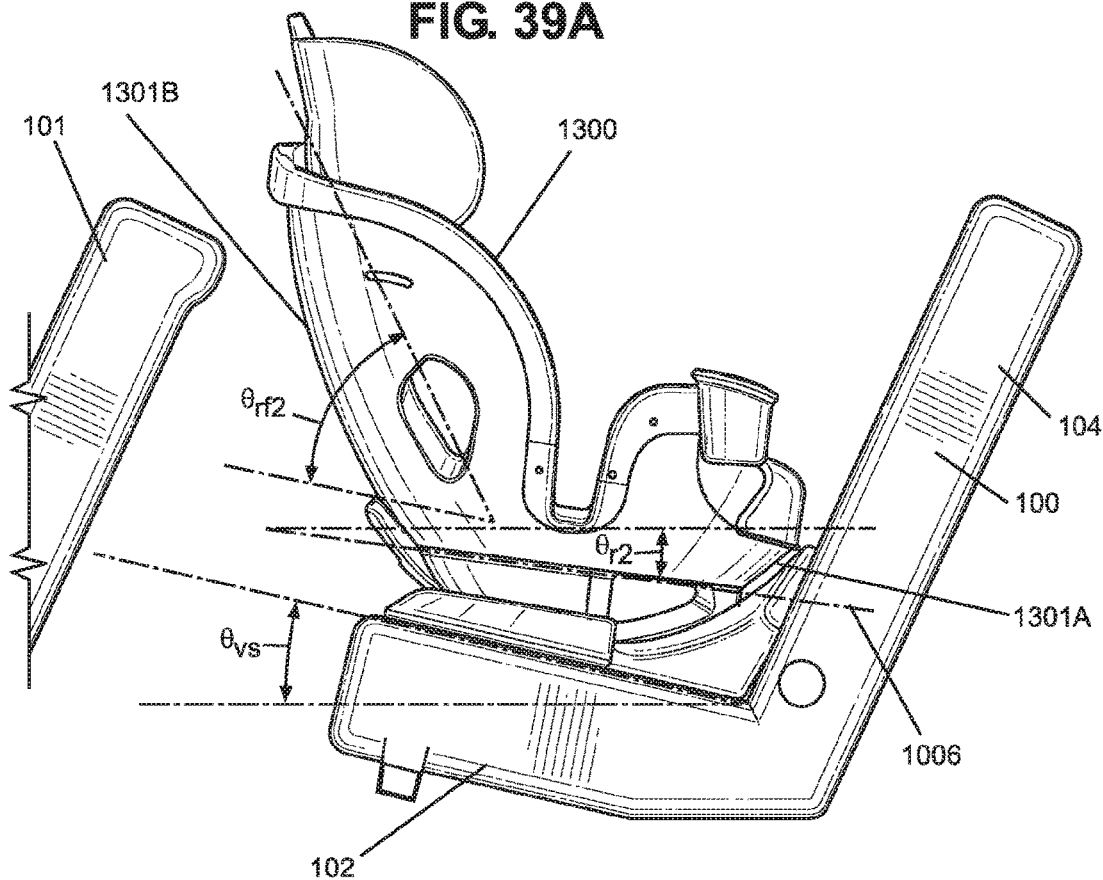
FIG. 39B shows a side view of the convertible child restraint of FIG. 39A in an upright position and a rear-facing configuration.
Figure 39C:
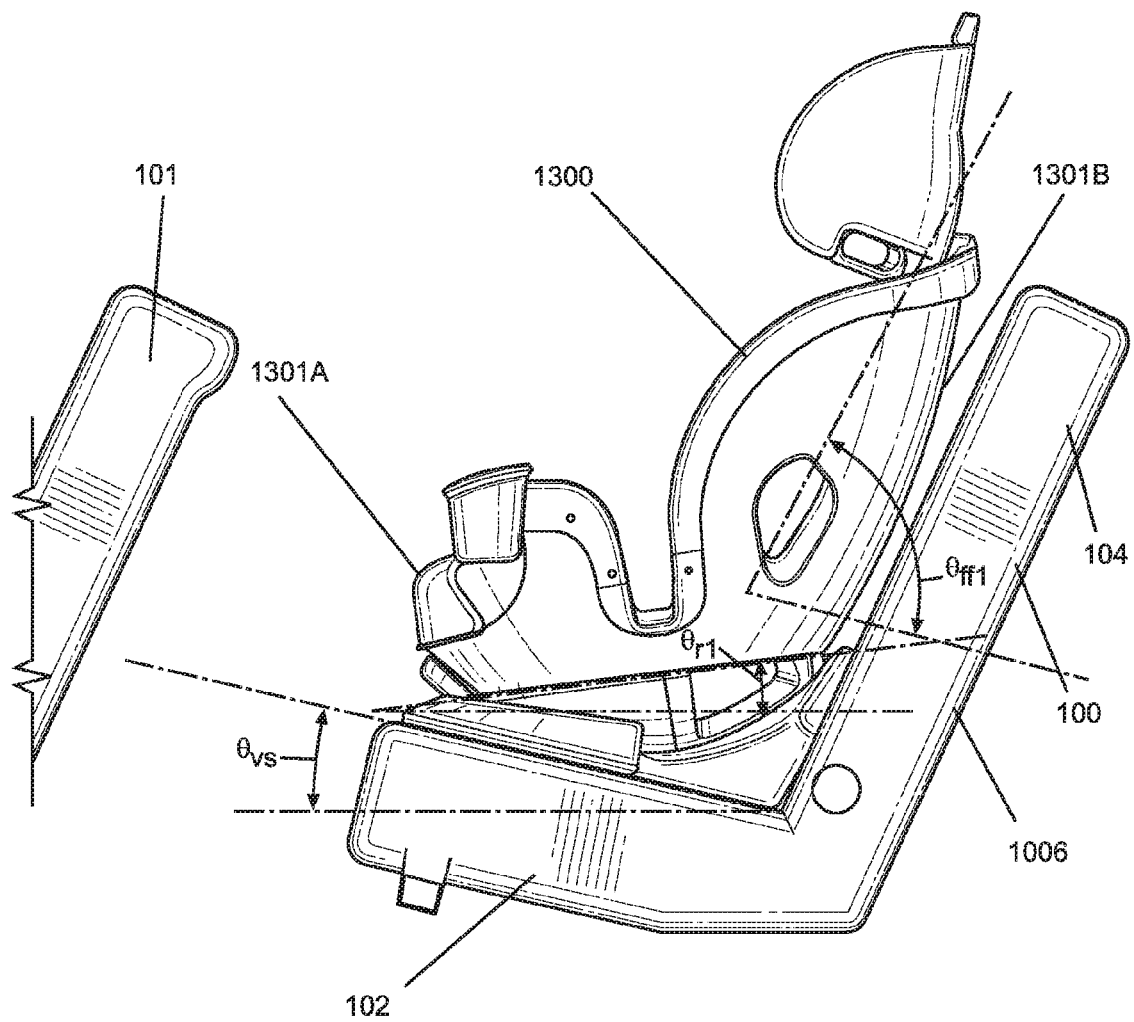
FIG. 39C shows a side view of the convertible child restraint of FIG. 39A in an upright position and a forward-facing configuration for use as a belt positioning booster.

To illustrate this approach, FIGS. 39A-39C show several side views of the convertible child restraint 1000b with various recline angles for both rear-facing and forward-facing configurations when installed in a representative vehicle. The vehicle seat 100 may generally include the vehicle seat pan 102 and the vehicle seatback 104 to support the child restraint 1000b. The vehicle seat pan 102 in most vehicles is reclined by an angle, $\theta_{vs}$, which typically ranges between about 5 degrees and about 18 degrees.

The angle, $\theta_{vs}$, of the vehicle seat pan 102 may be compensated, in part, by the offset angle provided by the lower base 1100. For instance, FIGS. 39A and 39B show the seat shell 1300 reclined at two limiting recline angles, $\theta_{rf1}$ and $\theta_{rf2}$, respectively, for the rear-facing configuration. The recline angles, $\theta_{rf1}$ and $\theta_{rf2}$, are measured relative to a bottom plane of the lower base 1100. As shown, the rotation plane 1006 may be angled above the horizontal plane at an angle, $\theta_{r1}$, in FIG. 39A and angled below the horizontal plane at an angle, $\theta_{r2}$, in FIG. 39B. Thus, the rotation plane 1006 may be leveled with the horizontal plane at an intermediate recline angle between $\theta_{rf1}$ and $\theta_{rf2}$. In some implementations, the offset angle may be about 13 degrees.

Additionally, tilting the rotation plane 1006 in the manner shown in FIGS. 39A and 39B may also allow the range of recline angles for the rear-facing and forward-facing configurations to be different. For example, FIGS. 39A and 39C show the convertible child restraint 1000b at the same recline position (i.e., the rotation plane 1006 is tilted above the horizontal plane by the angle $\theta_{r1}$) for rear-facing and forward-facing configurations, respectively. As shown, the recline angle, $\theta_{rf1}$, for the rear-facing configuration may be appreciably smaller than the recline angle, $\theta_{ff1}$, for the forward-facing configuration.

In some implementations, the offset angle of the lower base 1100 may be chosen so that the recline angle, $\theta_{rf1}$, is about 45 degrees and the recline angle, $\theta_{ff1}$, is about 65 degrees at a particular recline position set by the recline mechanism 1120 (e.g., the recline position corresponding to $\theta_{r1}$) for most vehicles. This, in turn, allows the recline mechanism 1120 to be smaller and/or lower weight. Although the recline mechanism 1120 may have a more limited range of recline adjustment, the child restraint 1000b may still achieve the desired recline angle. In some implementations, the recline mechanism 1120 may provide about 15 degrees of adjustment in the recline angle of the seat shell 1300. In some implementations, the child restraint 1000b may thus provide a recline angle, $\theta_{rf1}$, ranging between about 34 degrees and about 49 degrees for the rear-facing configuration. For the forward-facing configuration, the child restraint 1000b may provide a recline angle, $\theta_{ff1}$, ranging between about 59 degrees and about 74 degrees.

As described above, the child restraint 1000b may be used as a belt positioning booster seat via the forward-facing belt path 1010c. In this configuration, a vehicle seat belt 110b may be routed through respective notches 1312 along the sides 1301c and 1301d of the seat shell 1300 where a child's thighs are located when the child is placed into the child restraint 1000b. In some implementations, the notch 1312 may be shaped to deter or, in some instances, prevent a belt tongue 112 on the vehicle seat belt 110b from getting caught on the seat shell 1300 when released from a belt buckle 114 on the vehicle seat 100. In this manner, the accidental release of the vehicle seat belt 110b may provide a clear visual indication for the parent, the caregiver, and/or the user (e.g., the child) to recouple the belt tongue 112 to the belt buckle 114.

For example, FIGS. 40A-40D show several magnified views of the notch 1312 on the convertible child restraint 1000b. The notch 1312 may include a protruding section 1313 that extends outward from the side 1301c of the seat shell. The protruding section 1313 may include a first side or edge 1314 located towards the front of the seat shell 1300 and a second side or edge 1316 located towards the rear of the seat shell 1300.

Figure 40A:
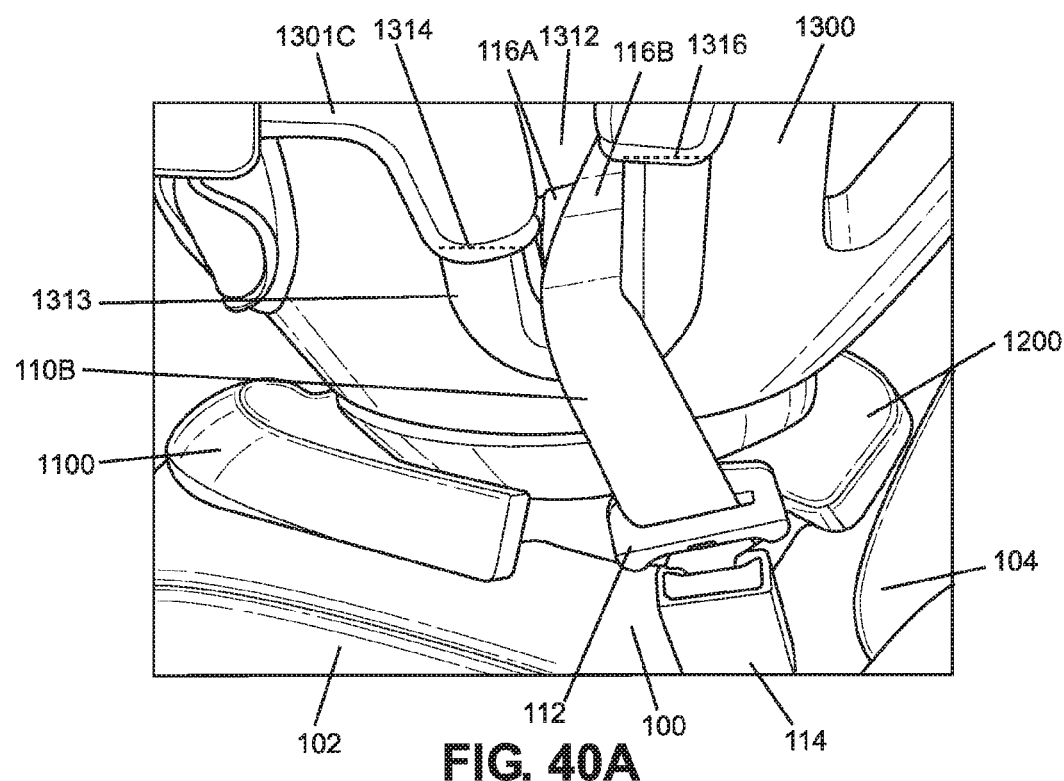
FIG. 40A shows a magnified view of a belt tongue on a vehicle seat belt engaged to a vehicle seat buckle when the convertible child restraint of FIG. 17 is installed onto a vehicle seat as a belt positioning booster.
Figure 40B:
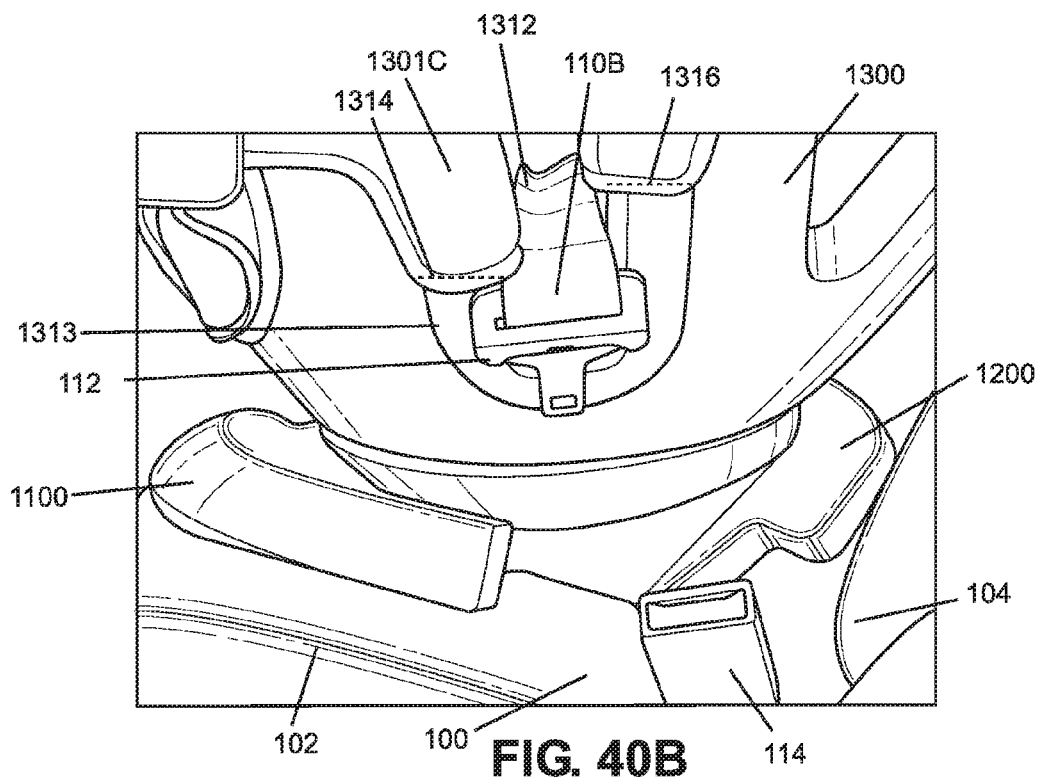
FIG. 40B shows the belt tongue of FIG. 40A catching a first side of a notch on the seat shell when the belt tongue is released from the vehicle seat buckle.
Figure 40C:
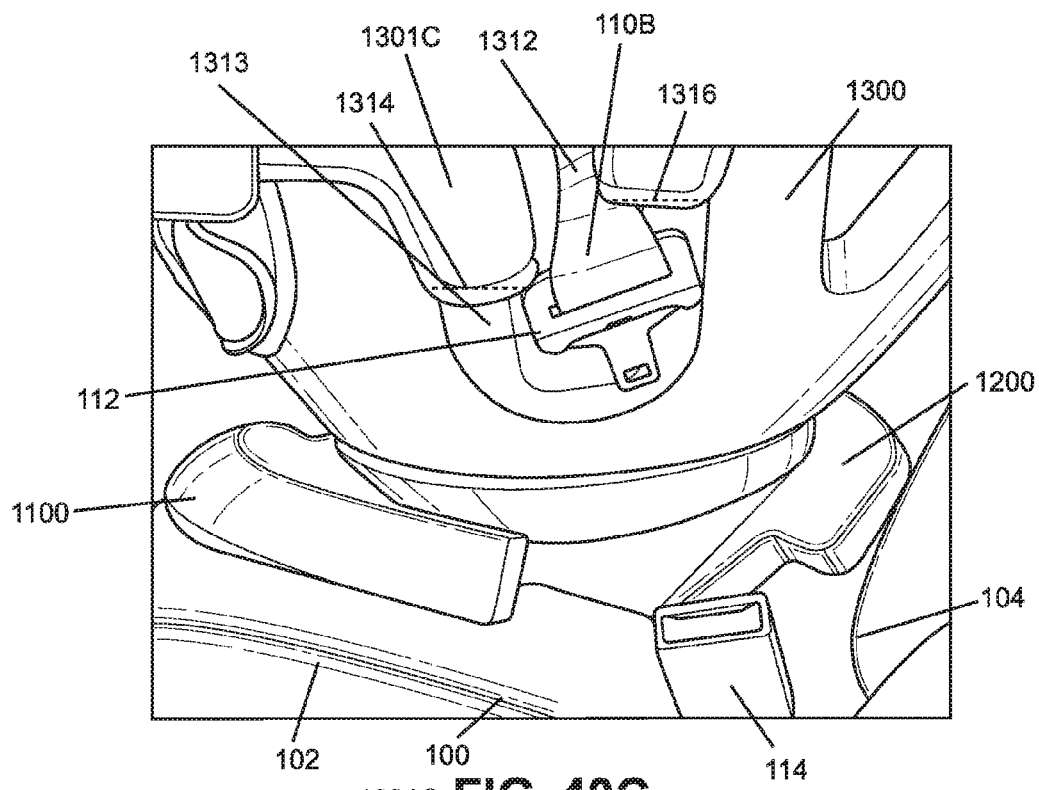
FIG. 40C shows the belt tongue of FIG. 40B tilting in response to contact with the first side of the notch.
Figure 40D:
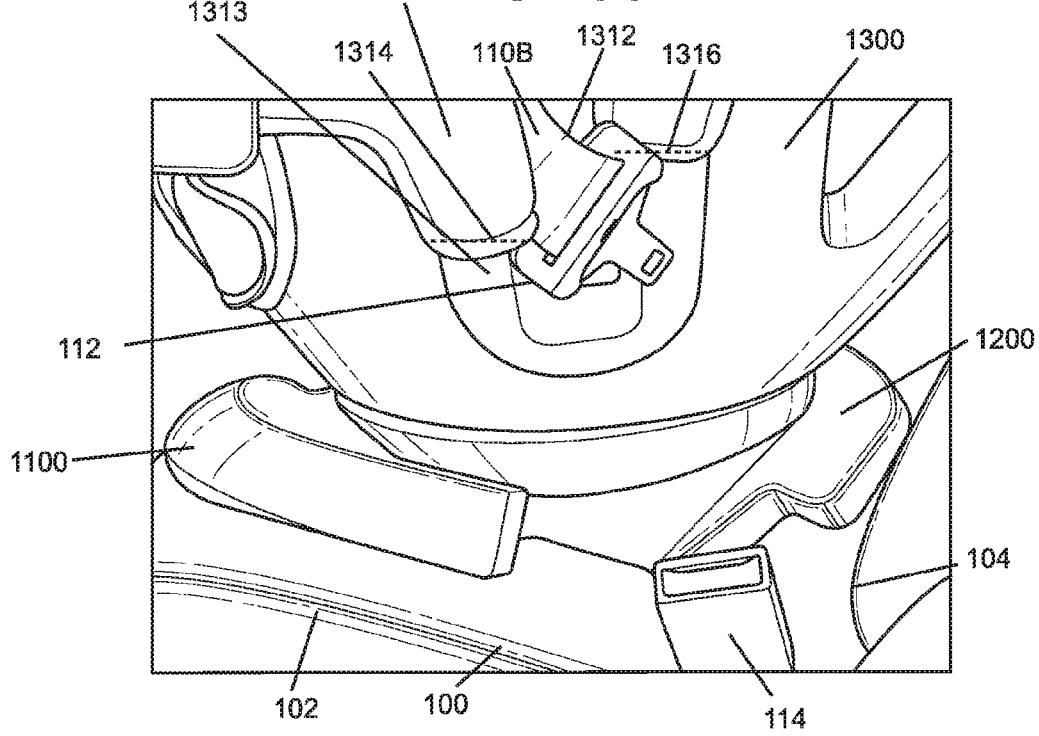
FIG. 40D shows the tilted belt tongue of FIG. 40C being pulled through the notch.

As shown, the first side 1314 may be aligned parallel to the second side 1316, but offset vertically relative to the second side 1316 (e.g., the first side 1314 is positioned below the second side 1316). This arrangement may cause the belt tongue 112 to rotate as it is retracted through the notch 1312. For instance, FIG. 40A shows the belt tongue 112 of the belt 100b securely coupled to the belt buckle 114. When the belt 100b is released, a portion of the belt tongue 112 may physically contact the first side 1314 without contacting the second side 1316 (see FIG. 40B). The contact between the first side 1314 and the belt tongue 112 causes the belt tongue 112 to rotate such that the belt tongue 112 is able to fit through the notch 1312 without getting caught.

Variations in the Rear-Facing Belt Path

In some implementations, it may be preferable for the rear-facing belt path 1010a to be positioned towards the bottom and rear portions of the lower base 1100 where a belt buckle and/or a vehicle seat anchor is typically located on the vehicle seat 100. A lower rear-facing belt path 1010a may provide several benefits to the overall design of the convertible child restraint 1000b including, but not limited to a smaller-sized child restraint 1000b and more space for the convertible child restraint 1000b and, in particular, the headrest 1360, to accommodate smaller-sized vehicles with more limited interior space. However, a lower positioned rear-facing belt path may adversely affect the fit of the convertible child restraint to the vehicle seat. Therefore, the placement of the rear-facing belt path 1010a in the convertible child restraint may be tailored to balance between the benefits of a lower-positioned belt path and the ease of fitting the child restraint to a large range of vehicle seats.

For example, the convertible child restraint 1000a may provide a lower-positioned rear-facing belt path 1010a compared to the child restraint 1000b. This may allow the child restraint 1000a to achieve lower placement of the child within the vehicle and, hence, a lower center of gravity and/or a smaller-sized apparatus compared to the child restraint 1000b. However, the child restraint 1000b may be easier to install than the child restraint 1000a by being easier to fit into different types of vehicle seats and with different vehicle harness configurations.

Figure 43B:
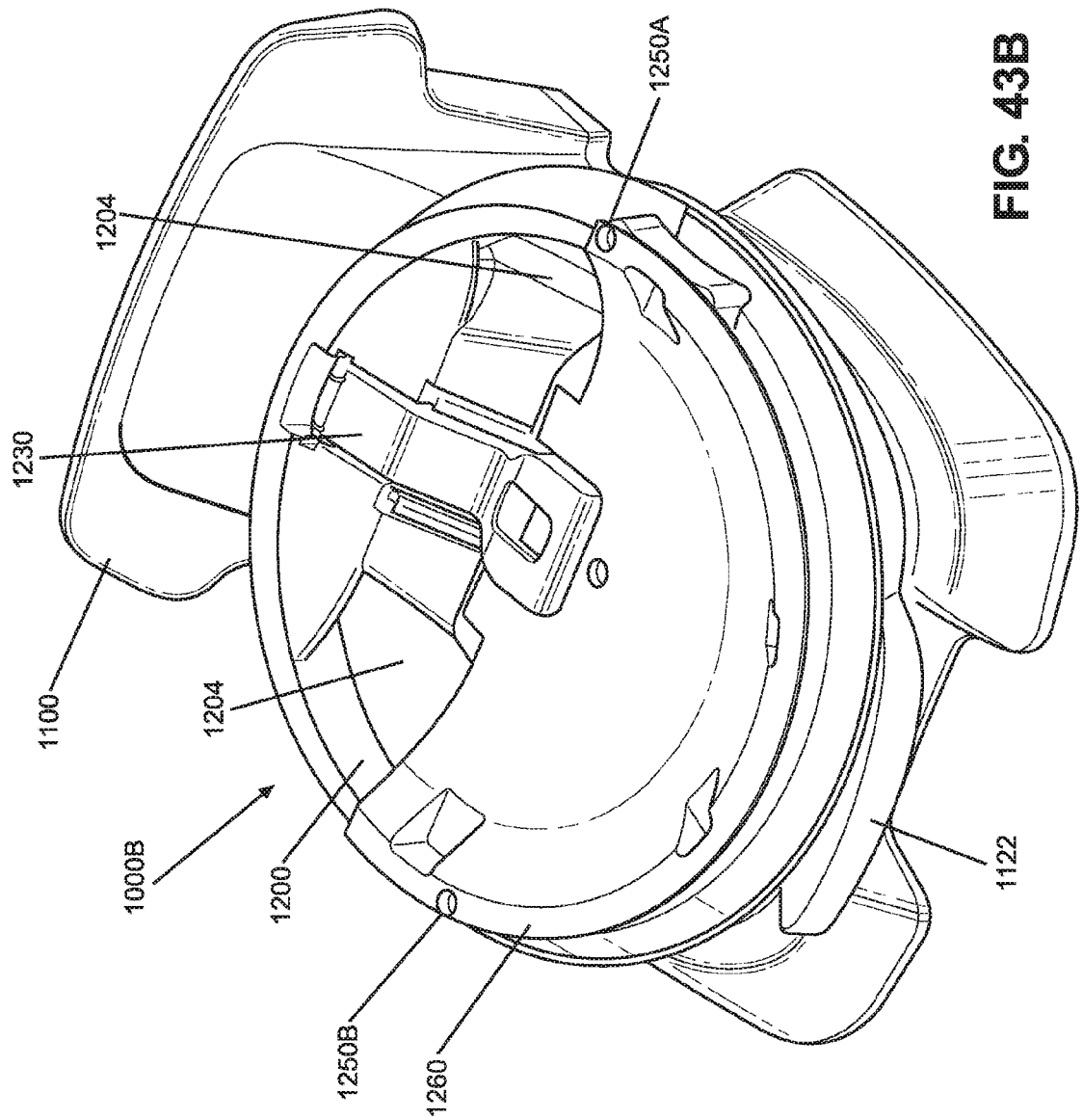
FIG. 43B shows a top perspective view of the lower base and the mid base of the convertible child restraint of FIG. 17. The seat shell is not shown for clarity.
Figure 43C:
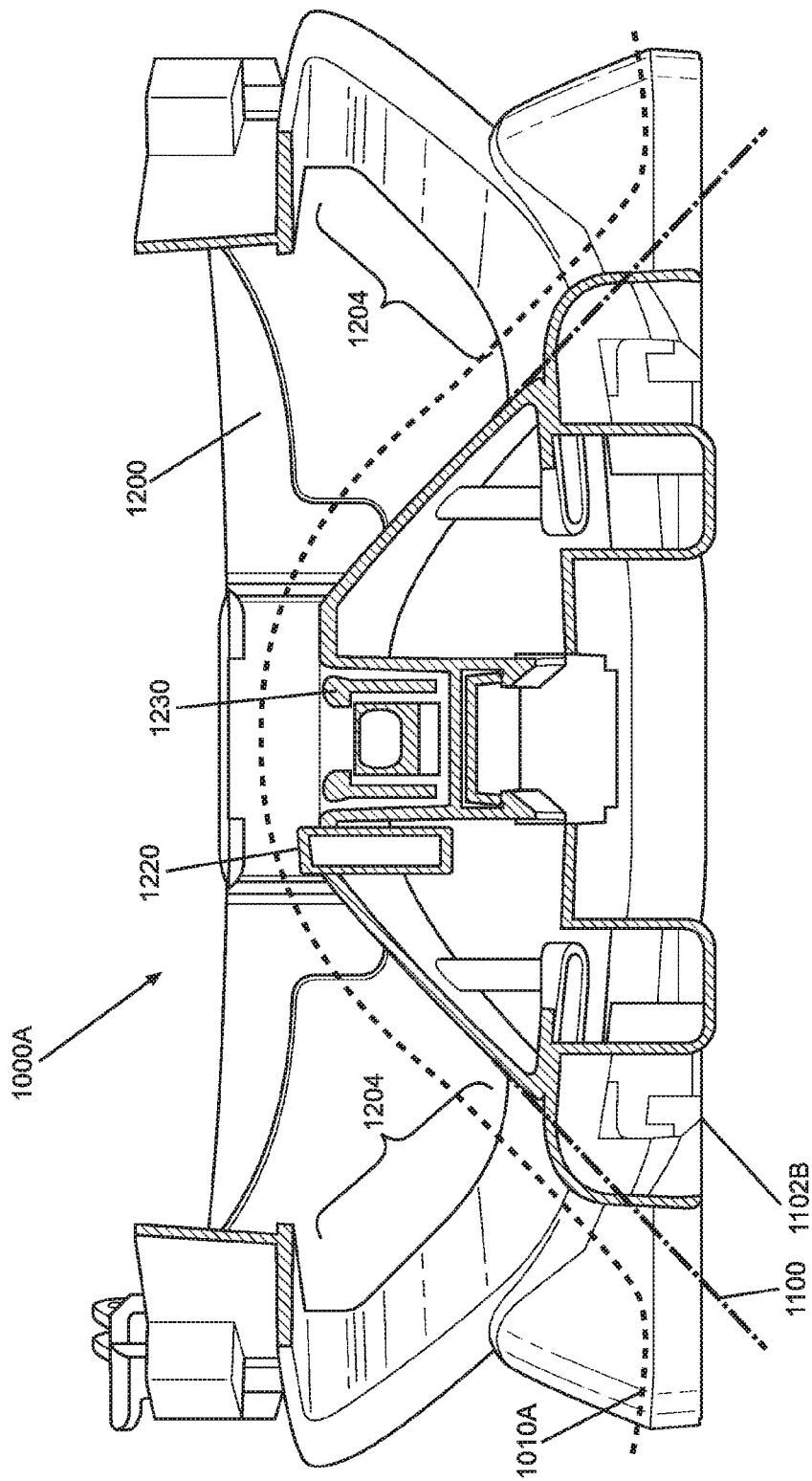
FIG. 43C shows a cross-sectional rear view of the convertible child restraint of FIG. 43A. The dashed line represents the rear-facing belt path.

FIGS. 43A-43E show several views comparing the geometry of the child restraint 1000a and 1000b, in particular, the lower base 1100 and the mid base 1200. Specifically, FIG. 43A shows a perspective view of the lower base 1100 and the mid base 1200 without the seat shell 1300 in the child restraint 1000a. FIG. 43C shows a cross-sectional view of the child restraint 1000a. As shown, the rear-facing belt path 1010a may extend up along a portion of the mid base 1200 where the belt locking arm 1230 and the lockout mechanism 1220 are located. This portion of the mid base 1200 may be about 102 mm above the lowest portion of the child restraint 1000a with a width of about 67 mm.

Figure 43D:
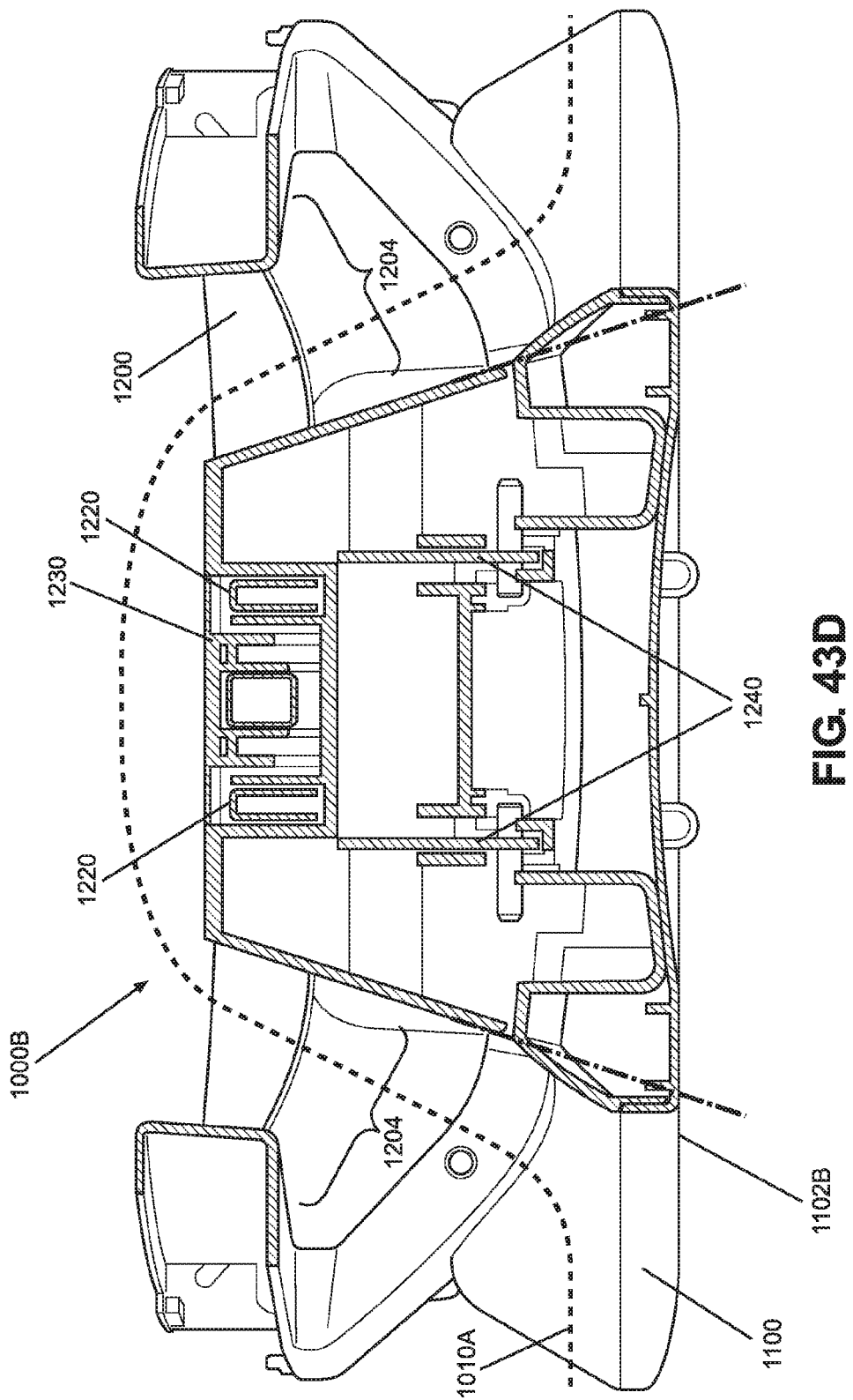
FIG. 43D shows a cross-sectional rear view of the convertible child restraint of FIG. 43B. The dashed line represents the rear-facing belt path.
Figure 43E:
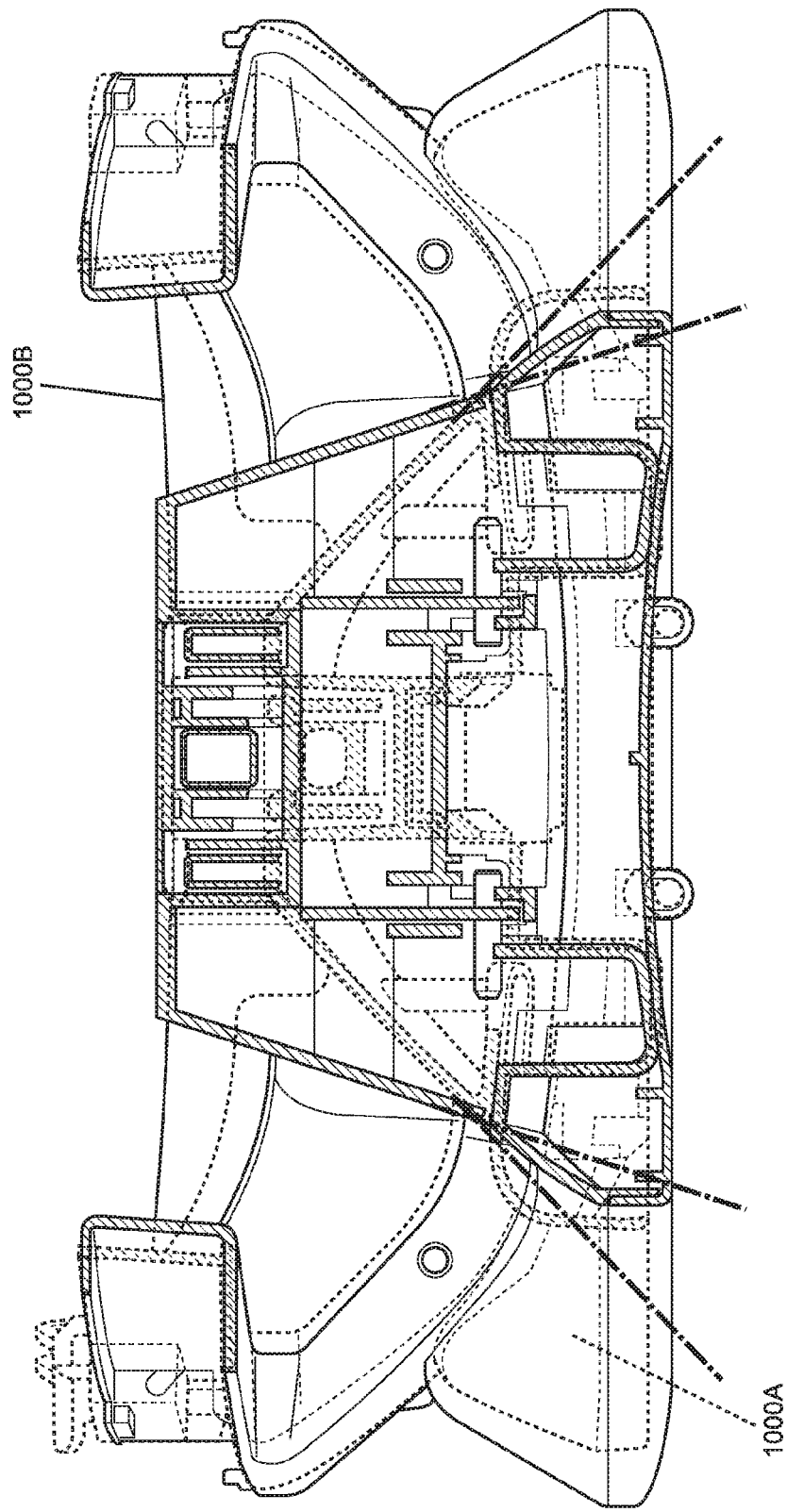
FIG. 43E shows a cross-sectional rear view of the convertible child restraint of FIG. 43A overlaid onto the convertible child restraint of FIG. 43B.

FIG. 43B shows a perspective view of the lower base 1100 and the mid base 1200 without the seat shell 1300 in the child restraint 1000b. FIG. 43D shows a cross-sectional view of the child restraint 1000b. As shown, the rear-facing belt path 1010a may similarly extend up along a portion of the mid base 1200 located about 128 mm above the lowest portion of the child restraint 1000b with a width of about 130 mm. FIG. 43E shows a cross-sectional view where the child restraints 1000a and 1000b are overlaid on top of one another to show the differences in the rear-facing belt path 1010a in both variations of the convertible child restraint.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A child restraint for a vehicle, the child restraint comprising:
    a base having a rear portion configured to abut a portion of a vehicle seatback of a vehicle seat in the vehicle when the child restraint is installed into the vehicle;
    a seat shell, rotatably coupled to the base such that the base remains stationary while the seat shell rotates with respect to the base, to support a child, the seat shell having a front side and a rear side and being rotatable relative to the base between:
        a rear-facing position where the front side of the seat shell is closer to the rear portion of the base than the rear side of the seat shell; and
        a forward-facing position where the rear side of the seat shell is closer to the rear portion of the base than the front side of the seat shell,
    the seat shell including one or more first forward belt path features that define, in part, a first forward-facing belt path, the one or more first forward belt path features configured to receive a lap strap of a belt to couple the child restraint to the vehicle seat and restrain the child in the seat shell when the child restraint is installed into the vehicle, the seat shell is at the forward-facing position, and the belt is a vehicle seat belt; and
    one or more second forward belt path features that define, in part, a second forward-facing belt path different from the first forward-facing belt path, the one or more second forward belt path features configured to receive the lap strap of the belt to couple the child restraint to the vehicle seat when the child restraint is installed into the vehicle and the seat shell is at the forward-facing position and disposed on a first side of the seat shell proximate to a seatback section of the seat shell such that the belt is placed against the seatback section when the belt is routed through the one or more second forward belt path features and the belt is tensioned.

2. The child restraint of claim 1, wherein: the seat shell comprises a headrest, disposed on a seatback section of the seat shell, to support a head of the child; and the one or more first forward belt path features comprises: a notch, disposed on a first side of the seat shell proximate to a seat pan of the seat shell, to define a first portion of the first forward-facing belt path for a lap portion of the belt when the child restraint is installed into the vehicle and the belt is the vehicle seat belt; and an opening, disposed on the headrest, to define a second portion of the first forward-facing belt path for a shoulder portion of the belt when the child restraint is installed into the vehicle and the belt is the vehicle seat belt.

3. The child restraint of claim 2, wherein: the belt comprises a belt tongue; and the notch is shaped to rotate the belt tongue when the belt tongue is pulled through the notch.

4. The child restraint of claim 2, wherein: the notch comprises a protruding section that extends outwards from the first side of the seat shell, the protruding section comprising: a first edge disposed towards the front side of the seat shell; and a second edge disposed towards the rear side of the seat shell, aligned substantially parallel with the first edge, and vertically offset from the first edge.

5. The child restraint of claim 1, wherein the one or more second forward belt path features comprises an opening.

6. The child restraint of claim 1, further comprising: the belt, wherein the belt restricts rotational adjustment of the seat shell with respect to the base when the child restraint is installed into the vehicle via the first or second forward-facing belt paths.

7. The child restraint of claim 1, wherein the seat shell comprises a belt locking arm to securely couple the belt to the seat shell when the second forward-facing belt path is used to install the child restraint into the vehicle, the belt locking arm displacing a portion of the belt so as to ensure the belt is under tension when secured to the child restraint.

8. The child restraint of claim 1, wherein the base includes one or more rear belt path features that define, in part, a rear-facing belt path, the one or more rear belt path features configured to receive the belt to couple the child restraint to the vehicle seat when the child restraint is installed into the vehicle and the seat shell is at the rear-facing position.

9. The child restraint of claim 8, wherein the rear-facing belt path positions the belt proximate to the rear portion and a bottom portion of the base when the child restraint is installed into the vehicle.

10. The child restraint of claim 8, wherein the rear-facing belt path positions the belt proximate to a center of gravity of the child restraint and the child when the child restraint is installed into the vehicle.

11. The child restraint of claim 8, further comprising: the belt, wherein the belt is one of a vehicle seat belt or a Lower Anchors and Tethers for CHildren (LATCH) belt.

12. The child restraint of claim 11, wherein: the belt is a LATCH belt; and the base comprises a storage compartment to store the LATCH belt when the LATCH belt is not in use.

13. The child restraint of claim 1, wherein the base further comprises: a lower base having the rear portion; and a mid base disposed between the lower base and the seat shell, the mid base being coupled to the lower base via a recline mechanism that adjusts a recline position of the seat shell with respect to the lower base, the mid base being coupled to the seat shell via a rotation mechanism that adjusts a rotational position of the seat shell with respect to the mid base.

14. The child restraint of claim 13, wherein the recline mechanism is located below the rotation mechanism.

15. The child restraint of claim 14, wherein: the mid base includes one or more rear belt path features that define, in part, a rear-facing belt path, the one or more rear belt path features configured to receive the belt to couple the child restraint to the vehicle seat when the child restraint is installed into the vehicle and the seat shell is at the rear-facing position; and the recline mechanism is located below the rear-facing belt path.

16. The child restraint of claim 13, wherein the recline mechanism defines a plurality of indexed recline positions, the recline position of the seat shell corresponding to one of the plurality of indexed recline positions.

17. The child restraint of claim 16, wherein the plurality of indexed recline positions comprises at least four indexed recline positions.

18. The child restraint of claim 16, wherein the recline mechanism comprises: a pair of rails, disposed on the lower base, defining the plurality of indexed recline positions; a pair of lock pins, disposed within the mid base, where each lock pin engages one of the pair of rails at one of the plurality of indexed recline positions; a first flexible member coupled to one of the pair of lock pins and disposed within the mid base along a first path; a second flexible member coupled to a remaining one of the pair of lock pins and disposed within the mid base along a second path, the second path overlapping the first path; and an actuation handle, coupled to the first flexible member and second flexible member, to disengage the pair of lock pins from the pair of rails when the actuation handle is actuated.

19. The child restraint of claim 13, wherein the recline mechanism comprises: a first rail disposed on the lower base; and a second rail disposed on the lower base in parallel alignment with the first rail, the first and second rails defining the plurality of indexed recline positions and separated by a distance less than about 5.5 inches.

20. The child restraint of claim 13, wherein: the rotation mechanism defines a rotation plane along which the seat shell is rotatable with respect to the mid base; and the lower base and the mid base are shaped such that the rotation plane is tilted by an offset angle relative to a horizontal reference plane when the lower base is placed onto the horizontal reference plane.

21. The child restraint of claim 20, wherein: the offset angle is approximately 13 degrees; and a recline angle of the seat shell, defined between a seatback section of the seat shell and the horizontal reference plane, ranges between approximately 34 degrees and approximately 49 degrees when the seat shell is at the rear-facing position and between approximately 59 degrees and approximately 74 degrees when the seat shell is at the forward-facing position.

22. The child restraint of claim 13, wherein: the rotation mechanism comprises: one or more brackets rigidly coupled to the mid base; and a turn ring rigidly coupled to the seat shell, the turn ring being coupled to the one or more brackets such that the turn ring is only movable with respect to the one or more brackets along a single rotational degree of freedom.

23. The child restraint of claim 22, wherein the turn ring has at least one of a C-shaped cross section or an I-shaped cross section.

24. The child restraint of claim 22, wherein the turn ring is formed of at least one of steel or magnesium.

25. The child restraint of claim 22, wherein: the turn ring defines a center opening; and at least a portion of the seat shell is disposed through the center opening so as position the seat shell closer to the lower base.

26. The child restraint of claim 13, wherein: the rotation mechanism comprises: a turn ring rigidly coupled to the seat shell; and the seat shell includes a seatback section comprising: a seatback; and a seatback insert coupled to the seatback and the turn ring such that the turn ring, the seatback, and the seatback insert together form a triangular structure that increases the structural rigidity of the seat shell.

27. The child restraint of claim 26, wherein the seat shell does not include a metal tube or a L tube.

28. The child restraint of claim 13, wherein: the lower base and the mid base include one or more rear belt path features that define a rear-facing belt path, the one or more rear belt path features configured to receive the belt to couple the child restraint to the vehicle seat when the child restraint is installed into the vehicle and the seat shell is at the rear-facing position; and the one or more rear belt path features comprises a belt locking arm to securely couple the belt to the mid base when the rear-facing belt path is used to install the child restraint into the vehicle, the belt locking arm displacing a portion of the belt so as to ensure the belt is under tension when secured to the child restraint.

29. The child restraint of claim 28, wherein: the seat shell comprises a belt access panel disposed on a front portion of a seat pan of the seat shell, the belt access panel providing access to the belt locking arm when the seat shell is at the rear-facing position.

30. The child restraint of claim 28, wherein the seat shell blocks access to the belt locking arm when the seat shell is at the forward-facing position.

31. The child restraint of claim 28, wherein: the rotation mechanism comprises at least one rotation stop; and the mid base further comprises: a rotation lockout having a plunger end and a lockout end, the lockout end engaging the at least one rotation stop to limit rotational adjustment of the seat shell when the plunger end is actuated, the rotation lockout being spring-biased such that the lockout end is disengaged from the at least one rotation stop when the plunger end is not actuated.

32. The child restraint of claim 31, wherein the plunger end of the rotation lockout is actuated by the belt locking arm pressing the belt against the plunger end when the rear-facing belt path is used to install the child restraint into the vehicle.

33. The child restraint of claim 31, wherein: the rotational position of 0 degrees corresponds to the seat shell being at the rear-facing position; and the rotational position of the seat shell with respect to the mid base is limited to between approximately −120 degrees and approximately +120 degrees when the lockout end of the rotation lockout is engaged with the at least one rotation stop.

34. The child restraint of claim 31, wherein the at least one rotation stop prevents the seat shell from being rotated to the forward-facing position when the rotation lockout is actuated.

35. The child restraint of claim 1, wherein: the base comprises a top side having a plurality of openings; and the seat shell comprises a lock pin mechanism to lock the seat shell to the base, the lock pin mechanism comprising: a lock pin configured to be inserted into an opening in the plurality of openings; a first actuation handle, coupled to the lock pin, to remove the lock pin from the opening when the first actuation handle is actuated thereby enabling rotational adjustment of the seat shell; and a spring, coupled to the lock pin, to at least one of insert or maintain the lock pin in the opening when the first actuation handle is not actuated.

36. The child restraint of claim 35, wherein the plurality of openings of the base are arranged to receive the lock pin only when the seat shell is at either the forward-facing position or the rear-facing position.

37. The child restraint of claim 35, wherein the lock pin mechanism further comprises: a secondary lock, coupled to the lock pin, to prevent release of the lock pin unless the secondary lock is actuated.

38. The child restraint of claim 35, wherein: the lock pin, the first actuation handle, and the spring are disposed on a first side of the seat shell; and the lock pin mechanism further comprises: a second actuation handle disposed on a second side of the seat shell opposite the first side and coupled to the lock pin via at least one of a torsion wire or a cable such that actuation of at least one of the first or second actuation handles removes the lock pin from the opening.

39. The child restraint of claim 1, wherein: the seat shell comprises a harness to secure the child to the seat shell, the harness having an aloc strap partially disposed underneath a seat pan of the seat shell; and the base comprises a shield, disposed proximate to the seat shell, to provide a surface for the aloc strap to slide along when the seat shell is rotated with respect to the base and the aloc strap physically contacts the surface.

40. The child restraint of claim 1, wherein the seat shell comprises: a harness to secure the child to the seat shell, the harness having an aloc strap partially disposed underneath a seat pan of the seat shell; and a belt routing feature, coupled to the seat pan, to retain the aloc strap against the seat pan when the seat shell is rotated with respect to the base.

41. The child restraint of claim 1, wherein the seat shell comprises: a headrest, disposed on a seatback section of the seat shell, to support a head of the child, the headrest being adjustable with respect to a seat pan of the seat shell such that a distance between a bottom portion of the headrest and the seat pan ranges between about 8.8 inches and about 18.7 inches.

42. The child restraint of claim 1, wherein the child restraint occupies a volume less than or equal to approximately 7 cubic feet.

43. The child restraint of claim 1, wherein the child restraint does not include an adjustable foot.

44. A child restraint for a vehicle, the child restraint comprising:
a base having a rear portion configured to abut a portion of a vehicle seatback of a vehicle seat in the vehicle when the child restraint is installed into the vehicle;
a seat shell, rotatably coupled to the base such that the base remains stationary while the seat shell rotates with respect to the base, to support a child, the seat shell having a front side and a rear side and being rotatable relative to the base between: a rear-facing position where the front side of the seat shell is closer to the rear portion of the base than the rear side of the seat shell; and a forward-facing position where the rear side of the seat shell is closer to the rear portion of the base than the front side of the seat shell, wherein: the base includes one or more rear belt path features that define, in part, a rear-facing belt path, the rear belt path features configured to receive a belt to couple the child restraint to the vehicle seat when the child restraint is installed into the vehicle and the seat shell is at the rear-facing position; and
at least one of the one or more rear belt path features is accessible only when the seat shell is at the rear-facing position;
wherein the seat shell comprises: one or more forward belt path features that define, in part, a forward-facing belt path different from the rear-facing belt path, the forward-facing belt path features configured to receive the belt to couple the child restraint to the vehicle seat when the child restraint is installed into the vehicle and the seat shell is at the forward-facing position.

45. A child restraint for a vehicle, comprising:
a lower base having a rear portion configured to abut a portion of a vehicle seatback of a vehicle seat in the vehicle when the child restraint is installed into the vehicle;
a seat shell to support a child, the seat shell having a front side and a rear side and being rotatable relative to the lower base between: a rear-facing position where the front side of the seat shell is closer to the rear portion of the lower base than the rear side of the seat shell; and a forward-facing position where the rear side of the seat shell is closer to the rear portion of the lower base than the front side of the seat shell; and a mid base disposed between the lower base and the seat shell, coupled to the lower base via a recline mechanism that adjusts a recline position of the mid base with respect to the lower base, and coupled to the mid base via a rotation mechanism to adjust a rotational position of the seat shell with respect to the lower base such that the lower base remains stationary while the seat shell rotates with respect to the lower base, wherein: the seat shell is not removable from the mid base;

the rotation mechanism and the recline mechanism are decoupled such that the rotational position of the seat shell is adjustable independent of the recline position of the mid base;

the rotation mechanism comprises at least one rotation stop; and the mid base comprises a rotation lockout that engages the at least one rotation stop only when the child restraint is installed into the vehicle and the seat shell is in the rear-facing position so as to limit a range of rotation of the seat shell where the seat shell is not rotatable from the rear-facing position to the forward-facing position;

the lower base and the mid base define a rear-facing belt path configured to receive a belt to couple the child restraint to the vehicle seat when the child restraint is installed into the vehicle and the seat shell is at the rear-facing position; and the mid base comprises a belt locking arm to securely couple the belt to the mid base when the rear-facing belt path is used to install the child restraint into the vehicle, the belt locking arm displacing a portion of the belt so as to ensure the belt is under tension when secured to the child restraint;

wherein the rotation lockout further comprises: a plunger end; a lockout end, coupled to the plunger end, to engage the at least one rotation stop when the plunger end is actuated by the belt locking arm pressing the belt against the plunger end; and a spring, coupled to the plunger end and the lockout end, to keep the lockout end disengaged from the at least one rotation stop when the plunger end is not actuated.

46. The child restraint of claim 45, wherein: the rotational position of 0 degrees corresponding to the seat shell being at the rear-facing position; and the rotational position of the seat shell with respect to the mid base is limited to between approximately −120 degrees and approximately +120 degrees when the rotation lockout engages the at least one rotation stop.

47. The child restraint of claim 45, wherein the at least one rotation stop prevents the seat shell from being rotated to the forward-facing position when the rotation lockout is actuated.

48. A child restraint for a vehicle, comprising:
a base having a rear portion configured to abut a portion of a vehicle seatback of a vehicle seat in the vehicle when the child restraint is installed into the vehicle, the base having one or more rear belt path features defining a rear-facing belt path, the one or more rear belt path features configured to receive a belt to couple the child restraint to the vehicle seat when the child restraint is installed into the vehicle; and a seat shell, rotatably coupled to the base such that the base remains stationary while the seat shell rotates, to support a child, the seat shell having a front side and a rear side and being rotatable relative to the base between: a rear-facing position where the front side of the seat shell is closer to the rear portion of the base than the rear side of the seat shell; and a forward-facing position where the rear side of the seat shell is closer to the rear portion of the base than the front side of the seat shell, the seat shell further comprising: a seat pan; and a belt access panel, disposed on a front portion of the seat pan, to provide access to a portion of the rear-facing belt path disposed within the base only when the seat shell is at the rear-facing position;

wherein: the seat shell is coupled to the base via a rotation mechanism that adjusts a rotational position of the seat shell with respect to the base, the rotation mechanism comprising at least one rotation stop; and the base further comprises:

a belt locking arm, disposed below the belt access panel, to securely couple the belt to the base when the rear-facing belt path is used to install the child restraint into the vehicle, the belt locking arm displacing a portion of the belt so as to ensure the belt is under tension when secured to the child restraint; and a rotation lockout that engages the at least one rotation stop only when the child restraint is installed into the vehicle and the seat shell is at the rear-facing position so as to prevent the seat shell from being rotated from the rear-facing position to the forward-facing position, the rotation lockout being actuated by the belt locking arm pressing the belt against the rotation lockout.

49. The child restraint of claim 48, wherein: the base comprises: a lower base; and a mid base coupled to the lower base via a recline mechanism that adjusts a recline position of the seat shell with respect to the base and rotatably coupled to the seat shell; and the portion of the rear-facing belt path disposed within the base is accessible independent of the recline position of the seat shell.

50. The child restraint of claim 48, wherein the seat shell blocks access to the portion of the rear-facing belt path disposed within the base when the seat shell is at the forward-facing position.

51. A child restraint for a vehicle, comprising:
a base having a rear portion configured to abut a portion of a vehicle seatback of a vehicle seat in the vehicle when the child restraint is installed into the vehicle;

a seat shell, rotatably coupled to the base such that the base remains stationary while the seat shell rotates, to support a child, the seat shell having a front side and a rear side and being rotatable relative to the base between: a rear-facing position where the front side of the seat shell is closer to the rear portion of the base than the rear side of the seat shell; and a forward-facing position where the rear side of the seat shell is closer to the rear portion of the base than the front side of the seat shell; and a locking mechanism, coupled to the seat shell, to lock the seat shell to the base, the locking mechanism comprising: a first actuation handle; and a secondary lock coupled to the first actuation handle such that the seat shell is rotatably adjustable with respect to the base only when the first actuation handle and the secondary lock are actuated at the same time.

52. The child restraint of claim 51, wherein: the base includes a top portion with a plurality of openings; and the locking mechanism further comprises: a lock pin configured to be inserted into an opening in the plurality of openings, the lock pin being coupled to the first actuation handle such that the first actuation handle removes the lock pin from the opening when the first actuation handle is actuated, the lock pin being further coupled to the secondary lock such that the secondary lock prevents release of the lock pin unless the secondary lock is actuated; and a spring, coupled to the lock pin, to at least one of insert or maintain the lock pin in the opening when the first actuation handle is not actuated.

53. The child restraint of claim 52, wherein the plurality of openings of the base are arranged on the top portion to receive the lock pin only when the seat shell is at either the forward-facing position or the rear-facing position.

54. The child restraint of claim 52, wherein: the lock pin, the first actuation handle, and the spring are disposed on a first side of the seat shell; and the locking mechanism further comprises: a second actuation handle disposed on a second side of the seat shell opposite the first side and coupled to the lock pin via at least one of a torsion wire or a cable such that actuation of at least one of the first or second actuation handles removes the lock pin from the opening.

55. A child restraint for a vehicle, the child restraint comprising:
  a lower base configured to abut a portion of a vehicle seat in the vehicle when the child restraint is installed into the vehicle;
  a seat shell to support a child; and
  a mid base disposed between the lower base and the seat shell and coupled to the lower base via a recline mechanism, the recline mechanism comprising: a pair of rails disposed on the lower base;
  a pair of lock pins, disposed within the mid base, where each lock pin engages one of the pair of rails;
  a first flexible member coupled to one of the pair of lock pins and disposed within the mid base along a first path;
  a second flexible member coupled to a remaining one of the pair of lock pins and disposed within the mid base along a second path, the second path overlapping the first path; and an actuation handle, coupled to the first flexible member and second flexible member, to disengage the pair of lock pins from the pair of rails when the actuation handle is actuated.

56. The child restraint of claim 55, wherein: the lower base has a rear portion configured to abut a vehicle seatback of the vehicle seat when the child restraint is installed into the vehicle; the seat shell has a front side and a rear side and is rotatable relative to the lower base between: a rear-facing position where the front side of the seat shell is closer to the rear portion of the lower base than the rear side of the seat shell; and a forward-facing position where the rear side of the seat shell is closer to the rear portion of the lower base than the front side of the seat shell; and the mid base rotatably couples the seat shell to the lower base such that the lower base remains stationary while the seat shell rotates with respect to the lower base.

57. The child restraint of claim 55, wherein the flexible member comprises at least one of a band, a strap, or a cable.

58. The child restraint of claim 55, wherein the pair of rails are separated by a distance less than about 5.5 inches.

59. A child restraint for a vehicle, comprising:
  a lower base having a rear portion configured to abut a portion of a vehicle seatback of a vehicle seat in the vehicle when the child restraint is installed into the vehicle, the lower base having a storage compartment disposed on the rear portion;
  a Lower Anchors and Tethers for CHildren belt, coupled to the lower base, to secure the child restraint to the vehicle seat, the LATCH belt being stored in the storage compartment when the LATCH belt is not in use;
  a mid base coupled to the lower base via a recline mechanism that adjusts a recline position of the mid base with respect to the lower base, the recline mechanism defining at least four indexed recline positions where the recline position of the mid base corresponds to one of the at least four indexed recline positions, the mid base and the lower base includes one or more rear belt path features that define, in part, a rear-facing belt path, the one or more rear belt path features configured to receive one of a vehicle seat belt or the LATCH belt to couple the child restraint to the vehicle seat when the child restraint is installed into the vehicle in a rear-facing configuration, the mid base further comprising:
    a first belt locking arm to securely couple one of the vehicle seat belt or the LATCH belt to the mid base when the rear-facing belt path is used to install the child restraint into the vehicle; and
  a rotation lockout, coupled to the first belt locking arm, that is actuated by the first belt locking arm pressing one of the vehicle seat belt or the LATCH belt against the rotation lockout only when the rear-facing belt path is used to install the child restraint into the vehicle; and
  a seat shell, rotatably coupled to the mid base via a rotation mechanism such that the lower base remains stationary while the seat shell rotates, to support a child, the seat shell having a front side and a rear side and being rotatable relative to the lower base between:
    a rear-facing position where the front side of the seat shell is closer to the rear portion of the lower base than the rear side of the seat shell; and
  a forward-facing position where the rear side of the seat shell is closer to the rear portion of the lower base than the front side of the seat shell, the seat shell comprising:
    a seat pan to support thighs of the child;
    a seatback section, coupled to the seat pan, to support a back of the child;
    a first side coupled to the seat pan and the seatback section;
    an adjustable headrest, disposed on a seatback section, to support a head of the child;
    at least one first opening, disposed on the first side, defining, in part, a first forward-facing belt path different from the rear-facing belt path, the at least one first opening configured to receive one of the vehicle seat belt or the LATCH belt to couple the child restraint to the vehicle seat when the child restraint is installed into the vehicle and the seat shell is in the forward-facing configuration;
    at least one notch disposed on the first side of the seat shell; at least one second opening disposed on the adjustable headrest, the at least one second opening and the at least one notch defining, in part, a second forward-facing belt path different from the first forward-facing belt path and the rear-facing belt path, the at least one second opening and the at least one notch configured to receive the vehicle seat belt to couple the child restraint to the vehicle seat and restrain the child in the seat shell when the child restraint is installed into the vehicle and the seat shell is in the forward-facing configuration;
  a belt access panel, disposed on a front portion of the seat pan, to provide access to the first belt locking arm only when the seat shell is at the rear-facing position; and a second belt locking arm, disposed on the seatback section, to securely couple one of the vehicle seat belt or the LATCH belt to the seat shell when the first forward-facing belt path is used to install the child restraint into the vehicle, wherein: the rotation mechanism comprises at least one rotation stop; and the rotation lockout engages the at least one rotation stop only when the child restraint is installed into the vehicle and the seat shell is at the rear-facing position so as to limit a range of rotation of the seat shell where the seat shell is not rotatable from the rear-facing position to the forward-facing position.

* * * * *